(12) United States Patent
Katta et al.

(10) Patent No.: US 6,353,444 B1
(45) Date of Patent: Mar. 5, 2002

(54) USER INTERFACE APPARATUS AND BROADCAST RECEIVING APPARATUS

(75) Inventors: Noboru Katta, Itami; Toshiaki Mori, Minoo; Hirotsugu Kawata, Sakai; Toshihiko Kurosaki, Kobe; Yoshiaki Kushiki, Katano, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/261,757

(22) Filed: Mar. 2, 1999

(30) Foreign Application Priority Data

| Mar. 5, 1998 | (JP) | 10-053206 |
| Jun. 24, 1998 | (JP) | 10-177662 |
| Oct. 1, 1998 | (JP) | 10-279522 |

(51) Int. Cl.$^7$ ................................................. G06F 3/00
(52) U.S. Cl. ........................ 345/716; 345/810; 345/811; 348/906; 725/46
(58) Field of Search ................ 345/327, 333, 345/352, 339, 328, 336, 338, 716, 810, 811, 764, 723, 705, 708; 348/906; 725/38, 39, 44, 46, 47, 56

(56) References Cited

U.S. PATENT DOCUMENTS

| 5,594,509 | A | * | 1/1997 | Florin et al. ................. 348/731 |
| 5,758,257 | A | * | 5/1998 | Herz et al. ...................... 455/2 |
| 5,835,087 | A | * | 11/1998 | Herz et al. ................... 345/327 |
| 5,867,226 | A | * | 2/1999 | Wehmeyer et al. ......... 348/563 |
| 6,020,883 | A | * | 2/2000 | Herz et al. ................... 345/327 |
| 6,133,909 | A | * | 10/2000 | Schein et al. ................ 345/327 |
| 6,172,712 | B1 | * | 1/2001 | Beard ......................... 348/552 |

* cited by examiner

Primary Examiner—Raymond J. Bayerl
Assistant Examiner—Kieu D. Vu
(74) Attorney, Agent, or Firm—Price and Gess

(57) ABSTRACT

An user interface apparatus that receives a user operation of an electrical device and notifies the electrical device of the instruction to execute an action according to the user operation predicts at least one action, the execution of which is supposed to be desired by the user, provides a user interface for having the user designate one action out of the at least one action, and receives a designation by the user. When receiving the user designation, the user interface apparatus notifies the electrical device of the instruction to execute the action that has been designated by the user.

9 Claims, 35 Drawing Sheets

| | CATEGORY | CONTENT |
|---|---|---|
| 6401 | TASTE GENRE | SPORT |
| | | NEWS |
| | | ⋮ |
| 6402 | FAVORITE PROGRAM (PROGRAM TITLE, GENRE, PLAYER, CHANNEL) | SERIAL "XY", DRAMA,⋯ |
| | | MOVIE "XX", MOVIE,⋯ |
| | | ⋮ |
| 6403 | PROGRAM WATCHING HISTORY (PROGRAM TITLE, GENRE, PLAYER, CHANNEL) | SERIAL "XY", DRAMA,⋯ |
| | | "ZZXX", DRAMA,⋯ |
| | | ⋮ |
| 6404 | BEDTIME | 01:00 |
| | ⋮ | ⋮ |

| NUMBER | FUNCTION ITEM NAME |
|---|---|
| 1 | PRESET FOR GENRE-CLASSIFIED RECORDING |
| 2 | DETECT FROM CHANNEL-AT-A-GLANCE DISPLAY AND PRESET FOR RECORDING |
| 3 | DETECT FROM SERIES-AT-A-GLANCE DISPLAY AND PRESET FOR RECORDING |
| 4 | PRESET FOR RECORDING PROGRAM IN PROGRAM TABLE |
| 5 | TUNE IN PROGRAM IN PROGRAM TABLE |
| 6 | COLOR-CODE PROGRAM TABLE |
| 7 | CONFIRM DISPLAY FROM CENTER |
| 8 | CONFIRM MAIL FROM CENTER |
| 9 | CONFIRM PRESET CONDITION |
| 10 | PRESET CANCELLATION |
| 11 | CONFIRM PRESET EXECUTION RECORD |
| 12 | SETTING IMAGE QUALITY IN RECORDING |
| 13 | PURCHASE RECORD OF PAY PROGRAM/CONFIRM TOTAL RATES/RESET |
| 14 | CONFIRM RECORD OF TRANSMISSION TO CENTER |
| 15 | SETTING/CHANGE OF SKIP CHANNEL |
| 16 | SETTING/CHANGE OF AGE FOR WATCHING |
| 17 | SETTING/CHANGE OF RATE LIMITATION OF ONE PROGRAM |
| 18 | DECISION CONFIRMATION DISPLAY SWITCH RESPONDING TO OPERATION FROM TV PORT CONNECTING UNIT |
| 19 | CHANGE PASSWORD |
| 20 | ON/OFF OF CLOSED CAPTION |
| 21 | SETTING/CHANGE OF TV SCREEN SIZE |
| 22 | ON/OFF OF ON-SCREEN CORRECTION |
| 23 | SWITCH PROGRAM DISPLAY LANGUAGE |
| 24 | RETURN TO PREVIOUSLY SELECTED CHANNEL |
| 25 | SELECT FROM PROGRAMS ON OTHER CHANNELS |
| 26 | SELECT FROM PROMOTION CHANNELS |
| 27 | SETTING CHANNELS SELECTED WITH REMOTE CONTROL BUTTONS |
| 28 | CANCELLATION/EXECUTION DESIGNATION OF PRESET WHEN START TIME OF PRESET PROGRAM IS CHANGED |
| 29 | RELATE CHANNELS TO BUTTONS IN NUMERIC KEYPAD ON REMOTE CONTROLLER |
| 30 | CONFIRM CARD ACTION |
| 31 | CONFIRM DISK CONDITION |
| 32 | TEST RECEIVING CONDITION |
| 33 | CONFIRM CONNECTION TO OUTSIDE LINES |
| 34 | SWITCH OF POWER SUPPLY TO CONVERTER |
| 35 | CHANGE TO LOCAL FREQUENCY |
| 36 | CHANGE/CONFIRM RECEIVABLE NETWORK |
| 37 | CHANGE SATELLITE FREQUENCY |
| 38 | SWITCH POLARIZED WAVE FACE |
| 39 | SETTING/CHANGE OF CODING RATIO |
| 40 | CONFIRM ANTENNA LEVEL |
| 41 | SETTING/CHANGE OF TRANSMISSION NUMBER FOR COMMUNICATION WITH OUTSIDE LINES |
| 42 | CONFIRM COMMUNICATION REPORT |
| 43 | CHANGE REMOTE CONTROL SIGNAL |
| 44 | GUIDE DISPLAY OF OPERATION AND FUNCTION |
| 45 | EXPLANATION DISPLAY OF BUTTONS ON REMOTE CONTROLLER |
| 46 | DISPLAY OF INFORMATION ON PRESENTLY WATCHED PROGRAM |
| 47 | DISPLAY OF DETAILED INFORMATION ON PROGRAM |

FIG. 21

| NUMBER | KEYWORD | NUMBER | KEYWORD |
|---|---|---|---|
| 48 | CHANNEL SELECTION | 79 | PASSWORD |
| 49 | SETTING SYSTEM | 80 | CLOSED CAPTION |
| 50 | PRESET | 81 | ENGLISH SUBTITLE BROADCASTING |
| 51 | CANCELLATION | 82 | TV SCREEN SIZE |
| 52 | CHANGE | 83 | ON-SCREEN CORRECTION |
| 53 | CONDITION CONFIRMATION | 84 | TV DISPLAY BLUR |
| 54 | DETECTION | 85 | PROGRAM DISPLAY LANGUAGE |
| 55 | WORRY AND TROUBLE | 86 | PREVIOUSLY SELECTED CHANNEL |
| 56 | BREAKDOWN? | 87 | PROGRAMS ON OTHER CHANNELS |
| 57 | RECORD CONFIRMATION | 88 | PROMOTION CHANNELS |
| 58 | RECORDING | 89 | REMOTE CONTROL BUTTONS |
| 59 | IMAGE QUALITY | 90 | CHANNELS TO BE SELECTED |
| 60 | GENRE CLASSIFICATION | 91 | CHANGE OF BROADCASTING START TIME |
| 61 | CHANNEL LIST | 92 | PRESET CANCELLATION |
| 62 | SERIES LIST | 93 | REMOTE CONTROLLER |
| 63 | PROGRAM TABLE | 94 | CARD |
| 64 | COLOR-CODING | 95 | RECEIVING CONDITION |
| 65 | CENTER | 96 | OUTSIDE LINE |
| 66 | MAIL | 97 | CONVERTER |
| 67 | PRESET CONDITION | 98 | LOCAL FREQUENCY |
| 68 | PRESET EXECUTION RECORD | 99 | NETWORK |
| 69 | PURCHASE RECORD OF PAY PROGRAM | 100 | SATELLITE FREQUENCY |
| 70 | TOTAL RATES | 101 | POLARIZED WAVE FACE |
| 71 | RESET | 102 | CODING RATIO |
| 72 | RECORD OF TRANSMISSION TO CENTER | 103 | ANTENNA |
| 73 | AUTOMATIC REDIAL | 104 | TRANSMISSION NUMBER |
| 74 | SKIP CHANNEL | 105 | COMMUNICATION REPORT |
| 75 | AGE FOR WATCHING | 106 | OPERATION GUIDE |
| 76 | RATE LIMITATION OF ONE PROGRAM | 107 | PROGRAM INFORMATION |
| 77 | TV PORT CONNECTING UNIT | 108 | TV |
| 78 | DECISION CONFIRMATION DISPLAY | 109 | TELEPHONE |

FIG. 30

| CATEGORY | CONTENT |
| --- | --- |
| TASTE GENRE | SPORT |
|  | NEWS |
|  | ⋮ |
| FAVORITE PROGRAM (PROGRAM TITLE, GENRE, PLAYER, CHANNEL) | SERIAL "XY", DRAMA,⋯ |
|  | MOVIE "XX", MOVIE,⋯ |
|  | ⋮ |
| PROGRAM WATCHING HISTORY (PROGRAM TITLE, GENRE, PLAYER, CHANNEL) | SERIAL "XY", DRAMA,⋯ |
|  | "ZZXX", DRAMA,⋯ |
|  | ⋮ |
| BEDTIME | 01:00 |
| ⋮ | ⋮ |

- 6400
- 6401: TASTE GENRE
- 6402: FAVORITE PROGRAM
- 6403: PROGRAM WATCHING HISTORY
- 6404: BEDTIME

USER INTERFACE APPARATUS AND BROADCAST RECEIVING APPARATUS

This application is based on application Ser. Nos. 10-053206, 10-177662, and 10-279522 filed in Japan, the contents of which are hereby incorporated by reference.

BACKGROUND OF THE INVENTION (1) Field of the Invention

The present invention relates to a user interface in an electrical appliance and a personal computer, and relates to a broadcast receiving apparatus that is provided with a user interface.

(2) Description of the Prior Art

An electrical appliance such as a television set, a video cassette recorder, and an air conditioner is equipped with buttons, and the like for receiving user instructions on the main body or the remote controller.

Each of the buttons typically corresponds to one function of the electrical appliance, and is provided with characters or a mark that read or indicates the content of the function. The user pushes a button to have the electrical appliance perform a corresponding function.

With the diversification of uses, multi-featured electrical appliances have been developed in order to meet user needs for more useful and complex functions.

As a result, the number of buttons on the main body or the remote controller increases, leading to a bulky remote controller, which is inconvenient to carry. In addition, it takes much time for the user to find the button corresponding to a desired function.

One proposed solution to these problems is an operation panel on a multi-featured electric appliance that is realized by a software.

The operation panel is a graphical user interface. More specifically, an electric appliance is equipped with an image displaying unit or the monitor on the appliance on which an image is output is used as an image displaying unit, and button images are displayed on the image displaying unit under the control of a software. The user designates one position on the image displaying unit using the remote controller and the like to select one of the button images. Here, a "button image" refers to an image that has the same function as a button.

The operation panel displays the button images corresponding to the multiple functions so that the button images would be systematized in a hierarchical menus. As a result, the user may select each of the functions even if the number of button images displayed on the image displaying unit at one time is limited due to the resolution constraints. Here, a "menu" refers to all the button images displayed on the image displaying unit at one time.

More specifically, the software that realizes the operation panel systematizes the multiple functions in a tree structure and displays the corresponding button images on the image displaying unit so that hierarchical menus would be displayed according to the tree structure. As a result, when selecting a function that is positioned at a relatively lower level in a tree structure, the user has to repeat the selection of a button image corresponding to a function that is positioned at a higher level than a button image corresponding to the desired function until the desired button image is displayed on the image displaying unit.

FIG. 1 shows a video system 9000, which is an example of a conventional electrical appliance equipped with an operation panel that displays a hierarchical menus.

The video system 9000 includes a video recording and replaying apparatus 9100, a monitor 9200, and a remote controller 9300.

Here, the video recording and replaying apparatus 9100 has functions for recording programs, replaying recorded programs, and displaying the replayed programs. The video recording and replaying apparatus 9100 detects signals transmitted from the remote controller 9300, performs the functions according to the signals, outputs signals to the monitor 9203 for displaying the operation panel on the monitor 9200, and outputs TV signals to the monitor 9200 for replaying and displaying recorded programs.

An operation panel 9210 displayed on the image displaying unit of the monitor 9200 is realized by a software in the video recording and replaying apparatus 9100, and includes a cursor 9211, button images 9212 "replay", 9213 "preset for recording", 9214 "recording", 9215 "TV", and 9216 "setting".

The remote controller 9300 receives the user instruction and transmits the signals representing the instruction to the video recording and replaying apparatus 9100. The remote controller 9300 includes remote control buttons 9310, 9320, 9330, and 9340 for moving the cursor 9211 on the operation panel 9210, and a remote control button 9350 for determining the selection of a button image indicated by the cursor 9211. For instance, when the user pushes the remote control button 9330, the cursor 9211 moves down one line.

FIG. 2 shows a hierarchical structure of function items displayed on the operation panel 9210 as button images.

As shown in FIG. 2, the function items are related to each other so that the function items would form a tree structure. For instance, the function item "detect and replay" is a subitem of the function item "replay" in the tree structure.

When the user selects a button image on the operation panel 9210, the display on the operation panel 9210 is changed according to the hierarchical structure shown in FIG. 2.

When the user wants the video system 9000 to display a TV program, the processings described below are performed.

The user pushes the remote control button 9340, with watching the operation panel 9210 as shown in FIG. 1. In response to the user instruction, the cursor 9211 on the operation panel 9210 moves to the right and indicates the button image 9215 "TV".

Then the user pushes the remote control button 9350 to select the button image 9215. As a result, a TV program is displayed on the 9200.

A conventional electrical appliance equipped with an above-described operation panel, however, raises a new problem that it is difficult for the user to easily select a desired function from a hierarchical menus. For instance, when the user has little knowledge of the hierarchical structure of the electrical appliance functions, it is difficult for the user to select a function that is positioned at a relatively lower level of the structure.

In addition, when an electrical appliance is equipped with combined or special functions even for the convenience of the user, it is difficult to form an easy-to-understand hierarchical menus including these functions. In this case, even if hierarchical menus including these combined or special functions are formed, the structure of the hierarchical menus is complex. As a result, it is difficult for the user to be familiar with the hierarchical structure and to easily select a function from the menus.

For instance, when the function structure of an electrical appliance has the highest menu including the same functions as the video system 9000 (refer to FIG. 1), and when the electrical appliance is equipped with a combined function "delete information on replayed program", it is difficult for the user to specify the menu in the hierarchical structure that includes the combined function. When the electrical appliance is equipped with a special function "switch to a favorite program", it is difficult to include the special function in a menu in a normal hierarchical structure. Even if the special function is included in a menu in a hierarchical structure, it is difficult for the user to specify the menu that includes the special function.

Similar problem also arises for a multi-featured personal computer.

SUMMARY OF THE INVENTION

It is accordingly an object of the present invention to provide a user interface apparatus that enables the user to easily designate a desired function of an electric appliance or a personal computer with high probability.

Another object of the present invention is to provide a user interface apparatus that suggests the user instructing a special function when necessary, and to provide a broadcast receiving apparatus equipped with the user interface apparatus.

The above-mentioned first object may be achieved by a user interface apparatus that receives a user operation of an electrical device and notifies the electrical device of an execution instruction relating to an action according to the user operation, the user interface apparatus may include: a predicting unit for predicting at least one action, an execution of which is supposed to be desired by a user; a user interface unit for providing a user interface in order to have the user designate one out of the actions that have been predicted by the predicting unit, and for receiving a designation of an action by the user; and a notifying unit for notifying the electrical device of an execution instruction relating to an action according to the user action designation that has been received by the user interface unit.

A system equipped with the user interface apparatus according to the present invention predicts functional actions that the user would desire, so that the user easily instructs the execution of a functional action with high probability. The system provides a user interface with which a functional action is not necessarily searched for from hierarchical menus and is executed only with a designation by the user, so that the user may easily instruct the execution of a functional action. Note that the prediction in this specification means to specify functional actions that are not directly designated by the user according to, for instance, the condition of an electrical device and information that the user has input.

In addition, with the user interface apparatus according to the present invention, it is possible to recommend the execution of a functional action, for instance, to recommend the execution of a functional action that leads to the release of a system resource when the system resource is not sufficient. As a result, it is possible to have the user easily instruct the execution of a functional action that the user does not desire at present but would desire when recommended.

A system equipped with the user interface apparatus, wherein the user interface unit automatically provides the user interface without being instructed by the user may predict functional actions and voluntarily provide a user interface including choices of the predicted functional actions without user requirement, so that the execution instruction of a functional action that is not necessarily executed may be recommended. As a result, a user who is not familiar with the functions of the system may easily use the system. Note that the voluntarily providing of a user interface unit that the system provides a user interface not according to a user instruction but with a predetermined timing.

The user interface apparatus that may further include user information storage unit for storing user information that is peculiar to the user, wherein the predicting unit predicts the actions according to the user information after a condition of the electrical device becomes a predetermined condition may predict actions of an electrical device according to the conditions peculiar to the user to recommend the optimal action of the electrical device to the user. As a result, the user may easily have the electrical device execute the action that is optimal to the user. In other words, the present invention provides a user interface that has not general actions for all users but actions peculiar to one user be designated. As a result, the second object is achieved.

The user interface apparatus, wherein the user information is taste information on tastes of the user, and the predicting unit predicts actions that meet the tastes of the user according to the taste information may predict actions of an electrical device according to the tastes of the user to recommend the actions of the electrical device that are supposed to be desired by the user. As a result, when storing information on the user tastes in the user information storage unit, the user may be provided with a unit of easily instructing an action that meets the user tastes.

The user interface apparatus, wherein the user information is behavioral information on habitual behavior of the user, and the predicting unit predicts actions that are necessary to keep the habitual behavior of the user according to the behavioral information may predict actions of an electrical device according to information on the habitual behavior of the user to recommend actions of an electrical device according to the habitual behavior of the user. As a result, the user may have the electrical device execute an action that is necessary to keep the user habitual behavior only by designating an action.

With the user interface apparatus, wherein the user interface unit provides the user interface by displaying at least one image in order to have the user designate one out of the actions that have been predicted by the predicting unit, wherein the image displayed in the user interface includes an image that shows a reason why the action has been predicted, a button image in a graphical user interface may include a reason. As a result, the user may understand the reason of the sudden appearance of a button image without confusion.

The user interface apparatus, wherein the electrical device is a broadcast receiving apparatus that displays an image of a received program on a monitor, the user information storage unit stores user information that is peculiar to a user of the broadcast receiving apparatus, and the user interface unit provides the user interface by displaying an image on the monitor for having the user designate one out of the actions that have been predicted by the predicting unit may be used as the user interface in a broadcast receiving apparatus. As a result, the user may easily have the broadcast receiving apparatus execute a recommendable action by pressing a button image and the like on the monitor in the broadcast receiving apparatus, which representing the recommendable action, via an input device such as a remote controller. Here, recommendable actions include channel switch to a program that meets the user tastes.

The user interface apparatus, that may further include: a program table storage unit for storing a program table including information on a plurality of programs; and a user information receiving unit for receiving input of the user information by the user and for storing the user information in the user information storage unit, wherein the user information is program taste information that shows tastes of the user relating to programs, and the user interface unit refers to the program table and the program taste information, detects a program that meets the tastes of the user other than a program that the broadcast receiving apparatus is presently receiving, and displays an image on the monitor for having the user designate an execution of an action of switching a received object of the broadcast receiving apparatus to the detected program may be equipped with a user interface with which the switch to a program that meets the tastes of the user of a broadcast receiving apparatus on a channel other than a presently selected channel may be executed. As a result, the user may not miss a favorite program during watching another program and may start watching the favorite program with an easy operation by inputting information on the user tastes in advance.

The user interface apparatus, that may further include program table storage unit for storing a program table including information on a plurality of programs, wherein the user information is bedtime information that shows a bedtime of the user, and the user interface unit refers to the program table and the bedtime information, compares the bedtime with a time when a program that the broadcast receiving apparatus is presently receiving ends, and displays an image on the monitor for having the user designate an execution of an action of recording the program when the program ends after the bedtime may help the user to keep a bedtime, so that the user may easily keep habitual behavior.

The user interface apparatus that may further include: a general operation receiving unit for receiving a user operation of the electrical device other than the user action designation that the user interface unit receives; a general notifying unit for notifying the electrical device of an execution instruction according to the user operation that has been received by the general operation receiving unit; and a holding unit for holding execution instruction information on the execution instruction according to the user operation that has been received by the general operation receiving unit, wherein a the predicting unit predicts actions according to the execution instruction information that is held by the holding unit may receive an ordinary operation by the user via the general operation receiving unit. As a result, the operations other than the functional actions that have been predicted to be desired by the user are operable.

In addition, the prediction of actions by the user interface apparatus according to the execution of an electrical device action that has been instructed increases the probability that the user easily designates a desired action. As a result, the user interface apparatus according to the present invention may analyze an action that would be next desired by the user following the execution of an action, fetch the content of prediction judgement by the predicting unit, and improve prediction accuracy, to provide a graphical user interface including choices with which the user may easily instruct the execution of a functional action really desired by the user.

With the user interface apparatus, wherein the predicting unit predicts actions when an execution completion of an action of the electrical device is detected, and the user interface unit provides the user interface when the predicting unit has predicted the actions, the user may generally desire to execute one functional action after the execution of a functional action. As a result, a provided user interface is useful with a high probability.

With the user interface apparatus, wherein the electrical device is a broadcast program recording and replaying apparatus that records a plurality of broadcast programs, replays a recorded broadcast program, and displays the replayed broadcast program on the monitor, when it is detected that one of a series of broadcast programs has been replayed by the broadcast program recording and replaying apparatus, the predicting unit predicts an action of replaying a next broadcast program in the series of broadcast programs as one of the predicted actions, and the user interface unit provides the user interface by displaying at least one image for having the user designate one out of the actions that have been predicted by the predicting unit, after the replaying of a program in a series of recorded programs, the user may easily instruct the broadcast program recording and replaying apparatus to replay a program that follows the replayed program.

With the user interface apparatus, wherein the predicting unit predicts actions when completions of all user operations that are necessary to have the electrical device execute one action are detected, the user may often desire to execute a functional action at the time of the completion of one user operation. As a result, the prediction of functional actions is useful with a high probability.

With the user interface apparatus, wherein when an execution of the action according to the user action designation that has been received by the user interface unit needs setting information according to a user operation, the notifying unit creates an execution instruction that includes the setting information by referring to the execution instruction information that is held by the holding unit, and notifies the electrical device of the created execution instruction it may not be necessary for the user to input again the object of functional action that has been input. This means that a system that uses the user interface apparatus according to the present invention provides a function that effectively uses information such as a functional action object that has been input by the user. For instance, when the user instructs to execute a recording function, information such as the time and date of the recording and the channel of a program, and the like is input in a recording and replaying apparatus. Such input information may be used for a function "preset for recording of next episode", and the like.

It is difficult to include a useful function such as the function "preset for recording of next episode" in a conventional hierarchical menu. Even if such a function is included in a hierarchical menu, it is difficult for the user to easily find the menu that includes the function. The present invention solves the problem and has the effect of providing the system with a function that is more useful to the user.

With the user interface apparatus, wherein the predicting unit includes a priority storage unit for storing priority information in which a priority is set for an action of the electrical device, and the predicting unit predicts actions, a number of which is at least one and no greater than a predetermined number, by referring to the priority information, the number of button images that are displayed as a user interface, i.e., the number of choices may be limited. As a result, the user may easily use the user interface.

With the user interface apparatus that may further include general operation receiving unit for receiving a user operation of the electrical device other than the user action designation that the user interface receives, wherein the general operation receiving unit has an operation button, which is used by the user, displays an image for assisting a user operation, and receives a user operation corresponding to the image via the operation button, and the user interface unit has a designation button, which is different from the operation button and is used by the user, and receives the user action designation via the designation button, the probability that normal operability for a user who uses no user interface is kept may increase, and different buttons may be used for a normal operation and for designating a predicted functional action. As a result, the operation is easy to understood by the user.

When the user had watched a program and temporarily switched channels during the commercials in the program, a broadcast receiving apparatus equipped with the user interface apparatus, wherein the electrical device is a broadcast receiving apparatus that displays an image of a received program on a monitor, the electrical device includes: a receiving unit for receiving a program on a channel; and a condition detection unit for detecting a condition where the receiving unit had received a program on a first channel for at least a first period, the first channel was switched to a second channel according to a user operation, and a second period has elapsed, the predicting unit predicts a switching action to the first channel as one action, an execution of which is supposed to be desired by the user when the condition is detected by the condition detection unit, the user interface unit displays an image on a monitor for having the user designate an execution of the switching action to the first channel that has been predicted by the predicting unit, and receives the user action designation, and when notified of the switching action to the first channel by the notifying unit, the broadcast receiving apparatus controls the receiving unit and has the receiving unit receive the program on the first channel may prevent the user from forgetting to switch to the originally watched program, and the user may instantly switch to the originally watched program only by selecting an image for switching channels.

With the user interface apparatus that may further include: an evaluation value storage unit for storing evaluation values that each correspond to different actions of the electrical device; a semantic relation information storage unit for storing semantic relation information on semantic relations between the actions of the electrical device and a plurality of keywords; a keyword receiving unit for receiving a designation of a keyword by the user; an initializing unit for initializing the evaluation values that are stored in the evaluation value storage unit and setting each of the evaluation values at a predetermined value; and an evaluation value increasing unit for referring to the semantic relation information and for increasing an evaluation value corresponding to an action that has a semantic relation to the keyword, the designation of which has been received by the keyword receiving unit, wherein when the keyword receiving unit receives the keyword designation, the predicting unit predicts actions by specifying a predetermined number of actions in decreasing order of evaluation value according to the evaluation values that are stored in the evaluation value storage unit, and the user interface unit provides a user interface for having the user designate one action out of the predetermined number of actions, which have been predicted by the predicting unit, it is possible to provide a graphical user interface that has a desired functional action be easily selected for a user who does not memorize a hierarchical menu structure and operates a system with which a variety of functional actions may be executed.

The user interface apparatus, wherein the keyword receiving unit receives the designation of the keyword after creating a dedicated menu for having the user designate an action of the electrical device that includes a plurality of keywords having semantic relations to at least one of the actions of the electrical device by referring to the semantic relation information and displaying the dedicated menu, and the user interface unit provides the user interface by displaying an image for having the user designate one out of the predetermined number of actions may not have the user directly input a keyword by inputting the characters but have the user select a keyword. As a result, no burden of memorization is imposed on the user.

With the user interface apparatus that may further include: a general operation receiving unit for receiving a user operation of the electrical device other than the keyword designation that the keyword receiving unit receives and the user action designation that the user interface unit receives; and a general notifying unit for notifying the electrical device of an execution instruction according to the user operation that has been received by the general operation receiving unit, wherein the general operation receiving unit has an operation button, which is used by the user, displays an image for assisting a user operation, and receives a user operation corresponding to the image via the operation button, the user interface unit has a designation button, which is different from the operation button and is used by the user, the keyword receiving unit receives the user keyword designation by the user via the designation button, and the user interface unit receives the user action designation via the designation button, the operability of normal hierarchical menus for a user who does not select using keywords may be kept, and different operation buttons may be used for selecting using keywords and for operating normal hierarchical menus. As a result, it is easy for the user to understand operations.

The above-mentioned second object may be achieved by a broadcast receiving apparatus that displays an image of a received program on a monitor, the broadcast receiving apparatus may include: an execute control unit for receiving an instruction, for controlling elements in the broadcast receiving apparatus in response to the instruction to have an action be executed; a user information storage unit for storing user information that is peculiar to a user of the broadcast receiving apparatus; a user interface unit for displaying at least one image for having the user designate an action out of at least one action, an execution of which is supposed to be desired by the user according to the user information that is stored in the user information storage unit, and for receiving a designation of the action by the user after the broadcast receiving apparatus is in a predetermined condition; and a notifying unit for notifying the execute control unit of an execution instruction relating to an action according to the user action designation that has been received by the user interface unit.

The broadcast receiving apparatus predicts actions that are supposed to be desired by the user according to the conditions peculiar to the user, and displays button images and the like on the monitor for designating a predicted recommendable action, so that the user may easily have the broadcast receiving apparatus execute a recommendable action by pressing a corresponding button image and the like via the input device such as a remote controller. As a result, the present invention provides a user interface that has not general actions but recommendable actions peculiar to the user of the broadcast receiving apparatus be designated. As a result, the second object is achieved.

The broadcast receiving apparatus that may further include a program table storage unit for storing a program table including information on a plurality of programs, wherein the user information is program taste information that shows tastes of the user relating to programs, and the user interface unit refers to the program table and the program taste information, detects a program that meets the tastes of the user other than a program that the broadcast receiving apparatus is receiving, and displays an image on the monitor for having the user designate an execution of an action of switching a received object of the broadcast receiving apparatus to the detected program may be equipped with a user interface with which the switch to a program that meets the tastes of the user on a channel other than a presently selected channel may be executed. As a result, the user may not miss a favorite program during watching another program and may start watching the favorite program with an easy operation.

The user of the broadcast receiving apparatus that may further include a user information receiving unit for receiving the user information input by the user and for storing the user information in the user information storage unit may have the broadcast receiving device execute an action that meets the taste of the user by inputting information on the user tastes in advance.

The user of the broadcast receiving apparatus that may further include a received program information obtaining unit for obtaining information on the received program by referring to the program table, and for storing the obtained information in the user information storage unit as the program taste information may not miss a program that is watched every week and watch another program, and may start watching the every-week-watched program with an easy operation.

The broadcast receiving apparatus that may further include a program table storage unit for storing a program table including information on a plurality of programs, wherein the user information is bedtime information that shows a bedtime of the user, and the user interface unit refers to the program table and the bedtime information, compares the bedtime with a time when a presently received program ends, and displays an image on the monitor for having the user designate an execution of an action of recording the presently received program when the program ends after the bedtime may help the user to keep a bedtime, so that the user may easily keep habitual behavior.

The broadcast receiving apparatus that may further include a temporary storage unit for temporarily storing data on the received program, wherein when notified of an execution instruction for the action of recording the received program by the notifying unit, the execute control unit has a recording unit in the broadcast receiving apparatus record the received program from a part that has been received before a notification of the execute instruction for the action of recording using the data stored in the temporary storage unit may record a program from a part that has been received before a notification of the execute instruction for the recording. As a result, the user may watch a recorded program with less troublesome at a future time.

The broadcast receiving apparatus, wherein an image that the user interface unit displays includes an image that shows a reason why an action is predicted may add a reason to a button image and the like displayed on the monitor for having the user designate an action. As a result, the user may understand the meaning of a button image without confused by the sudden appearance of the button image.

When the user had watched a program and temporarily switched channels during the commercials in the program, a broadcast receiving apparatus that displays a received image on a monitor, the broadcast receiving apparatus may include: a receiving unit for receiving a program on a channel; a condition detection unit for detecting a condition in which the receiving unit had received a program on a first channel for at least a first period, the first channel was switched according to a user operation, and a second period has elapsed; a user interface unit for displaying an image on the monitor in order to have a user designate an execution of a switching action to the first channel when the condition detection unit detects the condition, and for receiving a designation by the user; and a reception control unit for controlling the receiving unit and for having the receiving unit receive the program on the first channel when the user interface unit receives the designation by the user may prevent the user from forgetting to switch to the originally watched program, and the user may instantly switch to the originally watched program only by selecting an image for switching channels.

The broadcast receiving apparatus, wherein the image that the user interface unit displays includes an image showing that the second period has elapsed since the first channel was switched may add a reason to a button image and the like displayed on the monitor for having the user designate an action. As a result, the user may understand the meaning of a button image without confused by the sudden appearance of the button image.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 20 is an example of the list of the numbers given to function item information 3510 and the corresponding function items;

FIG. 21 is an example of the list of the numbers given to keyword information 3520 and the corresponding keywords;

FIG. 30 shows the content of user information stored in a user information storage unit 6158;

DESCRIPTION OF THE PREFERRED EMBODIMENTS

The embodiments of the present invention will be described below with reference to figures.

(First Embodiment)

A user interface apparatus according to the first embodiment of the present invention will be described with reference with FIGS. 3 to 15.

(Structure)

Figure 1:
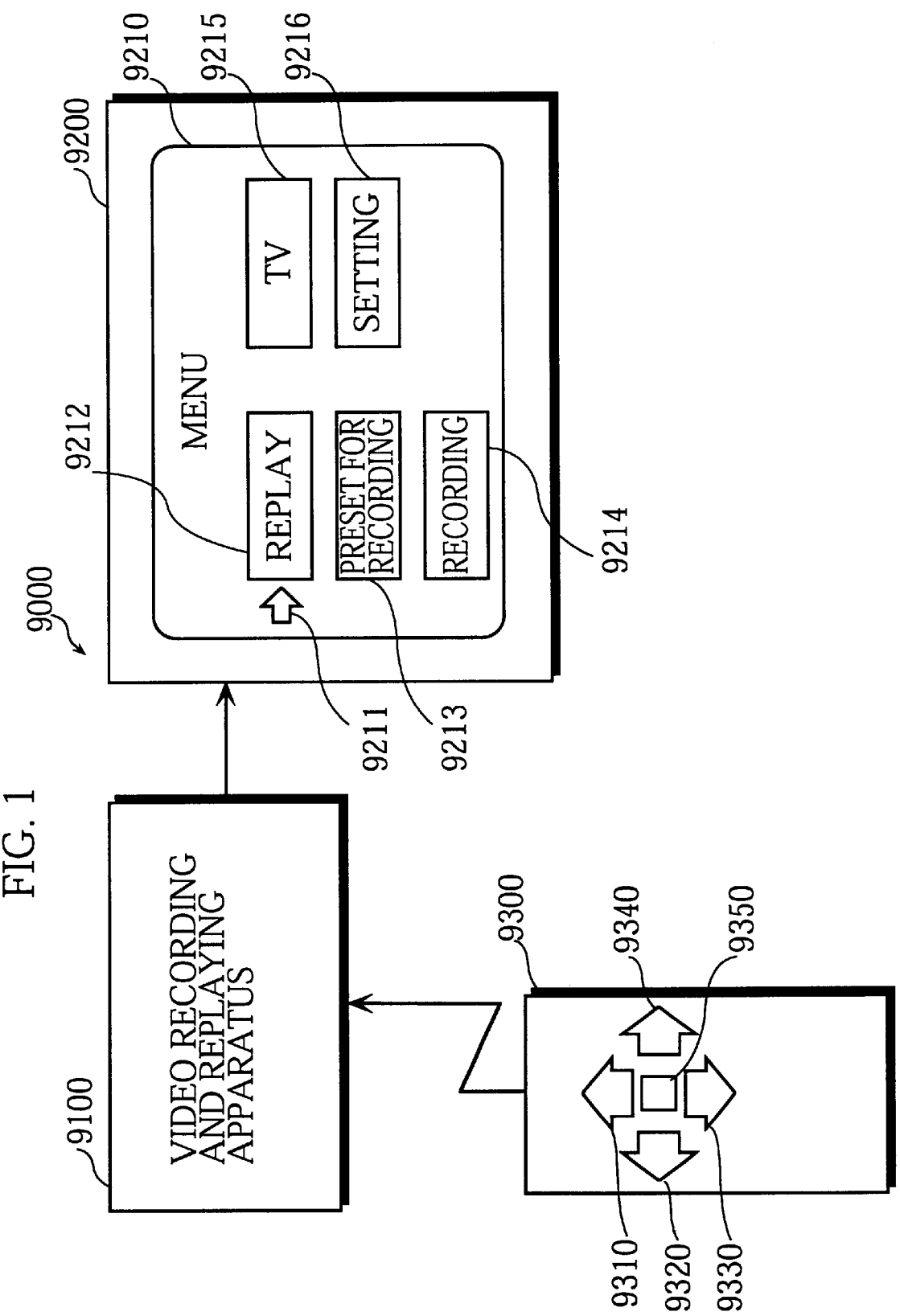
FIG. 1 shows a video system 9000, which is an example of a conventional electrical appliance equipped with an operation panel that displays hierarchical menus.
Figure 2:
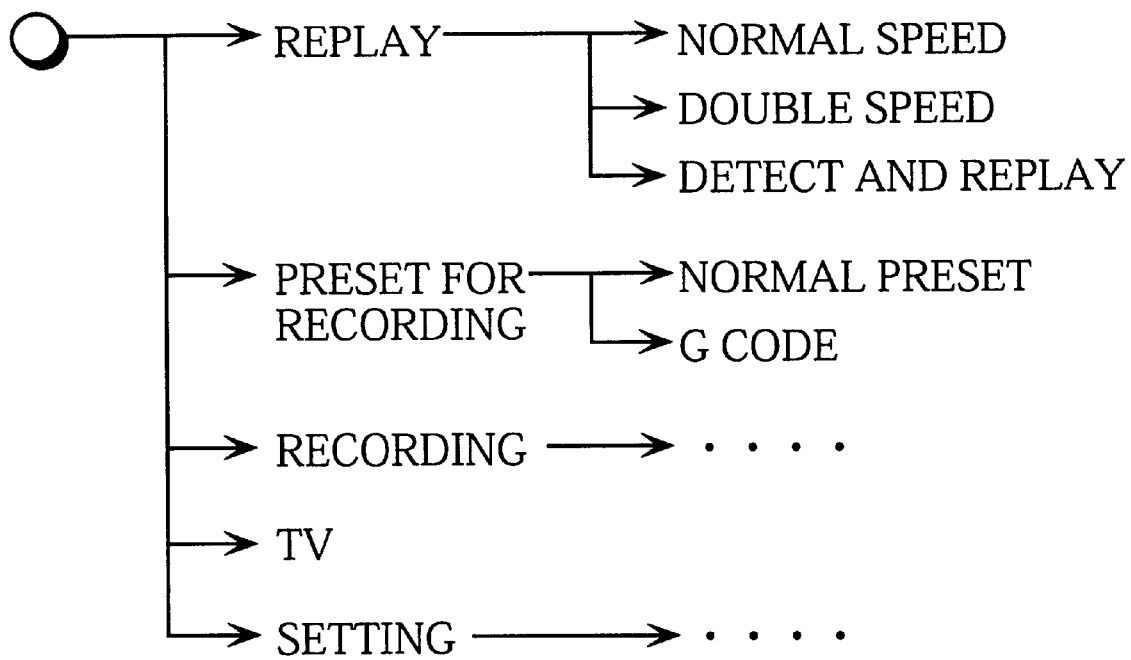
FIG. 2 shows the hierarchical structure including the function items that are shown on an operation panel 9210 in FIG. 1 as button images.
Figure 3:
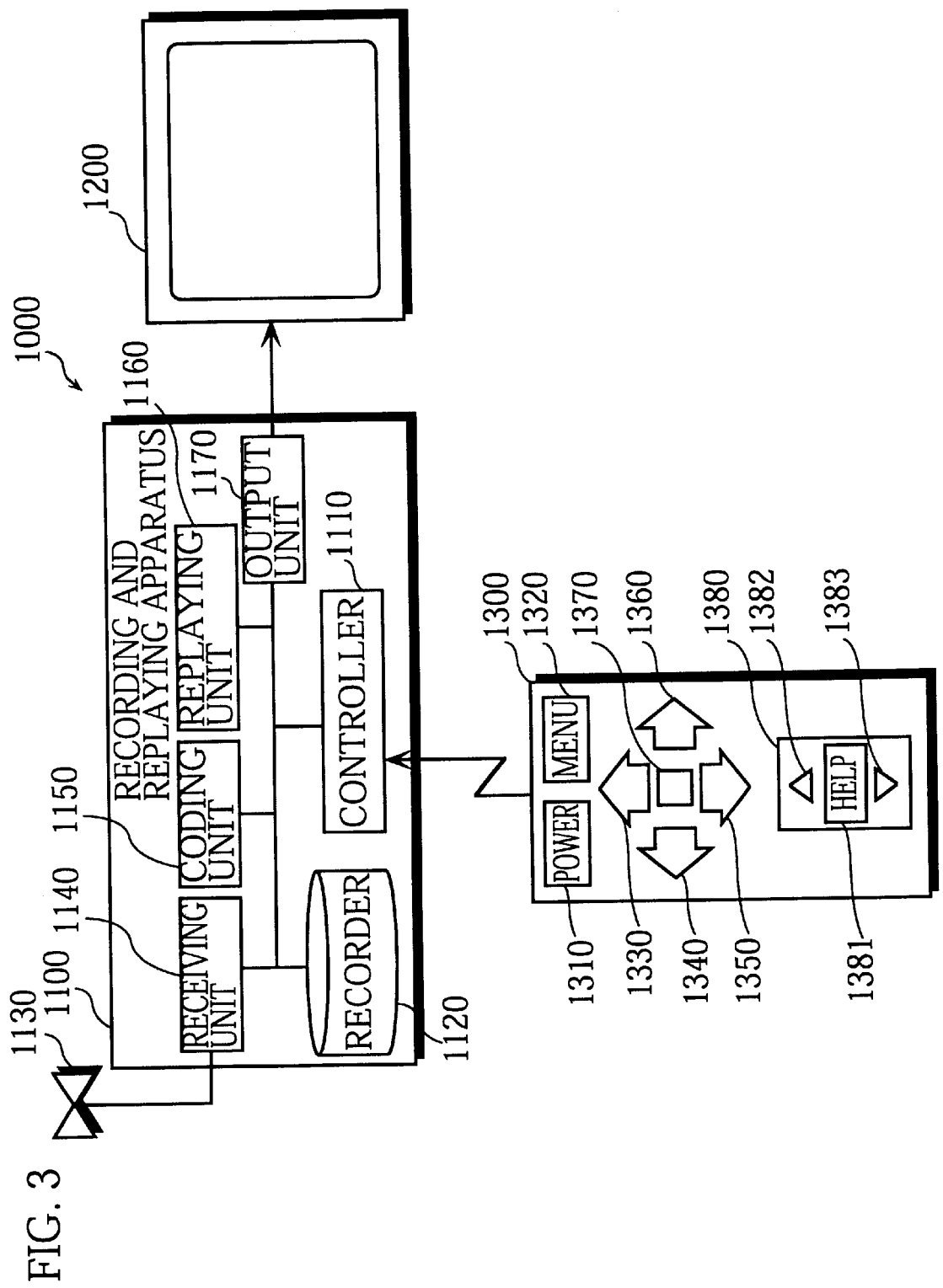
FIG. 3 shows a structure of a digital broadcast receiving system 1000 equipped with a user interface apparatus according to the first embodiment of the present invention.

FIG. 3 shows a structure of a digital broadcast receiving system 1000 equipped with a user interface apparatus according to the first embodiment of the present invention.

The digital broadcast receiving system 1000 includes a recording and replaying apparatus 1100, a monitor 1200 for displaying images, and a remote controller 1300 for receiving user instructions and transmitting the received instructions to the digital broadcast receiving apparatus 1100.

The recording and replaying apparatus 1100 includes an infrared ray reception unit. The recording and replaying apparatus 1100 detects a signal that has been transmitted from the remote controller 1300 according to a user instruction using the infrared ray reception unit, executes such functions as receiving a digital broadcast program, recording a received program, and replaying a recorded program in response to the user instruction, and outputs a replayed image or an image for displaying a menu for function selection to the monitor 1200. The recording and replaying apparatus 1100 includes a controller 1110, a recorder 1120, a broadcast receiving antenna 1130, a receiving unit 1140, a coding unit 1150, a replaying unit 1160, and an output unit 1170.

Here, the controller 1110 includes a CPU and a storage unit such as a memory. The controller 1110 realizes a execution control function for controlling the operations by each of the elements in the recording and replaying apparatus 1100 according to the signals transmitted from the remote controller 1300. The storage unit stores a program for the control. More specifically, the controller 1110 receives the information on an Electric Program Guide (EPG) (referred to a "program table" in this specification) from the information that the receiving unit 1140 has received, and outputs the image of the program table according to the received information to the monitor 1200 via the output unit 1170. The controller 1110 has the receiving unit 1140 receive a program on a channel that the user has designated, and controls the detection of programs, the presetting for tuning to programs after the detection, the recording of the history of watched programs, and the test of receiving condition of the broadcast receiving antenna 1130.

Note that a program table includes the program titles, program identifiers including broadcasting time, and other information such as, a genre, a subgenre, a program attribute, players, explanation for each of the programs. The program table for a week is sent once each hour. For instance, the genre of a program is sport, the subgenre is succor or baseball, and the program attribute is a serial.

In addition, the controller 1110 realizes a user interface control function. More specifically, the controller 1110 sends the image of a menu to the output unit 1170 in order to display the menu that is a graphical user interface for the function selection by the user on the monitor 1200.

Note that in each of the menus, a plurality of button images and a cursor are shown. The menus are classified into two groups, i.e., standard menus, which are included in a hierarchical structure, and auxiliary menus, each of which is displayed in a specific condition. Here, a button image is an image of the characters that read the content of a function of the recording and replaying apparatus 1100 as the button images in the description of the prior art.

The recorder 1120 includes a hard disk or a Digital Video Disc-RAM (DVD-RAM). The recorder 1120 stores a huge amount of image data.

The receiving unit 1140 includes a tuner, a system stream decoder and an image and audio decoder of Motion Picture Expert Group (MPEG). The receiving unit 1140 receives digital broadcast programs via the broadcast receiving antenna 1130, demodulates the received programs, and separates a program that the user desires into packets to decode the program. In addition, the receiving unit 1140 receives a program table.

The coding unit 1150 compresses and codes images. The replaying unit 1160 replays the programs recorded in the recorder 1120.

On receiving data for displaying an image from the replaying unit 1160 and the controller 1110, the output unit 1170 compounds the data as necessary and outputs the compounded data as a TV signal to the monitor 1200.

The remote controller 1300 includes a power button 1310 for turn on and off the power of the recording and replaying apparatus 1100, a menu button 1320 for having the monitor 1200 display a standard menu for function selection that is a graphical user interface, cursor buttons 1330, 1340, 1350, and 1360 for moving the cursor on the monitor 1200, a determination button 1370 for determining the selection of a button image, and an auxiliary menu operation button 1380. When the user presses one of the buttons, the remote controller 1300 transmits a signal to the recording and replaying apparatus 1100 for identifying the pressed button.

The auxiliary menu operation button 1380 is used for operating auxiliary menus. The auxiliary menu operation button 1380 includes auxiliary cursor buttons 1382 and 1383 for moving a cursor that is used for selecting a button image on an auxiliary menu and an auxiliary determination button 1381 for determining the selection of a button image.

The functional structure of the controller 1110, which realizes an execute control function and a user interface control function, will be explained below.

Figure 4:
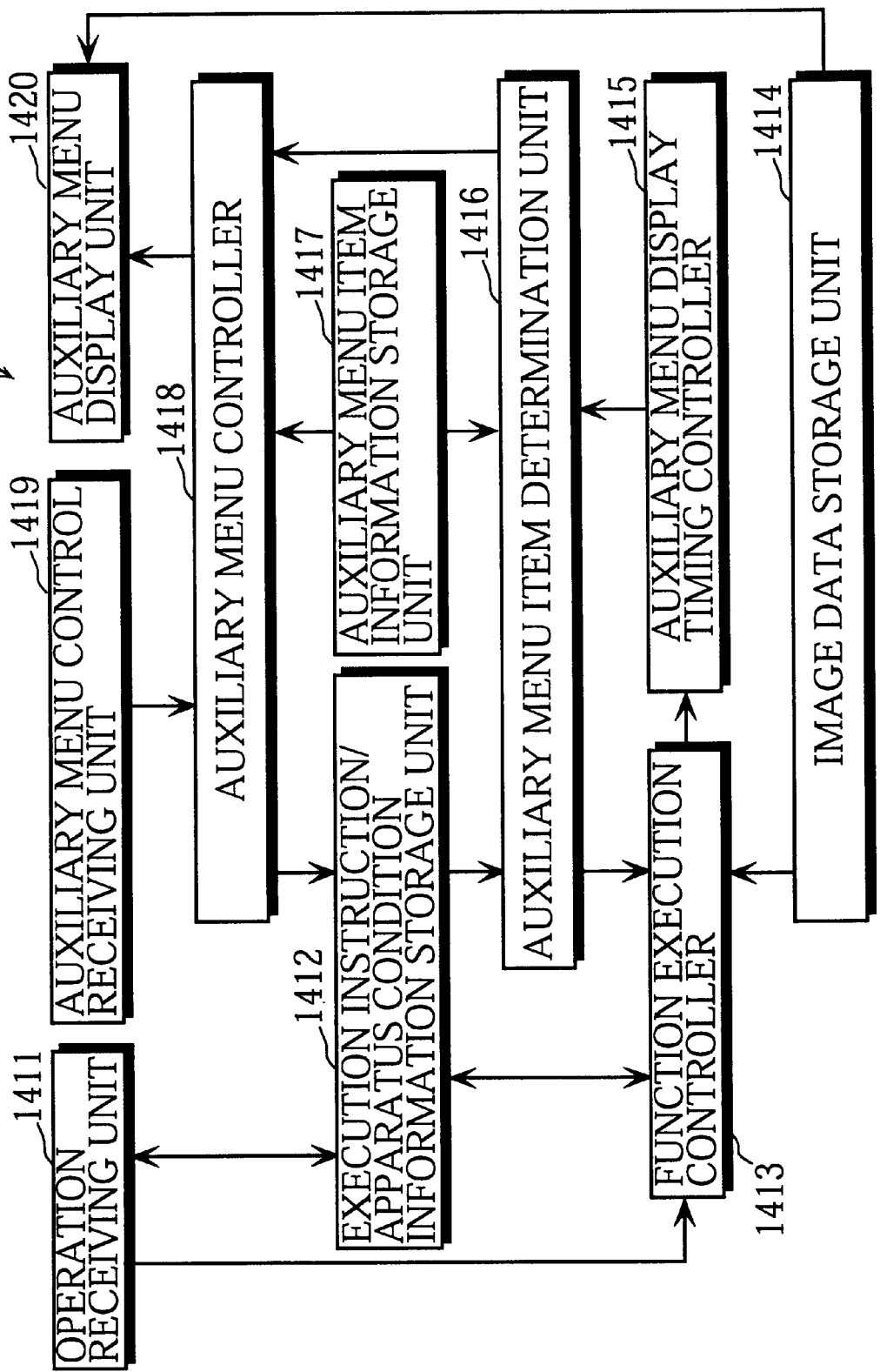
FIG. 4 is a block diagram of a controller 1110 in the digital broadcast receiving system 1000.

FIG. 4 is a functional block diagram of the controller 1110.

The execute control function and the user interface control function of the controller 1110 are realized by an operation receiving unit 1411, an execution instruction/apparatus condition information storage unit 1412, a function execution controller 1413, an image data storage unit 1414, an auxiliary menu display timing controller 1415, an auxiliary menu item determining unit 1416, an auxiliary menu item information storage unit 1417, an auxiliary menu controller 1418, an auxiliary menu control receiving unit 1419, and an auxiliary menu display unit 1420.

The image data storage unit 1414 stores image data in advance for displaying screens for receiving setting information from the user that is necessary for executing standard menus, auxiliary menus, and the functions.

The operation receiving unit 1411 detects a signal transmitted from the remote controller 1300 and refers to standard menu display control information, which will be described later, stored in the execution instruction/apparatus condition information storage unit 1412. The operation receiving unit 1411 instructs the function execution controller 1413 to move the cursor according to user instruction. When the user selects one button image, the operation receiving unit 1411 stores execute control information, which will be described later, in the execution instruction/apparatus condition information storage unit 1412 according to the selected button image.

The function execution controller 1413 refers to the execution instruction/apparatus condition information storage unit 1412, decodes the user instruction, and controls each of the elements in the recording and replaying apparatus 1100 as necessary. By doing so, the function execution controller 1413 executes the function corresponding to the user instruction, and updates the information stored in the execution instruction/apparatus condition information storage unit 1412. Meanwhile, the function execution controller 1413 refers to the image data stored in the image data storage unit 1414 as necessary, and sends the image of the screen to the output unit 1170 for receiving the setting information from the user that is necessary to execute standard menus and the functions.

Here, the content stored in the execution instruction/apparatus condition information storage unit 1412 will be explained with reference to FIGS. 5 and 6.

Figure 5:
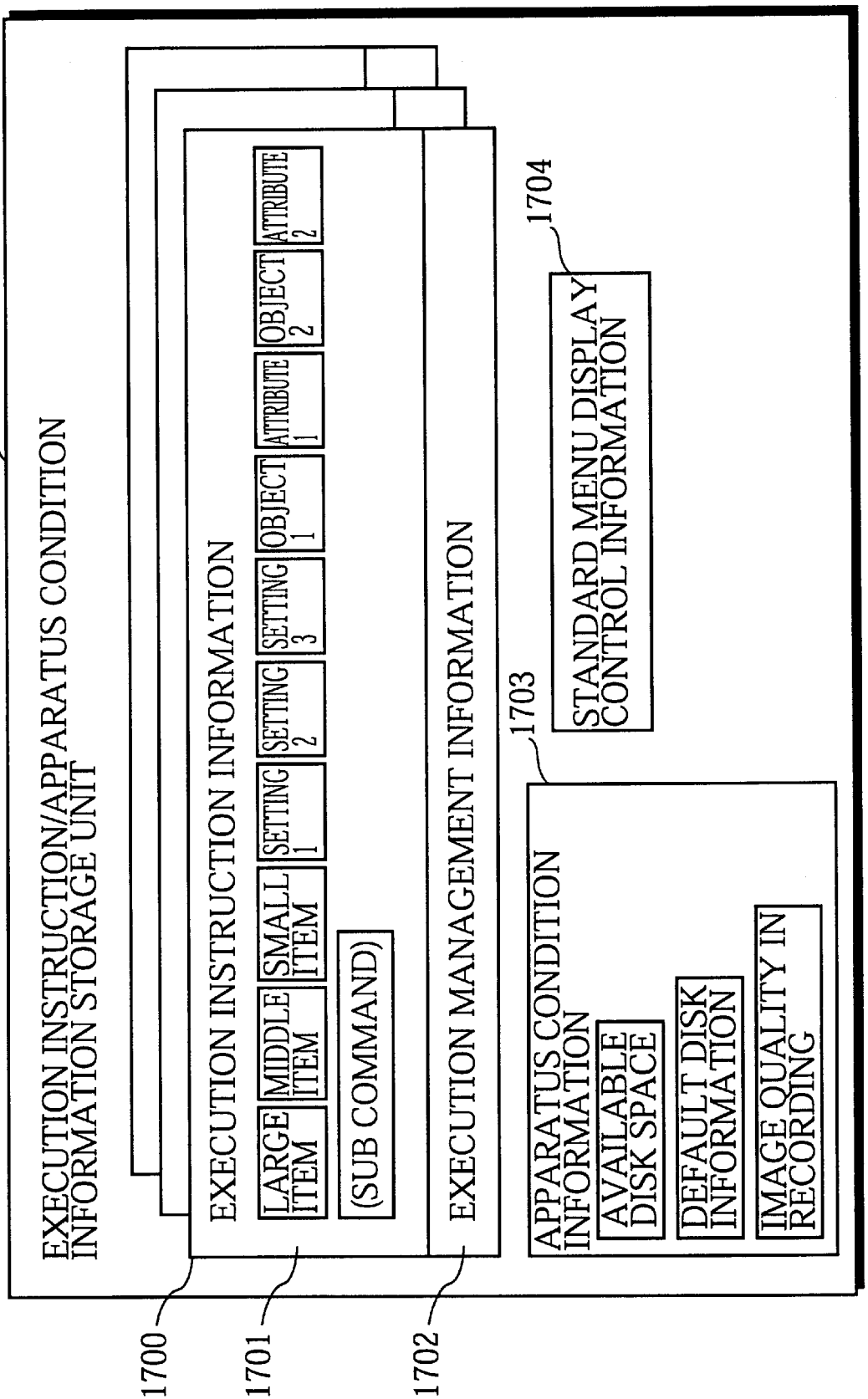
FIG. 5 shows data stored in an execution instruction/apparatus condition information storage unit 1412 in the controller 1110.
Figure 6:
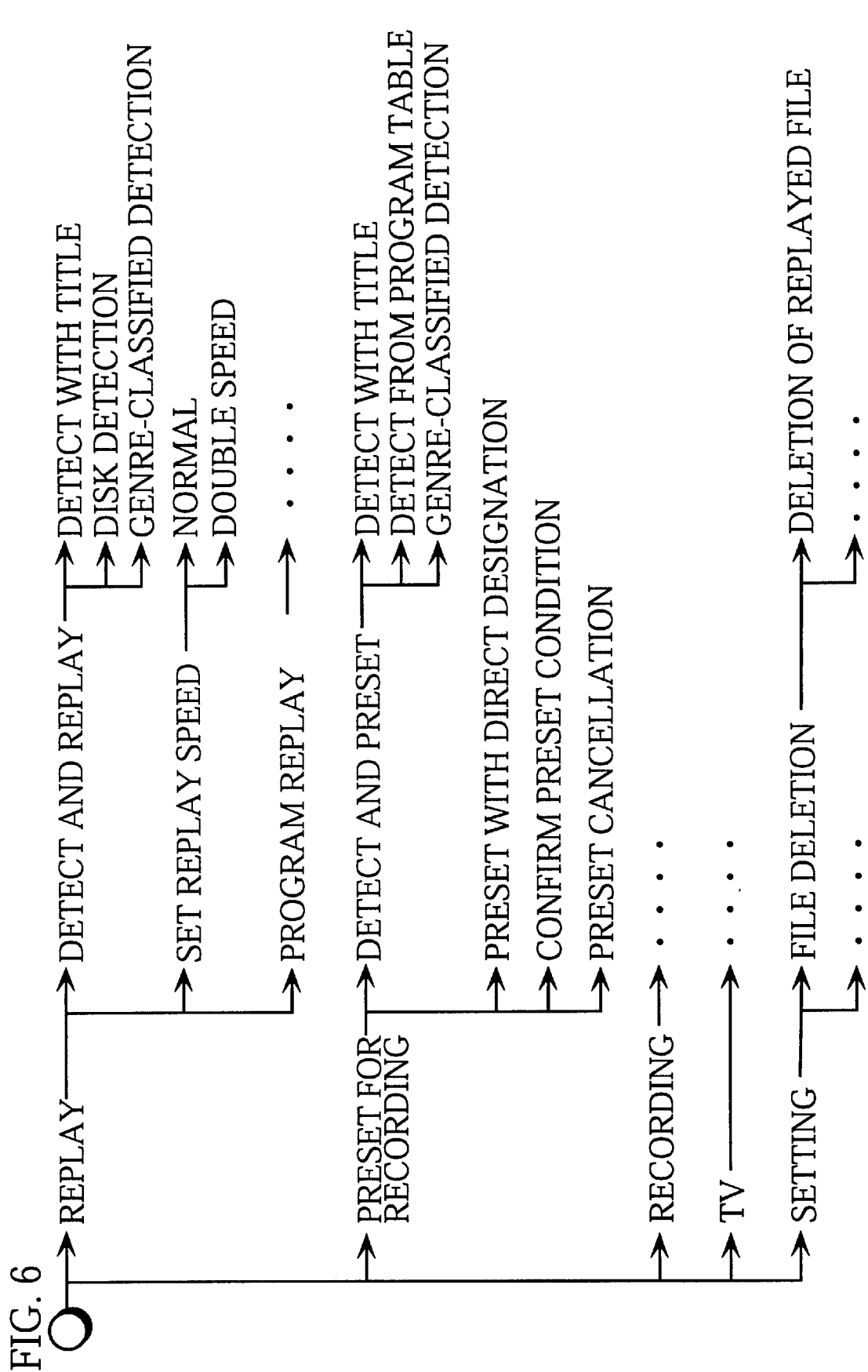
FIG. 6 shows standard menu hierarchical structure information that is included in standard menu display control information stored in the execution instruction/apparatus condition information storage unit 1412.

FIG. 5 shows the data that the execution instruction/apparatus condition information storage unit 1412 stores. FIG. 6 shows the standard menu hierarchical structure information included in the standard menu display control information that is stored in the execution instruction/apparatus condition information storage unit 1412.

As shown in FIG. 5, the execution instruction/apparatus condition information storage unit 1412 stores the execute control information including the standard menu display control information, apparatus condition information, execution instruction information, and execution management information.

The standard menu display control information includes the standard menu hierarchical structure information (refer to FIG. 6) and the information that is updated by the operation receiving unit 1411 and holds the item in a menu indicated by the cursor.

The apparatus condition information includes the information that shows the available disk space, default disk information that shows a selected disk in the recorder 1120, and the information on the image quality in recording. The apparatus condition information is referred to by the function execution controller 1413.

The execute control information is stored by the operation receiving unit 1411 or the auxiliary menu controller 1418. The execute control information is referred to and updated by the function execution controller 1413.

The execution instruction information in the execute control information is the information the value of which is defined according to user instruction. The execution instruction information is necessary to the execution of any function of the recording and replaying apparatus 1100. The execution instruction information includes a large item, a middle item, a small item, a setting 1, a setting 2, a setting 3, an object 1, an attribute 1, an object 2, an attribute 2, and a sub command. Note that the sub command is a command description, in which a function that is to be immediately executed is described. The sub command is needed only when one piece of the information of the setting 1 to the attribute 2 is determined by the execution of the sub command.

Here, the functions to be executed are classified into large, middle, and small items according to the hierarchical structure of the standard menus, and values are defined in advance for identifying the functions. In each of the large, middle, small items in the execution instruction information, one of the defined values is stored according to user selection.

The settings 1, 2, and 3 correspond to the large, middle, and small items, respectively. The objects 1 and 2 are the information that show the objects of the function to be executed. The attributes 1 and 2 are the information that show the characteristics and the like of the objects 1 and 2, respectively.

The execution management information in the execute control information corresponds to the execution instruction information that has been described, and shows the present operating stage of the function that is shown by the execution instruction information. More specifically, the execution management information has a value showing each of "not decoded", "wait for execution", "now executing", and "executed". Here, the "not decoded" means that the execution instruction information has not been decoded.

Note that a plurality of pieces of execute control information may be stored in the execution instruction/apparatus condition information storage unit 1412. When the number of pieces of execute control information for which the execution management information has the value showing "executed" is larger than a predetermined number, the function execution controller 1413 deletes a piece of execute control information for which the function was executed earlier than any other piece of execute control information.

Figure 7:
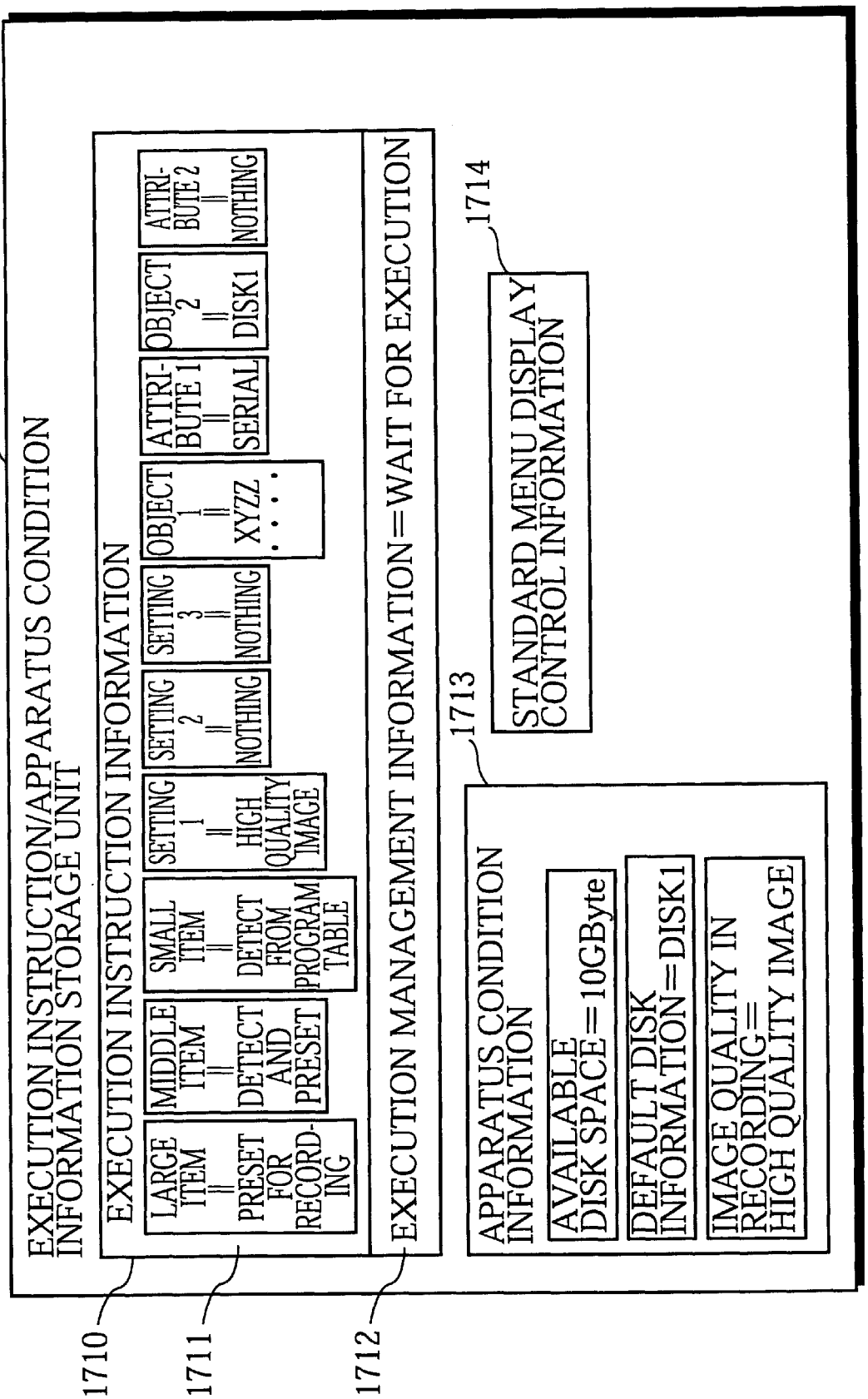
FIG. 7 shows an example of data that the execution instruction/apparatus condition information storage unit 1412 stores.

FIG. 7 shows an example of data that the execution instruction/apparatus condition information storage unit 1412 stores.

FIG. 7 shows a specific example of the information stored in the execution instruction/apparatus condition information storage unit 1412 except for the standard menu display control information. More specifically, FIG. 7 shows the condition that one piece of execute control information is stored in the execution instruction/apparatus condition information storage unit 1412.

In this example, the large item in the execution instruction information is "preset for recording", the middle item is "detect and preset", the small item is "detect from program table", the setting 1 is "high quality image", the settings 2 and 3 are "nothing", the object 1 is "XYZZ . . . (for instance, the date for recording)", the object 2 is "disk 1", the attribute 2 is "nothing", and no sub command is set. The execution management information shows "wait for execution". In the apparatus condition information, the available disk space is "10 GByte", the default disk information is "disk 1", and the image quality in recording is "high quality". Note that actually represented by binary codes, the "preset for recording" and the like are represented by characters in the interest of simplicity of explanation.

The elements that realize the functions of the controller 1110 will be again explained below.

The auxiliary menu display timing controller 1415 is informed of the wait for and the completion of the execution of the function corresponding to user instruction by the function execution controller 1413. The auxiliary menu display timing controller 1415 instructs the auxiliary menu item determining unit 1416 to start determining the items of an auxiliary menu with the timing related to the information from the function execution controller 1413.

The auxiliary menu item determining unit 1416 determines the items of the auxiliary menu, and instructs the function execution controller 1413 to update the apparatus condition information in the execution instruction/apparatus condition information storage unit 1412. The auxiliary menu item determining unit 1416 determines the items on the auxiliary menu by referring to the execution instruction/apparatus condition information storage unit 1412 and the auxiliary menu item information storage unit 1417, and informs the auxiliary menu controller 1418 of the determined auxiliary menu items.

Note that the auxiliary menu item determining unit 1416 determines as many auxiliary menu items as possible subject to a maximum of five. As a result, the auxiliary menu has five auxiliary menu items at the maximum.

On instructed by the auxiliary menu controller 1418, the auxiliary menu display unit 1420 obtains the image that is necessary to display the auxiliary menu on the monitor 1200 by referring to the image data storage unit 1414, and sends the obtained image to the output unit 1170.

The auxiliary menu control receiving unit 1419 detects user operation of the auxiliary menu operation button 1380 and informs the auxiliary menu controller 1418 of the detected operation.

The auxiliary menu controller 1418 instructs the auxiliary menu display unit 1420 to display the auxiliary menu including the items that have been informed of by the auxiliary menu item determining unit 1416. The auxiliary menu controller 1418 instructs the auxiliary menu display unit 1420 to move the cursor according to the user instruction that has been informed of by the auxiliary menu control receiving unit 1419. When the user instructs to select a button image on the auxiliary menu, the auxiliary menu controller 1418 stores the execute control information in the execution instruction/apparatus condition information storage unit 1412 for realizing the function of the recording and replaying apparatus 1100 corresponding to the selected button image.

The data that the auxiliary menu item information storage unit 1417 stores will be explained below.

Figure 8:
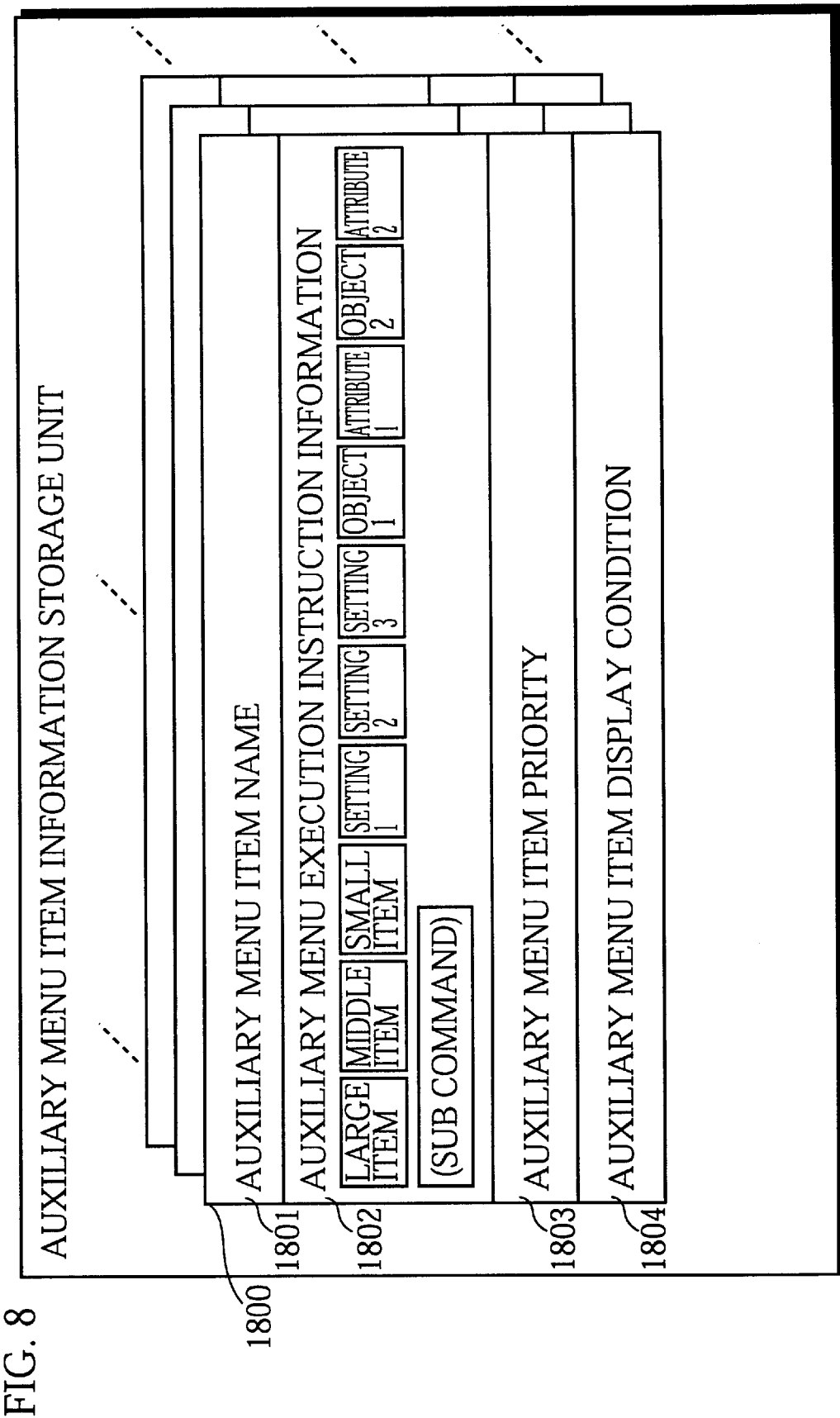
FIG. 8 shows the data that the auxiliary menu item information storage unit 1417 stores.

FIG. 8 shows the data that the auxiliary menu item information storage unit 1417 stores.

As shown in FIG. 8, the auxiliary menu item information storage unit 1417 stores in advance auxiliary menu item information, each piece of which is necessary to control the display of an auxiliary menu item, for a plurality of predetermined prospective auxiliary menu items.

The auxiliary menu item information is referred to by the auxiliary menu item determining unit 1416 and the auxiliary menu controller 1418. A piece of auxiliary menu item information includes an auxiliary menu item name, a piece of auxiliary menu execution instruction information, an auxiliary menu item priority, and an auxiliary menu item display condition.

An auxiliary menu item name is character string that is written on a button image on the auxiliary menu, and shows the content of the function of the function of the recording and replaying apparatus that is executed when the user select the button image.

A piece of auxiliary menu execution instruction information instructs the recording and replaying apparatus 1100 of the execution related to the function that is to be executed when the corresponding button image is selected by the user. A piece of auxiliary menu execution instruction information has the same content as a piece of execution instruction information that is stored in the execution instruction/apparatus condition information storage unit 1412.

An auxiliary menu item display condition shows the information on the condition on which the corresponding auxiliary menu item is displayed. An auxiliary menu item display condition shows the condition on the contents of a piece of execute control information and apparatus condition information.

An auxiliary menu item priority is referred to when the auxiliary menu item determining unit 1416 determines whether the corresponding prospective auxiliary menu item is selected as an auxiliary menu item. Prospective auxiliary menu items are selected in order of the auxiliary menu item priorities.

Figure 9:
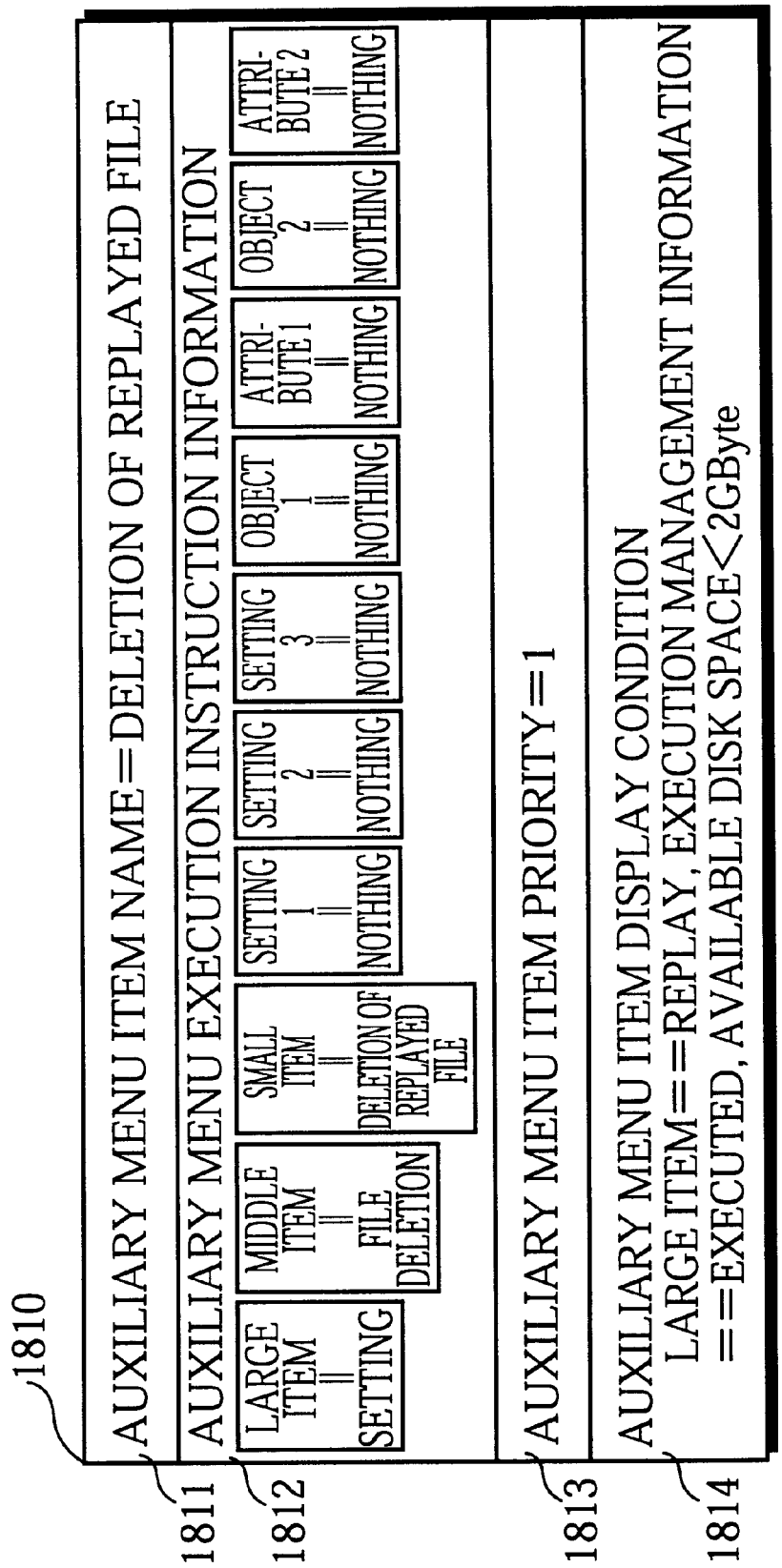
FIG. 9 shows an example of the auxiliary menu item information stored in the auxiliary menu item information storage unit 1417.
Figure 10:
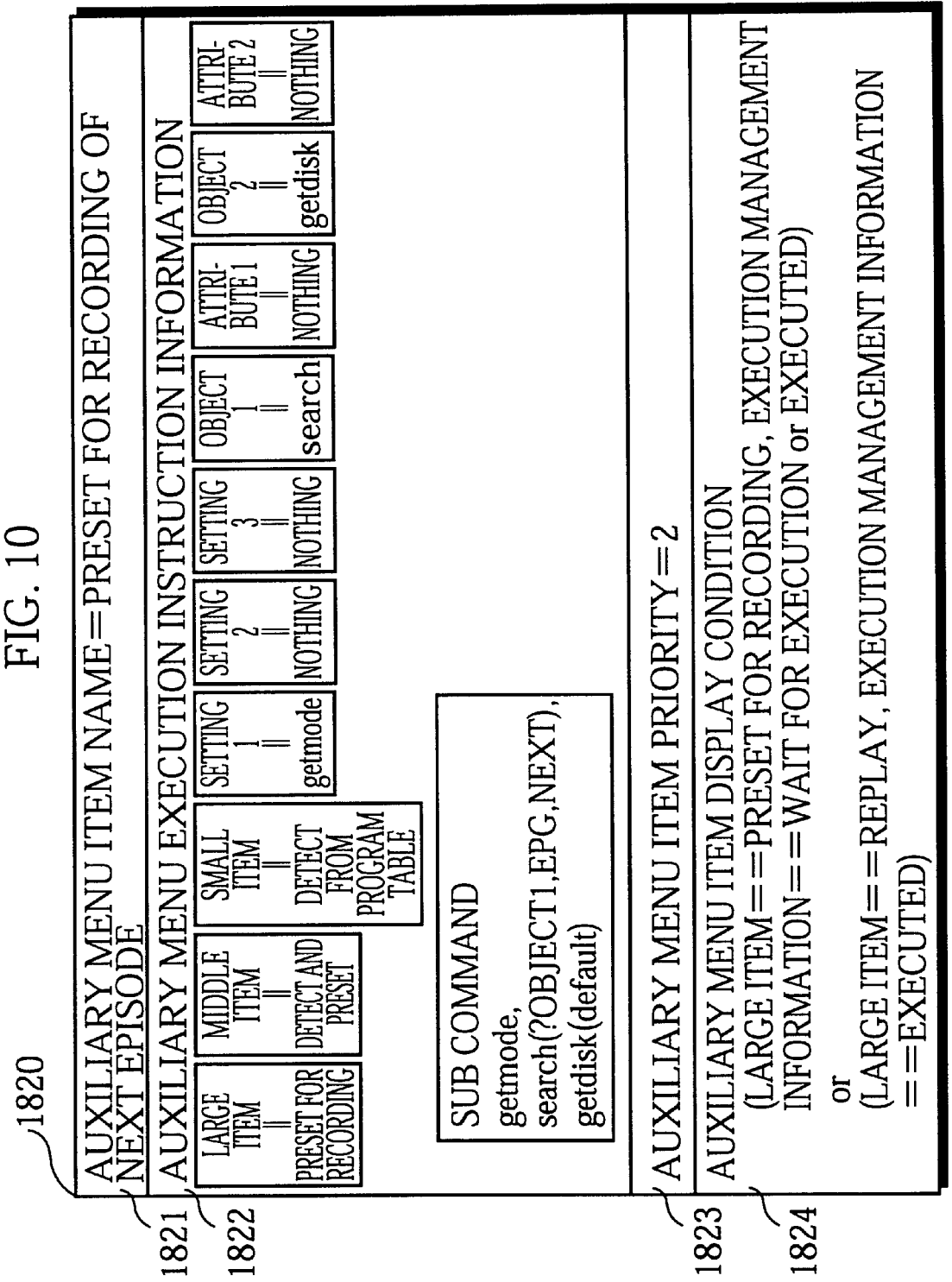
FIG. 10 shows an example of the auxiliary menu item information stored in the auxiliary menu item information storage unit 1417.

FIGS. 9 and 10 show examples of the auxiliary menu item information stored in the auxiliary menu item information storage unit 1417.

In an auxiliary menu item information 1810 in FIG. 9, the auxiliary menu item name is a character string "deletion of replayed file". In the auxiliary menu execution instruction information, the large item is "setting", the middle item is "file deletion", the small item is "deletion of replayed file", and the settings 1, 2, and 3, the attributes 1 and 2, and the objects 1 and 2 are "nothing". The auxiliary menu item priority is "1", and the auxiliary menu item display condition is "large item==replay, execution management information==executed, available disk space<2 GByte".

Here, the "==" shows equivalence. While actually represented by binary data, the data except for the auxiliary menu item name are represented by characters in the interest of simplicity of explanation.

The auxiliary menu item information 1810 shows that the replay has been executed and the available disk space is less than 2 gigabytes, i.e., the auxiliary menu item information 1810 means that an item "deletion of replayed file" may be shown on the auxiliary menu.

In an auxiliary menu item information 1820 shown in FIG. 10, the auxiliary menu item name is a character string "preset for recording of next episode". In the auxiliary menu execution instruction information, the large item is "preset for recording", the middle item is "detect and preset", the small item is "detect from program table", the setting" is "getmode", the settings 2 and 3 are "nothing", the object 1 is "search", the attribute 1 is "nothing", the object 2 is "getdisk", the attribute 2 is "nothing", and the sub command is "getmode, search (?object1, EPG, NEXT), getdisk (default)". The auxiliary menu item priority is "2", and the auxiliary menu item display condition is "(large item== preset for recording, execution management information== wait for execution or executed) or (large item==replay, execution management information==executed)".

Here, in the sub command, the function that is to be immediately executed in order to supplement the information in the large item to the attribute 2. More specifically, the "getmode" is a function of obtaining a set image quality in recording. The "search(?object 1, EPG, NEXT)" is a function of retrieving the information on the next episode of the program that is shown by the "?object 1" from the program table of digital broadcast programs. The "getdisk(default)" is a function of obtaining the default disk information. Note that the "?object 1" is the copy of the value of the object 1 in a piece of execution instruction information when the auxiliary menu item determining unit 1416 judges that the content of the piece of execution instruction information in the execution instruction/apparatus condition information storage unit 1412 satisfies the auxiliary menu item display condition.

The auxiliary menu item information 1820 means that the item "preset for recording of next episode" may be displayed on the auxiliary menu when the execution of a preset for recording is waited for or completed, or when a replay is executed.

(Operation)

The operation by the digital broadcast receiving system 1000, the structure of which has been described, will be explained below.

The recording and replaying apparatus 1100 records and replays digital broadcast programs under the control of the controller 1110.

The recording by the recording and replaying apparatus 1100 is realized when the receiving unit 1140 receives the radio waves that multiplex the information on broadcast programs and the like via the broadcast receiving antenna 1130, extracts the information on a desired program, compresses and encodes the extracted information in the coding unit 1150, and stores the information in the recorder 1120.

The replaying by the recording and replaying apparatus 1100 is realized when the replaying unit 1160 fetches the information on a program that is stored in the recorder 1120, and outputs the fetched information to the monitor 1200 via the output unit 1170.

The controller 1110 displays a standard menu and a following screen for user input to receive user instruction, and execute a function such as recording and replaying according to the user instruction. In addition, the controller 1110 predicts the function that is to be desired by the user next, and provides a user interface as the auxiliary menu so that the user would select the function. Here, "to predict" means to identify a function that is not directly indicated by the user.

The operation by the digital broadcast receiving system 1000 will be described in detail, focusing on the operation by the controller 1110 that displays the auxiliary menu and has the recording and replaying apparatus 1100 execute functions of recording, replaying, and the like.

In the explanation, the user is supposed to preset the recording and replaying apparatus 1100 to record a serial.

When the user presses the menu button 1320 on the remote controller 1300, the remote controller 1300 transmits the signal for indicating that the menu button 1320 has been pressed. The operation receiving unit 1411 in the controller 1110 detects the signal, and demands the function execution controller 1413 to display a standard menu.

Then, the function execution controller 1413 transmits the image for displaying the standard menu to the output unit 1170 using image data that is stored in the image data storage unit 1414.

As a result, the output unit 1170 outputs a TV signal to the monitor 120C, and the standard menu is displayed on the monitor 1200.

When the user presses the cursor button 1350 after the display of the standard menu on the monitor 1200, the remote controller 1300 transmits the signal for indicating that the cursor button 1350 has been pressed. The operation receiving unit 1411 in the controller 1110 detects the transmitted signal, updates the information that holds the cursor location in the standard menu display control information that is stored in the execution instruction/apparatus condition information storage unit 1412, and instructs the function execution controller 1413 to move the cursor.

On receiving the instruction, the function execution controller 1413 displays the image on the monitor 1200 via the output unit 1170 in which the cursor moves down one line.

Figure 11:
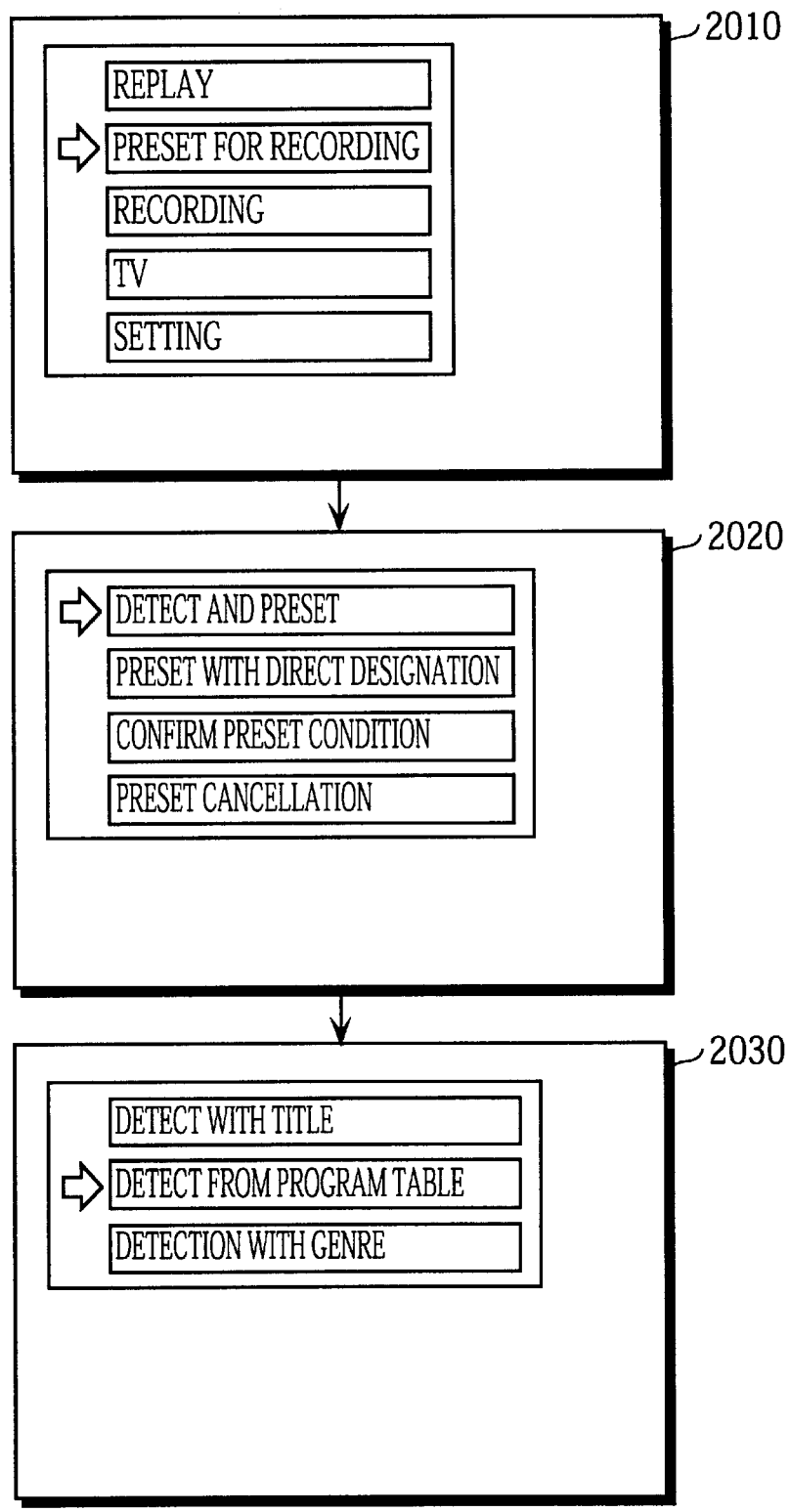
FIG. 11 shows the change of the screen on a monitor 1200 according to user instruction.

As a result, the monitor 1200 displays the standard menu in a screen condition 2010 in FIG. 11.

FIG. 11 shows the change of the screen on the monitor 1200 according to user instruction.

When the user presses the determination button 1370 after the monitor 1200 has displayed the standard menu in the screen condition 2010, the remote controller 1300 transmits the signal for indicating that the determination button 1370 has been pressed. The operation receiving unit 1411 in the controller 1110 detects the transmitted signal, refers to the standard menu display control information that is stored in the execution instruction/apparatus condition information storage unit 1412, and demands the function execution controller 1413 to display the function items that are included in the menu just below the item "preset for recording" (refer to FIG. 6), which the cursor indicates.

On receiving the demand, the function execution controller 1413 displays a standard menu in a screen condition 2020 in FIG. 11 on the monitor 1200 via the output unit 1170 using image data stored in the image data storage unit 1414.

The processing below is similar to the processings that have been described. When the user presses the determination button 1370, the function items that are included in the menu just below the item "detect and preset" (refer to FIG. 6) are displayed on the monitor 1200. When the user further presses the cursor button 1350, the screen on the monitor 1200 is in a screen condition 2030 in FIG. 11.

When the monitor displays the screen in the screen condition 2030, and when the user presses the determination button 1370, the operation receiving unit 1411 detects the signal transmitted from the remote controller 1300, refers to the standard menu display control information that is stored in the execution instruction/apparatus condition information storage unit 1412, and stores a piece of execute control information in the execution instruction/apparatus condition information storage unit 1412.

Here, the piece of execute control information that the operation receiving unit 1411 stores in the execution instruction/apparatus condition information storage unit 1412 (refer to FIG. 5) includes execution management information "not decoded" and execution instruction information in which the large item is "preset for recording", the middle item is "detect and preset", the small item is "detect from program table", and the settings 1, 2, and 3, the objects 1 and 2, and the attributes 1 and 2 are "nothing".

The piece of execute control information that the operation receiving unit 1411 has stored in the execution instruction/apparatus condition information storage unit 1412 is decoded by the function execution controller 1413.

The operation by the function execution controller 1413 will be explained below.

Figure 12:
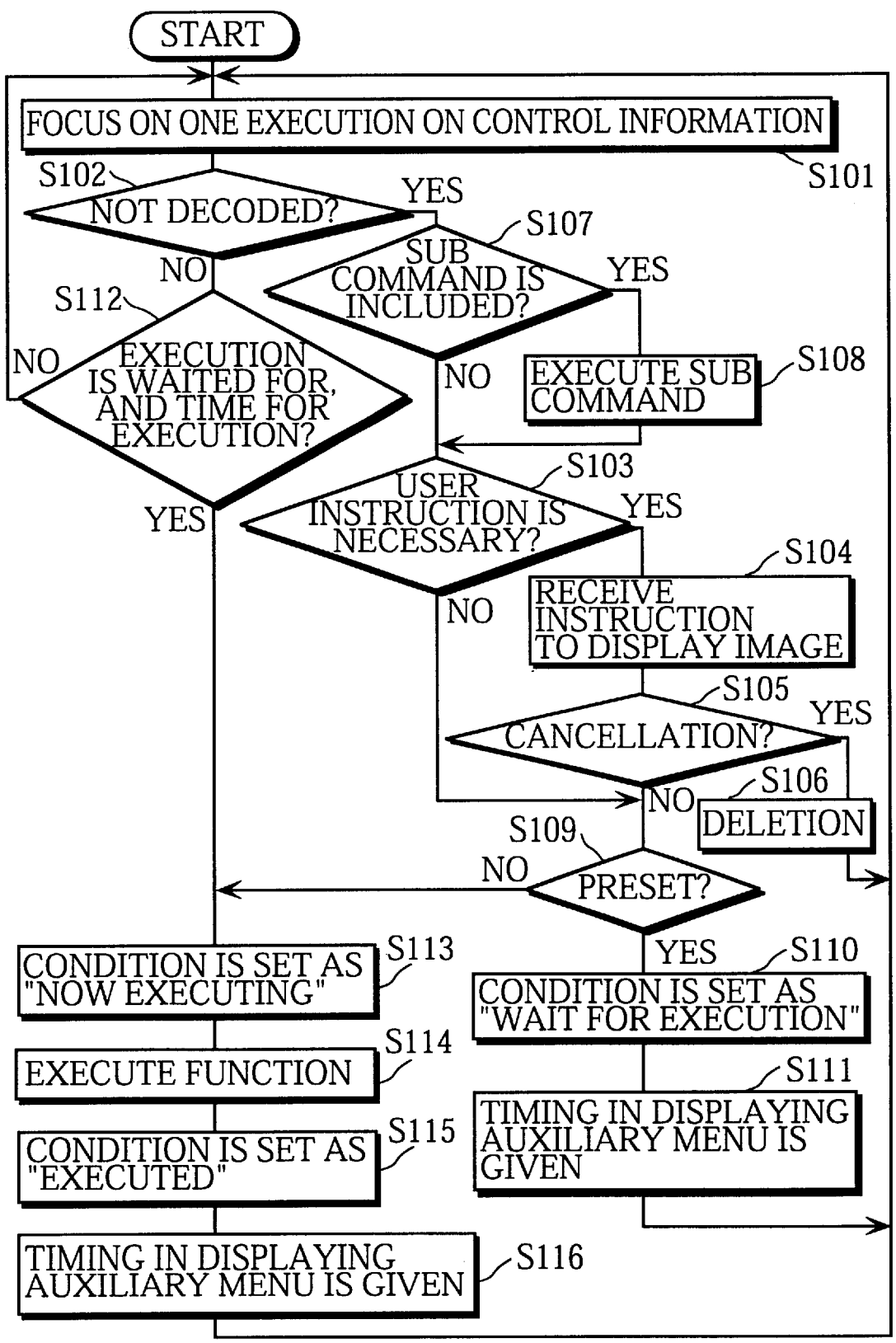
FIG. 12 is a flowchart showing the operation by a function execution controller 1413 related to execute control information.

FIG. 12 is a flowchart showing the operations by the function execution controller 1413 related to execute control information.

The function execution controller 1413 performs other operations that are not shown in FIG. 12 in parallel with the operations shown in FIG. 12.

When at least one piece of execute control information is stored in the execution instruction/apparatus condition information storage unit 1412, the function execution controller 1413 focuses on one piece of execute control information (step S101) and judges whether the execution management information in the piece of execute control information is "not decoded" (step S102).

When the execution management information is "not decoded", the function execution controller 1413 judges whether a sub command is included in the execution instruction information in the execute control information (step S107). When a sub command is included in the execution instruction information, the function execution controller 1413 performs a function according to the sub command and updates the execution instruction information (step S108).

After the processes related to the sub command (steps S107 and S108), the function execution controller 1413 judges whether the execution instruction information is imperfect and whether user instruction is necessary to complete the execution instruction information (step S103). For the judgement at step S103, the function execution controller 1413 uses the fact that the value corresponding to "nothing" is set for the setting 1 and the contents of the large, middle, and small items in the execution instruction information.

When judging that user instruction is necessary at step S103, the function execution controller 1413 obtains the image data from the image data storage unit 1414 and the receiving unit 1140 that is necessary to the function identified by the execution instruction information in order to encourage user operation, and displays the image for input on the monitor 1200 via the output unit 1170. The function execution controller 1413 obtains the information that the user has input via the operation receiving unit 1411 (step S104).

At step S104, on receiving user input, the operation receiving unit 1411 updates the contents of the setting 1 to the attribute 2 in the execution instruction information in the execute control information stored in the execution instruction/apparatus condition information storage unit 1412 according to the user input. When the user selects the cancellation of the function, the operation receiving unit 1411 informs the function execution controller 1413 of the cancellation.

When informed of the function cancellation by the user from the operation receiving unit 1411 at step S104 (step S105), the function execution controller 1413 deletes the execute control information that has been focused on (step S106), and focuses on another piece of execute control information (step S101).

When judging that user instruction is not necessary at step S103, or when the cancellation is not selected at step S105, the function execution controller 1413 judges whether the function that is shown by the large, middle, and small items in the execution instruction information is a preset function, which is not immediately executed (step S109). For instance, a "preset for recording" is a function that includes the waiting state before the recording. As a result, the result of the judgement at step S109 for a "preset for recording" is "yes".

When judging that the function is a preset function at step S109, the function execution controller 1413 changes the execution management information as "wait for execution", and informs the auxiliary menu display timing controller 1415 of the timing in starting the process for displaying the auxiliary menu (step S111). The process returns to step S101.

Note that the timing of the change of the execution management information to "wait for execution" corresponds to the timing of the completion of the user operation of the recording and replaying apparatus 1100 for one function.

Meanwhile, when judging that the execution management information is not "not decoded" at step S102, the function execution controller 1413 judges whether the execution management information is "wait for execution" and whether it is the time for execution from the content of the execution instruction information (step S112).

When the result of the judgement at step S112 is "no", the process returns to step S101.

When the result of the judgement at step S112 is "yes", the function execution controller 1413 changes the execution management information in the execute control information to "now executing" (step S113), and executes the function that is identified by the execution instruction information in the execute control information (step S114).

After executing the function at step S114, the function execution controller 1413 changes the execution management information in the execute control information to "executed" (step S115), and informs the auxiliary menu display timing controller 1415 of the timing in starting the process for displaying the auxiliary menu (step S116). The process returns to step S101.

Note that the function execution controller 1413 detects the completion of the function by the elements in the recording and replaying apparatus 1100 by receiving signals from the elements that inform of the completion of the function, for instance. After detecting the completion of the function, the function execution controller 1413 sets the execution management information as "executed".

The operation by the function execution controller 1413 under the condition described below will be explained. The condition is that the user selects the function "detect from program table" in the screen in the screen condition 2030 in FIG. 11, and the operation receiving unit 1411 stores the execute control information that has been described in the execution instruction/apparatus condition information storage unit 1412.

The operation by the function execution controller 1413 focuses on the execute control information in which the large item in the execution instruction information is "preset for recording", the middle item is "detect and preset", the small item is "detect from program table", and the setting 1 to the attribute 2 are "nothing", and the execution arrangement information is "not decoded" (step S101).

The function execution controller 1413 judges that the execution management information is "not decoded" (step S102) and that no sub command is included (step S107). Finding that the setting 1 and the like are "nothing", the function execution controller 1413 judges that user instruction is necessary (step S103). Responding to the small item "detect from program table", the function execution controller 1413 controls the receiving unit 1140 so that the program table data would be obtained and an image would be generated. The function execution controller 1413 displays the image on the monitor 1200 via the output unit 1170, and receives user operation via the operation receiving unit 1411 (step S104).

Figure 13:
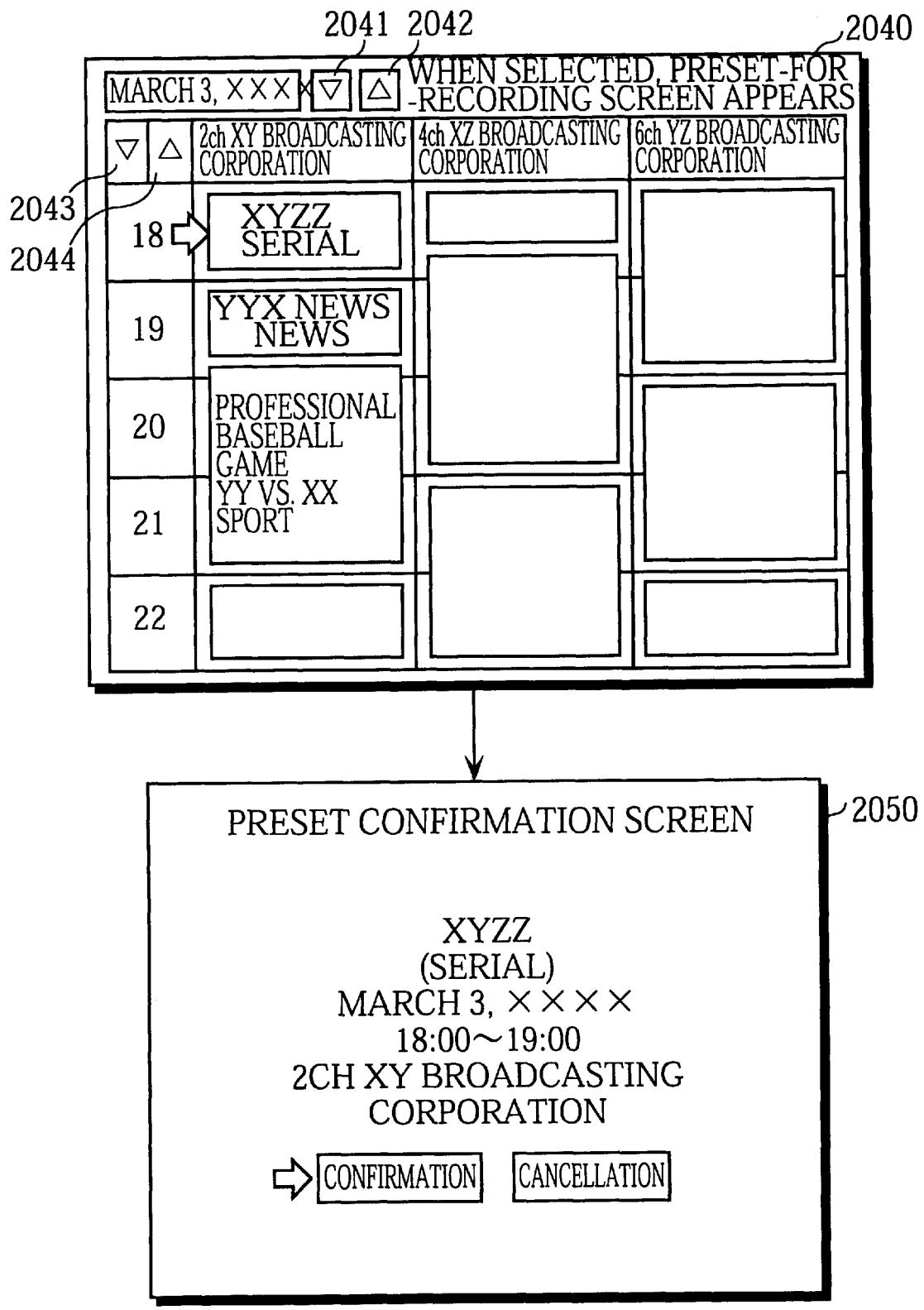
FIG. 13 shows the change of the screen on a monitor 1200 after the screen change shown in FIG. 11.

As a result, the screen in an image condition 2040 in FIG. 13 is displayed on the monitor 1200.

FIG. 13 shows the change of the screen on the monitor 1200 after the screen change shown in FIG. 11.

The screen condition 2040 in FIG. 13 includes date change button images 2041 and 2042 for changing date, and time slot change button images 2043 and 2044 for scrolling the program table up and down on the screen.

The user moves the cursor location on the screen at the date change button image 2041 or 2042 using the cursor buttons 1330, 1340, 1350, and 1360 on the remote controller 1300, and sets a desired date by pressing the determination button 1370. In a similar way, the time slot change button image 2043 or 2044 is selected and desired time slots are set. As a result, programs displayed on the screen are changed. The program display change is realized when the operation receiving unit 1411 directly instructs the function execution controller 1413 to change images.

Suppose that the user wants to preset the recording and replaying apparatus 1100 to record a serial "XYZZ", positions the cursor location at the arrow in the screen condition 2040 in FIG. 13 using the cursor buttons 1330, 1340, 1350, and 1360 on the remote controller 1300, and presses the determination button 1370.

On receiving the user operation, the operation receiving unit 1411 updates the execution instruction information stored in the execution instruction/apparatus condition information storage unit 1412 according to the information that the user has selected, and has the monitor 1200 display the image in an screen condition 2050 in FIG. 13 via the function execution controller 1413.

When the user selects the "confirmation" in the image in the screen condition 2050, the operation receiving unit 1411 receives the user selection and informs the function execution controller 1413 of the selection.

The function execution controller 1413 judges that the "cancellation" has not selected (step S105), refers to the execute control information, and judges that a preset function has been instructed (step S109).

In this example, the user selects the functions "preset for recording", "detect and preset", and "detect from program table". As a result, the function execution controller 1413 judges that a preset function has been selected at step S109, changes the execution management information in the execute control information stored in the execution instruction/apparatus condition information storage unit 1412 to "wait for execution" (step S110), and gives the auxiliary menu display controller 1415 the timing in starting the process for displaying the auxiliary menu (step S111). Then, the process returns to step S101.

As a result, the execute control information is that shown in FIG. 7.

The auxiliary menu display timing controller 1415, which has been given the timing in starting the process for displaying the auxiliary menu by the function execution controller 1413, instructs the auxiliary menu item determining unit 1416 to determine the auxiliary menu items that are to be included on the auxiliary menu when a predetermined time (for instance, a few seconds) has elapsed since the timing.

The operation related to the display of the auxiliary menu by the controller 1110 after the auxiliary menu item determining unit 1416 is instructed to determined the auxiliary menu items by the auxiliary menu display timing controller 1415 will be explained below.

Figure 14:
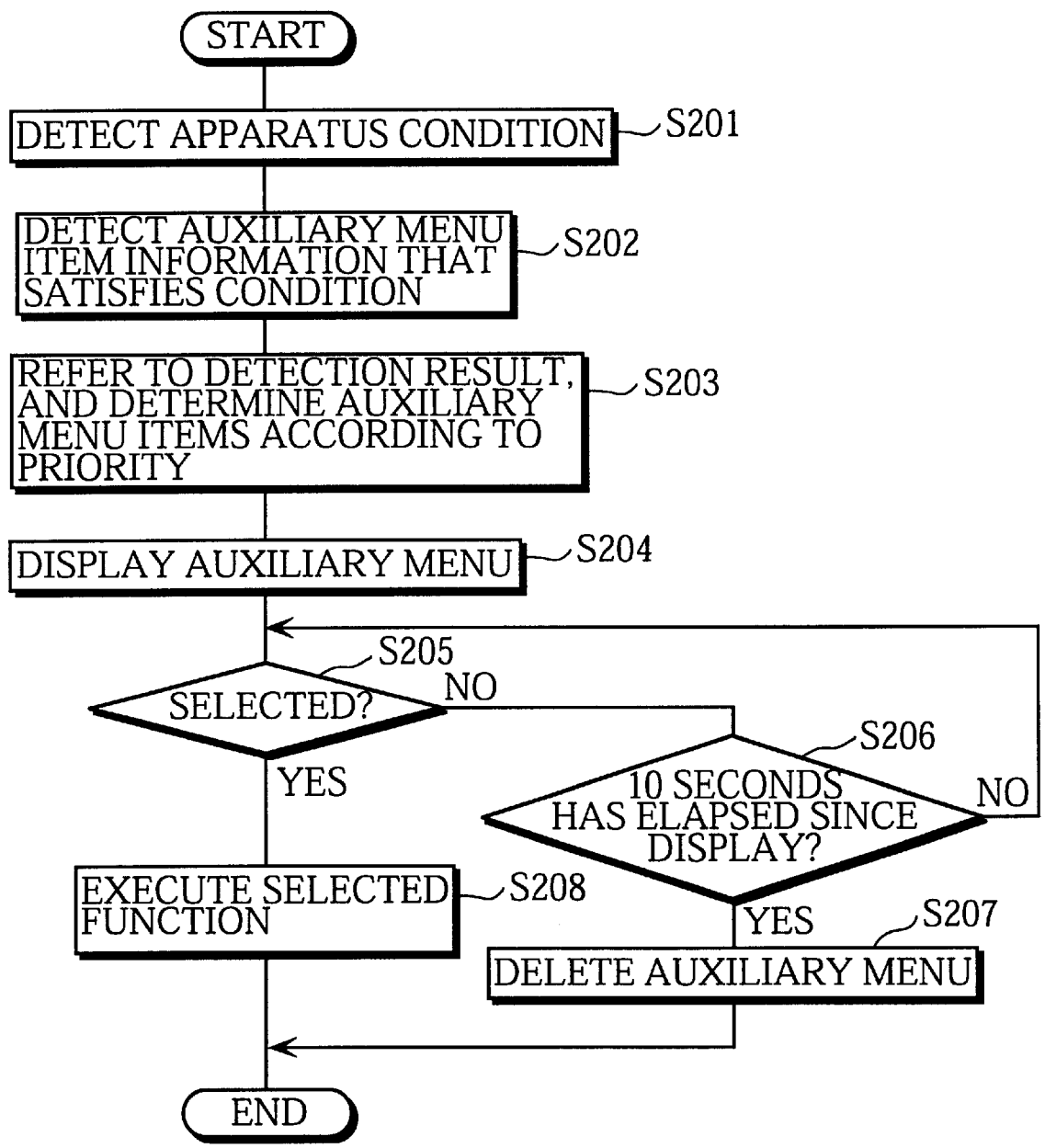
FIG. 14 is a flowchart showing the process related to the display of an auxiliary menu by the controller

FIG. 14 is a flowchart showing the process related to the display of the auxiliary menu by the controller 1110.

When receiving the instruction to determine the auxiliary menu items on the auxiliary menu from the auxiliary menu display timing controller 1415, the auxiliary menu item determining unit 1416 demands the function execution controller 1413 to detect the present apparatus condition and to update the apparatus condition information in the execution instruction/apparatus condition information storage unit 1412 (refer to FIG. 5) (step S201).

On receiving the demand, the function execution controller 1413 controls the elements in the recording and replaying apparatus 1100 to detect the present condition of the recording and replaying apparatus 1100, updates the apparatus condition information according to the detected apparatus condition.

After the update of the apparatus condition information, the auxiliary menu item determining unit 1416 refers to the execute control information and the apparatus condition information stored in the execution instruction/apparatus condition information storage unit 1412, and detects the auxiliary menu item information whose auxiliary menu item display conditions are satisfied in the auxiliary menu item information stored in the auxiliary menu item information storage unit 1417 (refer to FIG. 8) (step S202).

After the detection, the auxiliary menu item determining unit 1416 refers to the auxiliary menu item priorities of the detected auxiliary menu item information, and select as many auxiliary menu items as possible within five to determine the auxiliary menu items displayed on the auxiliary menu (step S203).

After determining the auxiliary menu items, the auxiliary menu item determining unit 1416 informs the auxiliary menu controller 1418 of the information for identifying the selected auxiliary menu items. Note that when finding that the information indicating to fetch a piece of information in the execution instruction information that satisfies the condition during the detection of the desired auxiliary menu item information, for instance, "?object 1" (refer to FIG. 10), the auxiliary menu item determining unit 1416 informs the auxiliary menu controller 1418 of the value of the piece of information.

Meanwhile, when finding no desired auxiliary menu item information at step S202, the auxiliary menu item determining unit 1416 informs the auxiliary menu controller 1418 of nothing. Then, the process related to the display of the auxiliary menu is completed.

On receiving information from the auxiliary menu item determining unit 1416, the auxiliary menu controller 1418 refers to the auxiliary menu item information storage unit 1417, and displays the image of the auxiliary menu via the auxiliary menu display unit 1420 (step S204).

More specifically, image data is transmitted from the auxiliary menu display unit 1420 to the output unit 1170, and a TV signal is output from the output unit 1170 to the monitor 1200. As a result, the auxiliary menu is displayed on the monitor 1200.

After displaying the auxiliary menu, the auxiliary menu controller 1418 receives user operation via the auxiliary menu control receiving unit 1419, and controls cursor movement and the like according to the user operation. The auxiliary menu controller 1418 judges whether the user has selected a button image on the auxiliary menu (step S205). When receiving no user operation after 10 seconds have lapsed since the display of the auxiliary menu or a cursor movement (step S206), the auxiliary menu controller 1418 deletes the auxiliary menu (step S207).

Meanwhile, when judging that the user has selected one button image (step S205), the auxiliary menu controller 1418 stores execute control information in the execution instruction/apparatus condition information storage unit 1412 so that the function that has been selected by the user would be executed. The function execution controller 1413 controls the elements in the recording and replaying apparatus 1100 according to the stored execute control information to execute the selected function (step S208).

Note that when storing the execute control information in the execution instruction/apparatus condition information storage unit 1412 at step S208, the auxiliary menu controller 1418 uses the auxiliary menu execution instruction information in the auxiliary menu item information as the execution management information and "uncoded" as the execution management information.

The process shown in the flowchart in FIG. 14 will be explained with reference to a specific example.

Suppose that the auxiliary menu item information storage unit 1417 stores a plurality of pieces of auxiliary menu item information as well as the auxiliary menu item information shown in FIGS. 9 and 10.

On receiving an instruction from the auxiliary menu display timing controller 1415, the auxiliary menu item determining unit 1416 demands the function execution controller 1413 to detect the present apparatus condition (step S201). At this time, the inside condition of the execution instruction/apparatus condition information storage unit 1412 is as shown in FIG. 7.

FIG. 7 shows that the recording and replaying apparatus 1100 is preset to record the serial "XYZZ", and the recording is waited for.

At step S202, the auxiliary menu item determining unit 1416 detects the auxiliary menu item information whose auxiliary menu item display conditions are satisfied. As a result, the auxiliary menu item information shown in FIG. 9, whose auxiliary menu item display condition is not satisfied, is not detected. On the other hand, the auxiliary menu item information shown in FIG. 10, whose auxiliary menu item display condition is satisfied, is detected.

After the detection, the auxiliary menu item determining unit 1416 refers to the auxiliary menu item priorities in the detected auxiliary menu item information, selects up to five pieces of auxiliary menu item information in order of priority, and notifies the auxiliary menu controller 1418 of the selected auxiliary menu item information.

Note that the information "?object 1" is included in the auxiliary menu item information shown in FIG. 10. As a result, the auxiliary menu controller 1418 is notified of the object 1 "XYZZ . . . (for instance, the date for recording)" in the execution instruction information shown in FIG. 7 as the corresponding information by the auxiliary menu item determining unit 1416.

On receiving the notification from the auxiliary menu item determining unit 1416, the auxiliary menu controller 1418 displays the image of the auxiliary menu via the auxiliary menu display unit 1420 (step S204).

Figure 15:
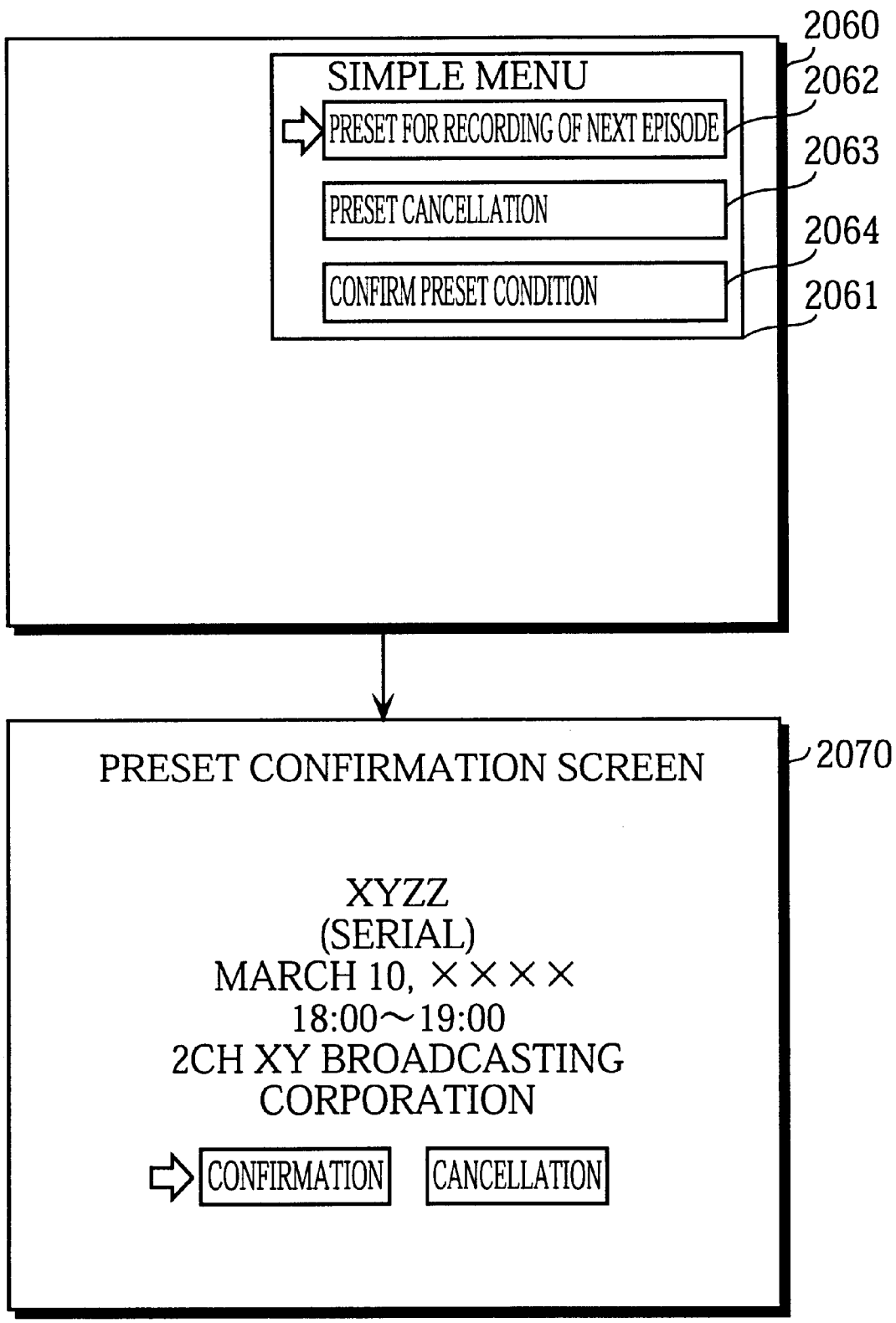
FIG. 15 shows the change of the screen displayed on a monitor 1200.

As a result, the screen in a screen condition 2060 in FIG. 15 is displayed on the monitor 1200. Each of the button images on the auxiliary menu corresponds to each piece of auxiliary menu item information that the auxiliary menu item determining unit 1416 has determined. The button images are displayed on the screen in order of decreasing priority of the corresponding auxiliary menu item information.

FIG. 15 shows the change of the screen displayed on the monitor 1200.

When the screen in the screen condition 2060 is displayed on the monitor 1200, the user operates the auxiliary menu operation button 1380 to move the cursor on the screen and selects a button image.

When the user selects a button image "preset for recording of next episode", the auxiliary menu controller 1418 receives the user selection via the auxiliary menu control receiving unit 1419 (step S205). The auxiliary menu controller 1418 stores execute control information in the execution instruction/apparatus condition information storage unit 1412 using the auxiliary menu item information corresponding to the selected button image (refer to FIG. 10) to have the function execution controller 1413 execute a desired function (step S208).

Here, the execute control information that is stored in the execution instruction/apparatus condition information storage unit 1412 has execution management information "not decoded" and execution instruction information, which is the auxiliary menu execution instruction information in FIG. 10 in which the "?object 1" is replaced by "XYZZ . . . (for instance, the date for recording)".

On receiving the execute control information, the function execution controller 1413 performs the process shown in the flowchart in FIG. 12.

More specifically, the function execution controller 1413 focuses on the execute control information (step S101), judges that the execution management information is "not decoded" (step S102), judges that a sub command is included in the execution instruction information (step S107), and executes the sub commands (step S108).

As a result, the setting 1 in the execution instruction information in the execute control information is changed to "high quality image" due to the execution of the "getmode", the object 2 is changed to "disk 1" due to the execution of the "getdisk(default)", and object 1 is changed to the information on the next episode of the serial XYZZ due to the execution of "search("XYZZ . . . (for instance, the date for recording)", EPG, NEXT)".

After the sub command execution, the function execution controller 1413 judges whether user instruction is necessary (step S103). In this case, it is judged that user confirmation is necessary since the large item is "reset for recording" although it is judged that no further information from the user is necessary since a value is given to the setting 1, so that a screen for confirmation is displayed (step S104).

As a result, the screen in the screen condition 2070 in FIG. 15 is displayed on the monitor 1200.

The process after step S104 is the same as the process after the screen in the screen condition 2050 in FIG. 13 is displayed on the monitor 1200, which has been described. The process after step S104 will not be explained in the interest of simplicity.

Meanwhile, when the recording for which the recording and replaying apparatus 1100 has been preset starts to be performed, the function execution controller 1413 judges affirmatively at step S112 in the flowchart in FIG. 12. The function execution controller 1413 changes the execution management information in the execute control information to "now executing" (step S113), execute the recording (step S114), changes the execution management information into "executed" (step S115), and gives the auxiliary menu display timing controller 1415 the timing in starting the process for displaying the auxiliary menu (step S116).

Note that when the available disk space of the recorder 1120 is less than "2 GByte" after the user replays the recorded serial due to standard menu operation and the like, the auxiliary menu item information satisfies the condition, so that the button image "deletion of replayed file" is displayed on the auxiliary menu.

As a result, the button image "deletion of replayed file", which is normally displayed on the screen after several operations by the user for standard menus (refer to FIG. 6), is automatically displayed after the replay of a recorded serial.

As has been described, the digital broadcast receiving apparatus 1100 has the auxiliary menu item determining unit 1416 detect the functions that the user is supposed to select next according to the present apparatus condition and the operation that has been performed by the user, and displays the detected functions with a predetermined timing that the user is supposed to perform the next operation. As a result, the user may instruct the execution of a function only by selecting the function from the menu.

In other words, the digital broadcast receiving apparatus 1100 predicts functions that will be desired by the user, and provides a graphical user interface for having the user instruct the execution of a function without user request.

(Second Embodiment)

A user interface apparatus according to the second embodiment of the present invention will be described with reference to FIGS. 16 to 24.

(Structure)

Figure 16:
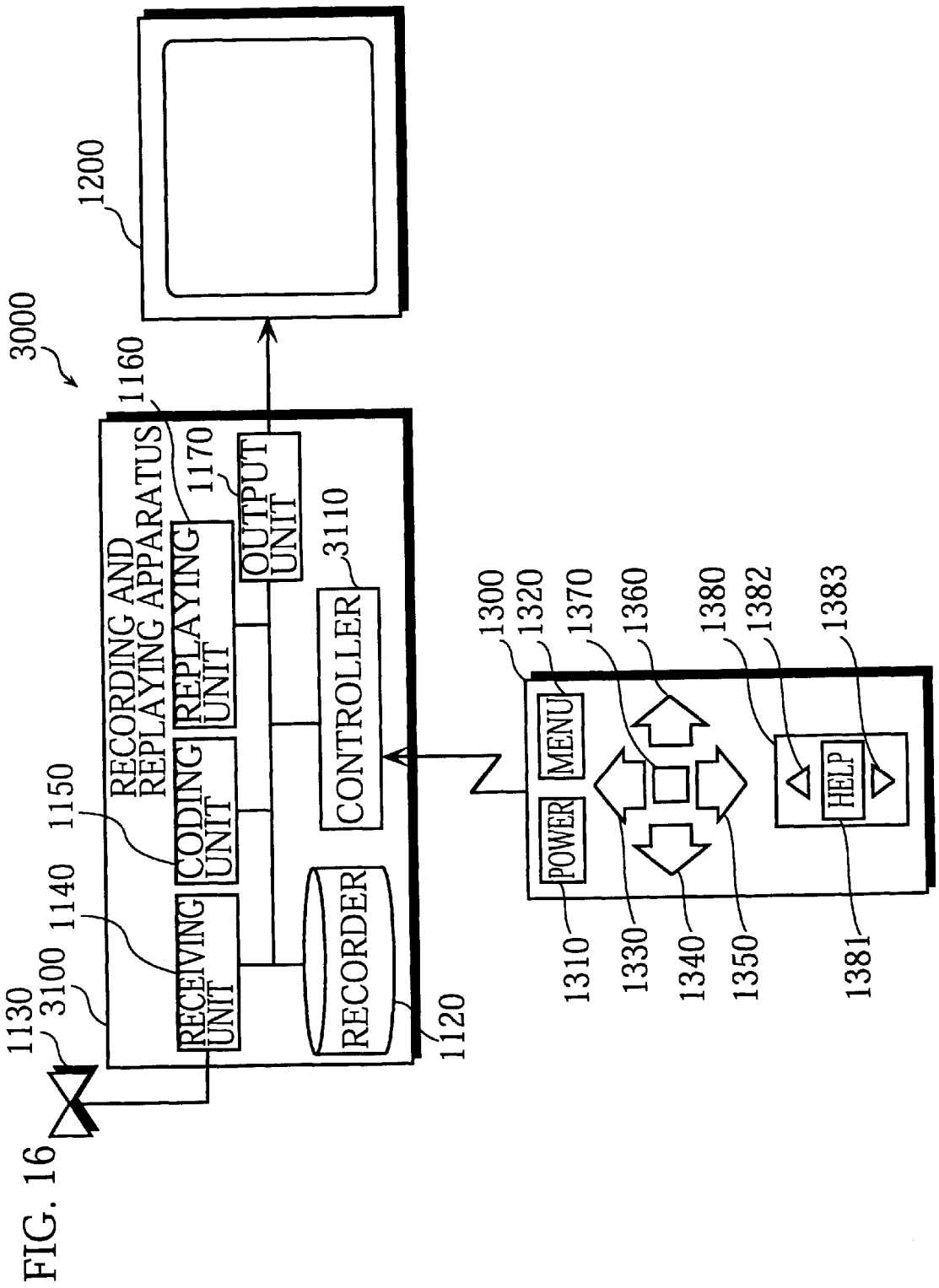
FIG. 16 shows a structure of a digital broadcast receiving system 3000 equipped with a user interface apparatus according to the second embodiment of the present invention.

FIG. 16 shows a structure of a digital broadcast receiving system 3000 equipped with a user interface apparatus according to the second embodiment of the present invention.

The digital broadcast receiving system 3000 and the digital broadcast receiving system 1000 are almost the same. The digital broadcast receiving system 3000 differs from the digital broadcast receiving system 1000 only in including a controller 3110 instead of the controller 1110. The controller 3110 has a different user interface control function from the controller 1110.

The elements that are given the same numerical numbers in the digital broadcast receiving system 3000 and in the digital broadcast receiving system 1000 (refer to FIG. 3) have the same functions. The explanation below will focus on the elements having different functions in the interest of simplicity.

The digital broadcast receiving system 3000 includes a recording and replaying apparatus 3100, which is the same as the recording and replaying apparatus 1100 apart from including the controller 3110 instead of the controller 1110, a monitor 1200 for displaying images, and a remote controller 1300 for receiving user operation and transmitting the user operation to the recording and replaying apparatus 1100.

The recording and replaying apparatus 3100 detects a signal transmitted from the remote controller 1300 according to user operation, executes a function such as receiving and recording a digital broadcast program and replaying a recorded program in response to the user operation, and outputs an image for displaying a replayed program and a menu for function selection on the monitor 1200. The recording and replaying apparatus 3100 includes the controller 3110, a recorder 1120, a broadcast receiving antenna 1130, a receiving unit 1140, a coding unit 1150, a replaying unit 1160, and a output unit 1170.

Here, the controller 3110 includes a CPU and a storage unit such as a memory. The controller 3110 realizes a execution control function for controlling the operations by each of the elements in the recording and replaying apparatus 1100 according to the signals transmitted from the remote controller 1300. The storage unit stores a program for the control.

In addition, the controller 3110 realizes a user interface control function. More specifically, the controller 3110 sends the image of a menu to the output unit 1170 in order to display the menu that is a graphical user interface for function selection by the user on the monitor 1200.

Note that in each of the menus, a plurality of button images and a cursor are shown. The menus are classified into two groups, i.e., standard menus, which are included in a hierarchical structure, and auxiliary menus, each of which is displayed when the user presses the auxiliary determination button 1381 on the remote controller 1300.

Note that the auxiliary menu in the second embodiment differs from the auxiliary menu in the first embodiment. The auxiliary menu in the second embodiment displays a plurality of keywords related to functions of the recording and replaying apparatus 3100 as button images. When the user select one bottn image, the auxiliary menu further displays button images with each of which a function of the recording and replaying apparatus 3100 is directly selected. On the auxiliary menu in the present embodiment, a button image for changing the display of keywords is included.

As in the first embodiment, the auxiliary menu operation button 1380 is used only for operating the cursor on the auxiliary menu.

The functional structure of the controller 3110, which realizes an execute control function and a user interface control function, will be explained below.

Figure 17:
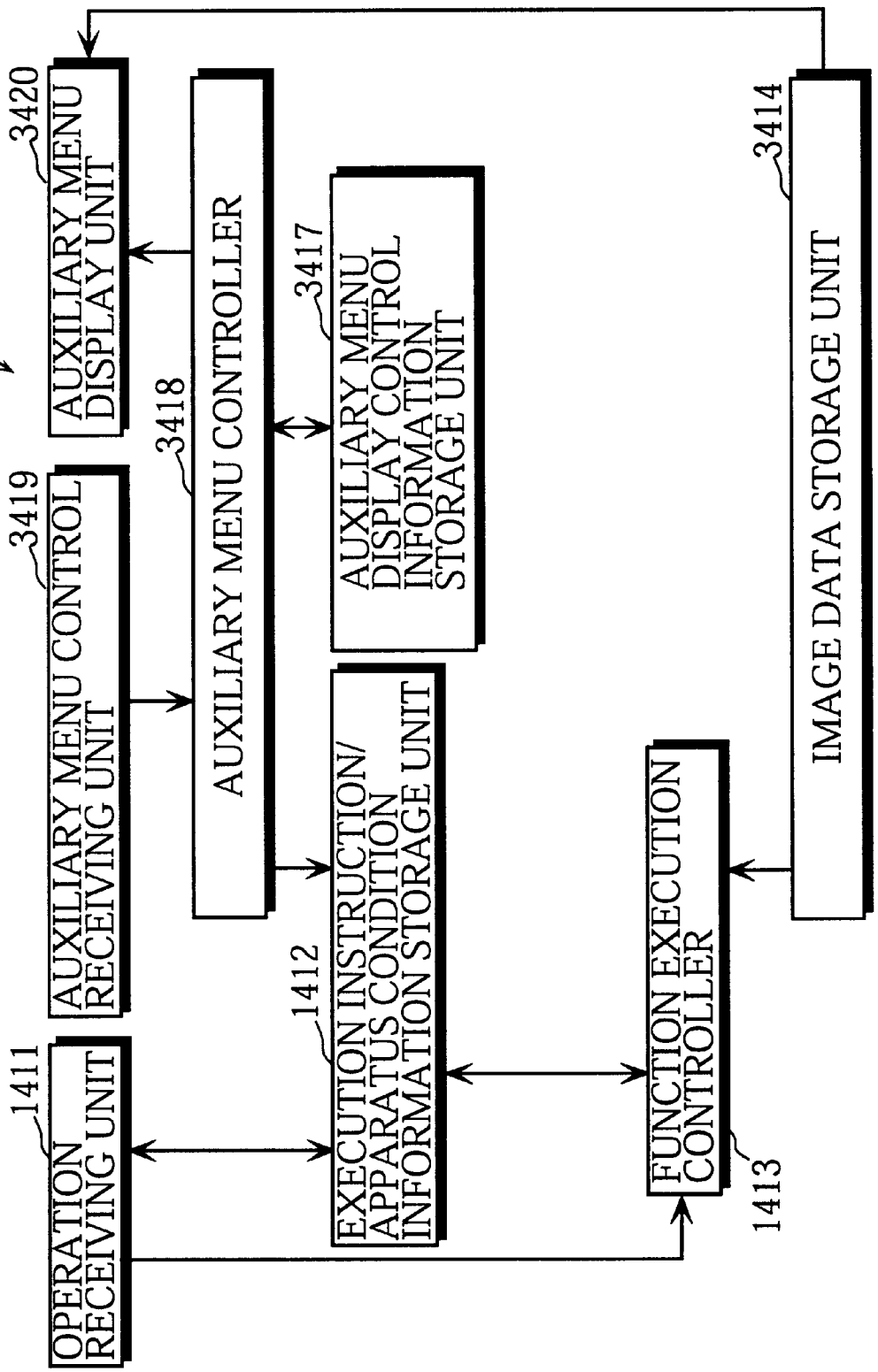
FIG. 17 is a functional block diagram of a controller 3110.

FIG. 17 is a functional block diagram of the controller 3110.

The execute control function and the user interface control function of the controller 3110 are realized by an operation receiving unit 1411, an execution instruction/apparatus condition information storage unit 1412, a function execution controller 1413, an image data storage unit 3414, an auxiliary menu display control information storage unit 3417, an auxiliary menu controller 3418 that has the function corresponding to that of the auxiliary menu controller 1418 in the first embodiment, an auxiliary menu operation receiving unit 3419, and an auxiliary menu display unit 3420.

The elements that are given the same numerical numbers in the controller 3110 and in the controller 1110 (refer to FIG. 4) have the same functions. The explanation below will focus on the elements having different functions in the interest of simplicity.

The image data storage unit 3414 stores image data in advance for displaying screens for receiving setting information from the user that is necessary for executing standard menus, auxiliary menus, and the functions.

The auxiliary menu display unit 3420 receives an instruction from the auxiliary menu controller 3418, refers to the image data storage unit 3414 to obtain the images that are necessary to display the auxiliary menu on the monitor 1200, and sends the obtained images to the output unit 1170.

The auxiliary menu operation receiving unit 3419 detects user operation of the auxiliary menu operation button 1380, and sends the detected operation to the auxiliary menu controller 3418.

The auxiliary menu controller 3418 determines the keywords and function item names of the recording and replaying apparatus 3100 that are to be displayed, and instructs the auxiliary menu display unit 3420 to display the auxiliary menu that includes button images on which keywords are written and, as necessary, functions of the recording and replaying apparatus 3100 are written.

The auxiliary menu controller 3418 instructs the auxiliary menu display unit 3420 to move the cursor according to the user operation that has been informed of by the auxiliary menu operation receiving unit 3419. When the user operation is the choice of a button image on the auxiliary menu, the auxiliary menu controller 3418 instructs to change the display content of the auxiliary menu or to execute the function that the user has designated according to the user operation.

More specifically, the auxiliary menu controller 3418 updates the display of function items when a keyword has been selected by the user, and updates the keyword display when the change of keywords has been selected. When a function item has been selected, The auxiliary menu controller 3418 stores execute control information in the execution instruction/apparatus condition information storage unit 1412 so that the function corresponding to the selected function item would be executed.

Figure 18:
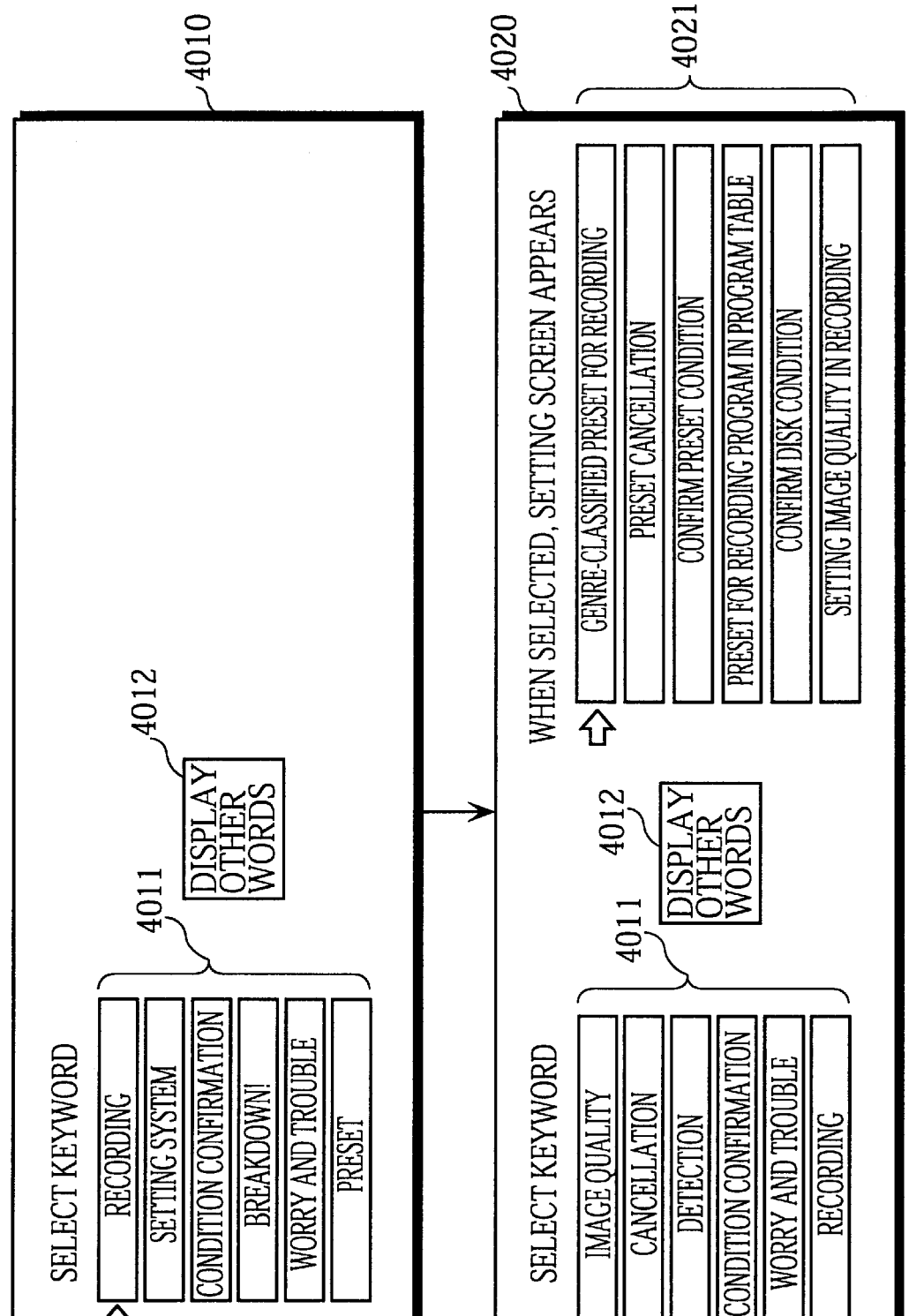
FIG. 18 shows the change of an auxiliary menu displayed on a part of a monitor 1200.

FIG. 18 shows the change of the auxiliary menu displayed on a part of the monitor 1200.

An auxiliary menu condition 4010 shows the condition of the auxiliary menu that is displayed first on the screen when the user operates the auxiliary menu operation button 1380. The auxiliary menu condition 4010 includes a keyword button image group 4011 and a keyword change button image 4012, on which characters "display other words" are written.

An auxiliary menu condition 4020 shows the condition of the auxiliary menu when the user positions the cursor location at the keyword-written button image "preset" using the auxiliary cursor buttons 1382 and 1383 on the auxiliary menu operation button 1380 and presses the auxiliary determination button 1381. Compared with the auxiliary menu condition 4010, the auxiliary menu condition 4020 further includes a function button image group 4021, which is a group of button images on which function names are written.

When one button image in the function button image group 4021 is selected by the user, the auxiliary menu controller 3418 stores the execute control information for executing the function corresponding to the selected button image in the execution instruction/apparatus condition information storage unit 1412. When one button image in the keyword button image group 4011 is selected by the user, the auxiliary menu controller 3418 determines button images related to the keyword written on the selected button image, and updates the function button image group 4021 to display the determined button images.

The data that is stored in the auxiliary menu display control information storage unit 3417 will be explained below.

Figure 19:
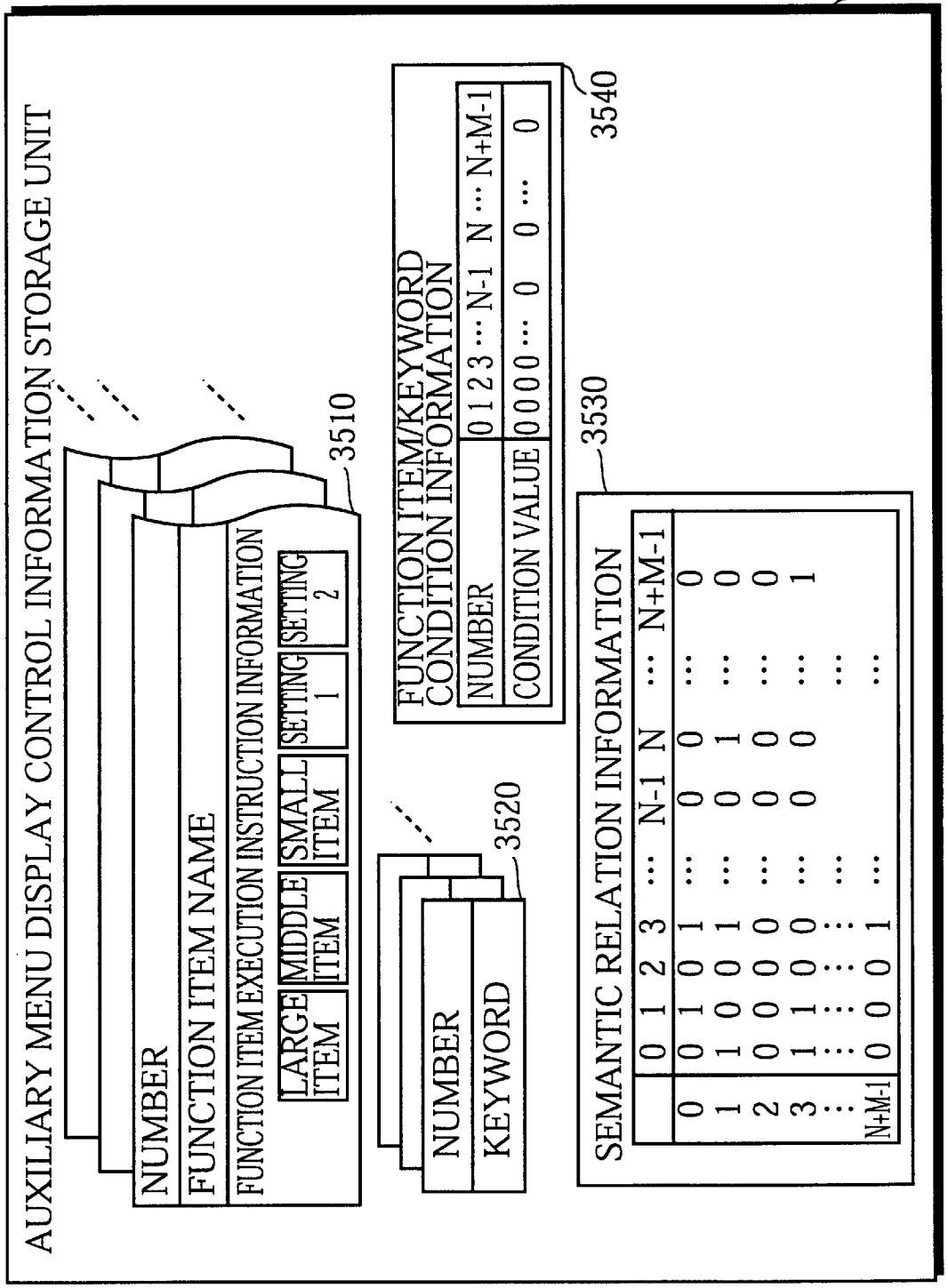
FIG. 19 shows the data that an auxiliary menu display control information storage unit 3417 stores.

FIG. 19 shows the data that the auxiliary menu display control information storage unit 3417 stores.

As shown in FIG. 19, the auxiliary menu display control information storage unit 3417 stores a plurality of pieces of function item information 3510, each of which is the information related to a function item that can be included in the function button image group 4021, a plurality of keyword information 3520, each of which is the information related to a keyword that can be included in the keyword button image group 4011, semantic relation information 3530 that is the information on the semantic relations between the function items and the keywords, and function item/keyword condition information 3540 that is referred to when it is judged whether a function item or a keyword should be displayed on the auxiliary menu. The auxiliary menu display control information storage unit 3417 has an area for storing the values that are necessary for the calculation by the auxiliary menu controller 3418.

Note that the function item/keyword condition information 3540 is updated by the auxiliary menu controller 3418 according to the user operation. On the other hand, the function item information 3510, keyword information 3520, and the semantic relation information 3530 are stored in the auxiliary menu display control information storage unit 3417 in advance, and are not updated.

Each piece of the function item information 3510 includes a number, a function item name, and a function item execution instruction information. One piece of function item information 3510 is included in the auxiliary menu display control information storage unit 3417 for one function that can be selected by the user from the auxiliary menu. The plurality of pieces of function item information 3510 are numbered from 0 in consecutive order.

Here, a piece of function item execution instruction information is described in the same form as a piece of execution instruction information described in the first embodiment.

FIG. 20 is an example of the list of the numbers given to the function item information 3510 and the corresponding function items.

Each piece of the keyword information 3520 includes a number and a keyword. One piece of keyword information 3520 is included in the auxiliary menu display control information storage unit 3417 for one keyword that can be displayed on the auxiliary menu. The plurality of pieces of keyword information 3520 are numbered in consecutive order starting from the number that follows the last number given to a piece of function item information. When the number of the pieces of function item information 3510 is "N", each piece of the keyword information 3520 is given the number whose value is equal to or larger than "N". In addition, when the number of the keywords is "M", the value of the largest number given to a piece of keyword information 3520 is "N+M−1".

In this specification, "N" is set at 47 and "M" is set at 62.

FIG. 21 is an example of the list of the numbers given to the keyword information 3520 and the corresponding keywords.

As shown in FIG. 21, a keyword is a character string that defines a function from the viewpoint of the easiness of finding a desired function by the user.

In the semantic relation information 3530, the plurality of pieces of function item information 3510 and keyword information 3520 are represented by consecutive numbers. When one of the consecutive numbers is selected, each piece of function item information 3510 or keyword information 3520 that is directly related to the piece of function item information or the keyword information that corresponds to the selected number is shown in the semantic relation information 3530.

Note that one function item or keyword has a direct semantic relation to at least one function item or keyword. As a result, one keyword has a direct or indirect semantic relation to at least one function item. An indirect semantic relation between a keyword and a function item means a semantic relation between the keyword and the function item via another keyword. For instance, when a first keyword has a direct semantic relations to a second keyword, and when the second keyword has a direct semantic relation to a function item, the first keyword has a indirect semantic relation to the function item. In addition, when the second keyword has a direct semantic relation to a third keyword, the third keyword has an indirect relation to the function item.

In FIG. 19, an example of the semantic relation information 3530 is shown. The number of function items is "N", that of the keywords is "M", and the function items and the keywords are represented by consecutive numbers from 0 to "N+M−1". When the function item or keyword of one column (column "j") has a semantic relation to the function item or keyword of one line (line "i"), the element that is positioned at the column "j" and line "i" is weighted according to the level of the relation. In FIG. 19, the weights are all "1".

For instance, the example in FIG. 19 shows that the keyword represented by the number "N+M−1" has a relation to the function item represented by the number 3.

Note that the semantic relation information 3530 shows the relations between focused keywords or function items on the primary side and keywords or function items on the secondary side to which the keywords or function items on the primary side have semantic relations. As a result, even if a keyword "preset" on the primary side has a semantic relation to a function item "setting image quality in recording" on the secondary side, a function item "setting image quality in recording" on the primary side cannot have a semantic relation to a keyword "preset" on the secondary side.

(Operation)

The operation by the digital broadcast receiving system 3000, the structure of which has been described, will be explained below.

The recording and replaying apparatus 3100 records and replays digital broadcast programs under the control of the controller 3110.

The operation by the digital broadcast receiving apparatus 3100 in recording and replaying is basically the same as the recording and replaying apparatus 1100 that has been described in the first embodiment.

The controller 3110 displays a standard menu and a following screen for user input to receive user instruction, and executes a function such as recording and replaying according to the user instruction. In addition, when one of the auxiliary determination button 1381 and the auxiliary cursor buttons 1382 and 1383 on the auxiliary menu operation button 1380 is pressed by the user, the controller 3110 displays the auxiliary menu to provide a user interface for enabling the user to select a desired function apart from a standard menu in a hierarchical structure.

The operation by the digital broadcast receiving apparatus 3100 will be described in detail, focusing on the operation by the auxiliary menu controller 3418, which controls the update and the renewal of the auxiliary menu according to user operation of the auxiliary menu operation button 1380.

Figure 22:
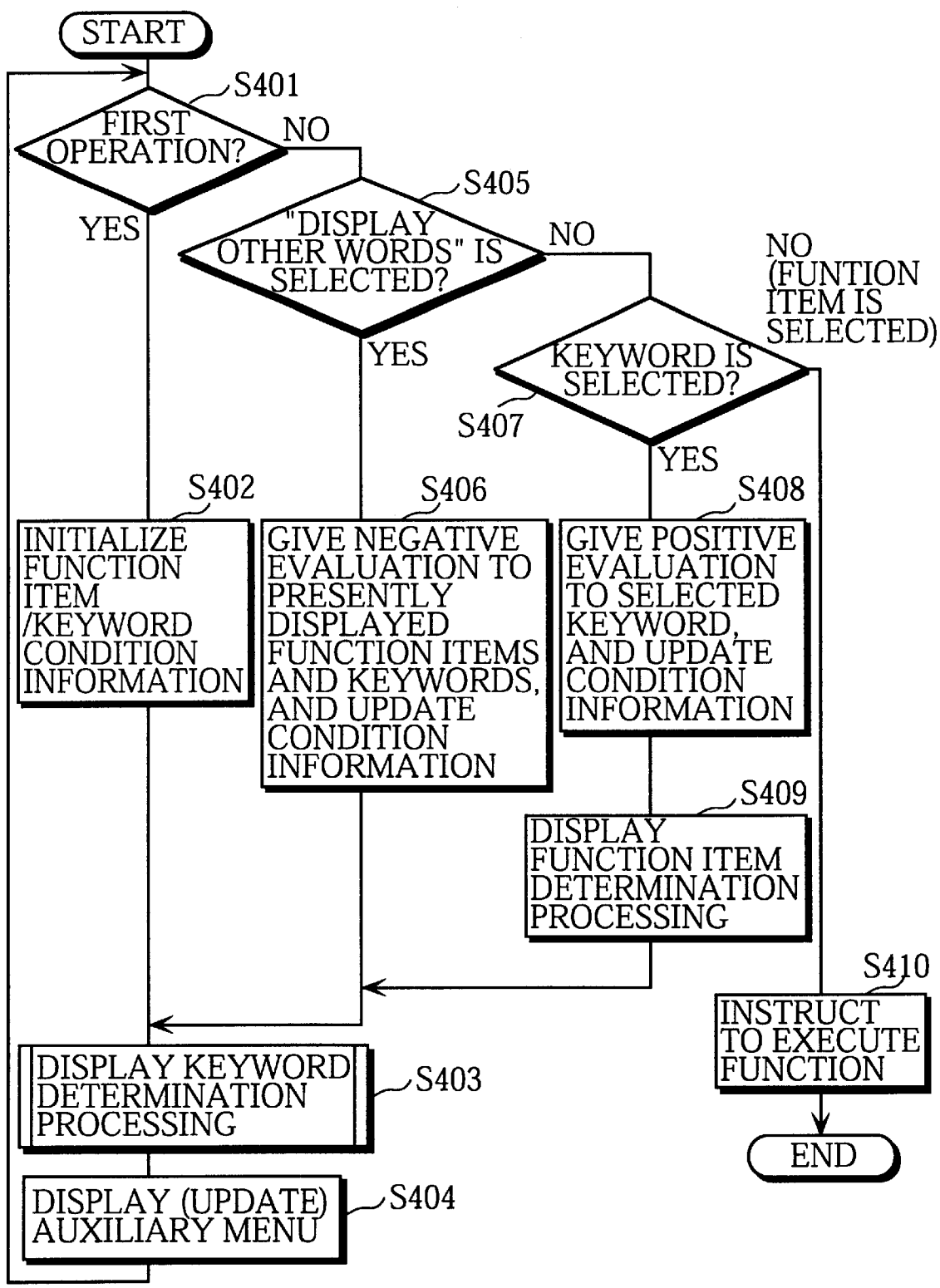
FIG. 22 is a flowchart showing the operation by an auxiliary menu controller 3418.

FIG. 22 is a flowchart showing the operation by the auxiliary menu controller 3418.

When informed that the user has operated the auxiliary menu operation button 1380 on the remote controller 1300, the auxiliary menu controller 3418 judges whether the auxiliary menu is displayed to know whether initialization is necessary (step S401).

More specifically, when no auxiliary menu is displayed and when any button on the auxiliary menu operation button 1380 is pressed by the user, the auxiliary menu controller 3418 judges that the user operation as the first operation on the auxiliary menu (step S401), and initializes the function item/keyword condition information 3540 in the auxiliary menu display control information storage unit 3417 (step S402).

Here, the update of the function item/keyword condition information 3540 will be explained.

Figure 23:
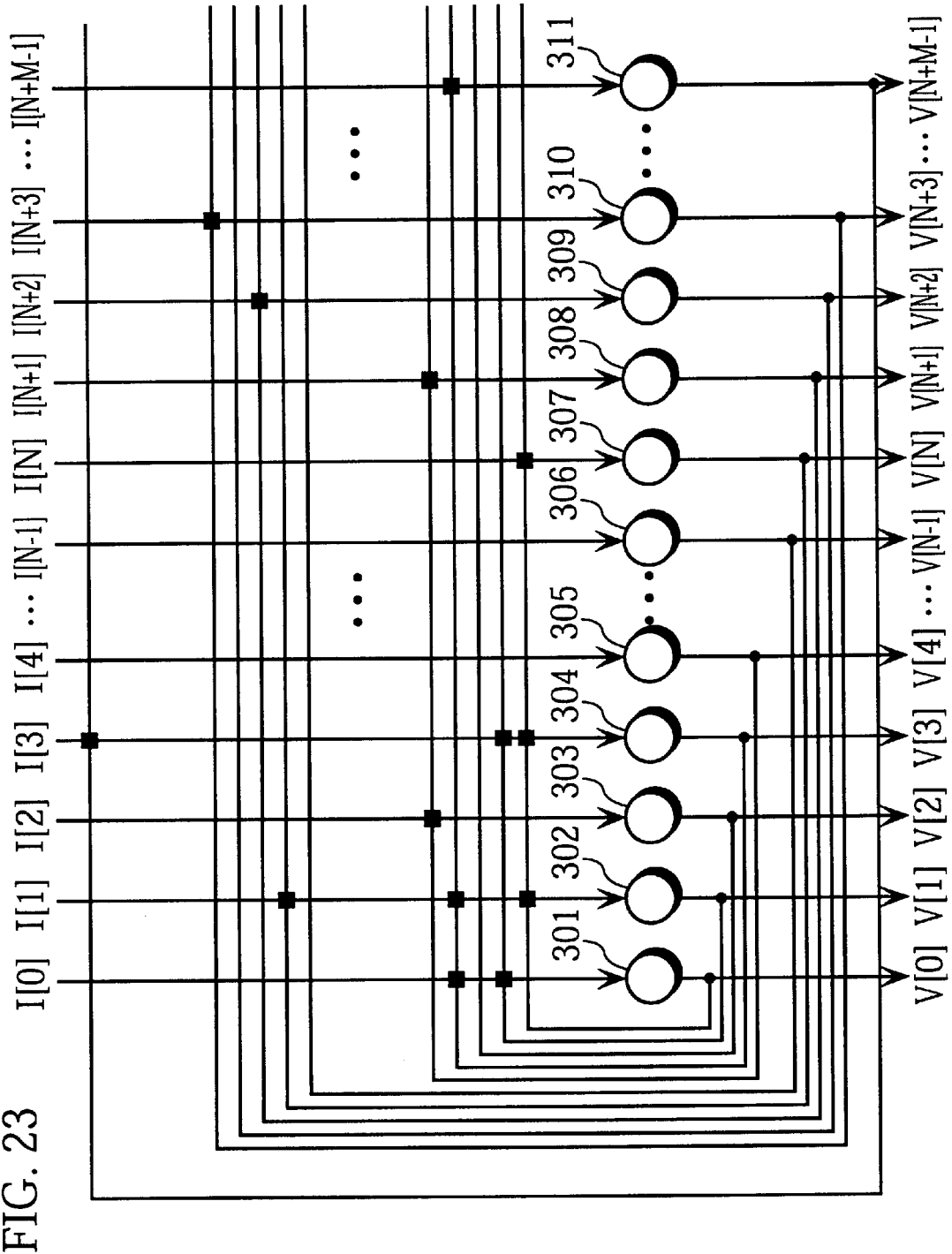
FIG. 23 shows the principle of the updating operation of function item/keyword condition information 3540.

FIG. 23 shows the principle of the updating operation of the function item/keyword condition information 3540.

Nodes 301, 302, 303, 304, . . . , and 311 are equivalent to variables in a computer program and correspond to the function item/keyword condition information 3540.

The arrows pointing the nodes 301 and the like represent the input of the evaluation values to the nodes 301 and the like. Values I[0], I[1], . . . , and I[N+M−1] represent predetermined values that are input according to user operation.

That the outputs V[0], V[1], . . . , V[N+M−1] from the nodes 301 and the like are inputs of the nodes 301 and the like are shown by the marks of solidly shaded boxes at the points of intersections of two lines. The solidly shaded box marks correspond to the content of the semantic relation information 3530. The auxiliary menu controller 3418 updates the function item/keyword condition information 3540 by referring to the semantic relation information 3530. Here, the input operation of the output values from the nodes 301 and the like is performed in accordance with a predetermined control procedure, and is not infinitely repeated.

Note that the larger evaluation value a node holds, the more highly the user is interested in the function item or keyword corresponding to the node. Here, that the user is interested in a function item or keyword means that the function item or keyword has a relation to the function item that the user wants to execute.

Suppose that the element positioned at the column "j" and line "i" is represented by "T[i][j]", input Vin[i] into the "i"th node is expressed by an expression 1 described below (refer to FIG. 23).

$$\text{Vin}[i] = \Sigma(T[i][j]V[j]) + I[i] \quad (\Sigma \text{ is the sum of the } "T[i][j]V[j]" \text{ when } "j" \text{ is "0" to "N+M−1"}) \quad \text{Expression 1}$$

In this specification, the nodes are numbered, for instance the node 301 is numbered as the 0th node and the node 302 as the first node. Note that the "i"th node corresponds to a piece of function item information or keyword information that is given number "i".

When the user selects a keyword and the "i"th node corresponds to the selected keyword, the auxiliary menu controller 3418 sets the evaluation value I[i] as a predetermined positive value. When the user presses the keyword change button image 4012 "display other words", the auxiliary menu controller 3418 sets the evaluation values I[i]s corresponding to the keywords and function items that are displayed as predetermined negative values.

The relation between a value input into a node and the value output from the node after the value input is expressed by an expression 2 for the 0th to N-1th nodes and by an expression 3 for the Nth to N+M-1th nodes.

$$V[i] = \text{OUT\_LEVEL1 (when Vin}[i] > \text{LEVEL1})$$
$$V[i] = 0 \text{ (when Vin}[i] \leq \text{LEVEL1})  \quad\quad \text{Expression 2}$$
$$V[i] = \text{OUT\_LEVEL1} + I[i] \text{ (when Vin}[i] > \text{LEVEL2})$$
$$V[i] = 0 \text{ (when Vin}[i] \leq \text{LEVEL2})  \quad\quad \text{Expression 3}$$

Note that the "OUT_LEVEL1" is a predetermined value and the "LEVEL1" and "LEVEL2" are predetermined thresholds in the Expression 2 and 3.

When the user selects one keyword, a positive evaluation value is input into the node corresponding to the selected keyword, and later the output of the node increases the degree of the input value into the node corresponding to a function item or keyword in the semantic relation information 3530.

When the degree of the input value into a node is increased and the value is larger than a threshold, the degree of the output is increased. In addition, when it is controlled that the output of increased degree is again given as an input, the degree of the input value of the node that has a semantic relation to the first node.

As a result, when a keyword is selected, the increase of the degree of the input value into the function item related to the keyword spreads from a function item that has the closest semantic relation to the selected keyword to a function item that has the furthest semantic relation by repeating the control that has the output from a node input into the node.

Incidentally, the expansion of the input value increase can be similar to the connection procedure of conception according to the spreading activation theory of semantic processing in psychology. The spreading activation theory is described in, for instance, "Cognitive Psychology Critical Study Collection Vol. 2, Memory Cognition Critical Study 2–4, "Spreading Activation Theory of Semantic Processing" (Sei-Shin Publishing, pp.64–67)".

The process of the flowchart in FIG. 22 will be again explained below.

The auxiliary menu controller 3418 initializes the evaluation values held by the nodes, i.e., the function item/keyword condition information 3540 (step S402).

After the initialization, the auxiliary menu controller 3418 performs a display keyword determination processing for obtaining the keywords to be displayed on the auxiliary menu (step S403). The display keyword determination processing will be described later.

After the display keyword determination processing, the auxiliary menu controller 3418 displays the auxiliary menu including a plurality of button images on which the determined keywords are written and a button image on which the character string "display other words" is written on the monitor 1200 via the auxiliary menu display unit 3420 (step S404).

As a result, the auxiliary menu in the auxiliary menu condition 4010 shown in FIG. 18 is displayed on a part of the monitor 1200.

When the button image "display other words" is selected by the user (step S405), the auxiliary menu controller 3418 inputs negative evaluation values into the nodes corresponding to the function items and keywords that are now displayed to update the values held by all the nodes (step S406), and performs a display keyword determination processing (step S403).

Meanwhile, when a keyword-written button image is selected by the user (step S407), the auxiliary menu controller 3418 inputs a positive evaluation value into the node corresponding to the selected keyword to update the values held by all the nodes (step S408), and determines the function items to be displayed on the auxiliary menu (step S409).

The function items to be displayed on the auxiliary menu are determined by selecting six nodes in decreasing order of evaluation value out of the nodes corresponding to function items and setting the function items corresponding to the selected six nodes as the function items to be displayed.

After determining the function items to be displayed on the auxiliary menu (step S409), the auxiliary menu controller 3418 performs a display keyword determination processing (step S403).

Meanwhile, when a function item is selected by the user, the auxiliary menu controller 3418 refers to the function item information in the piece of function item information 3510 corresponding to the selected function item, and stores the execute control information in the execution instruction/apparatus condition information storage unit 1412 to instruct the execution of the function corresponding to the selected function (step S410). The control related to the auxiliary menu is completed with step S410.

Note that when the execute control information is stored in the execution instruction/apparatus condition information storage unit 1412, the function execution controller 1413 executes a function according to the stored execute control information as has been described in the first embodiment.

The display keyword determination processing (step S403) will be explained in detail with reference to FIG. 24.

Figure 24:
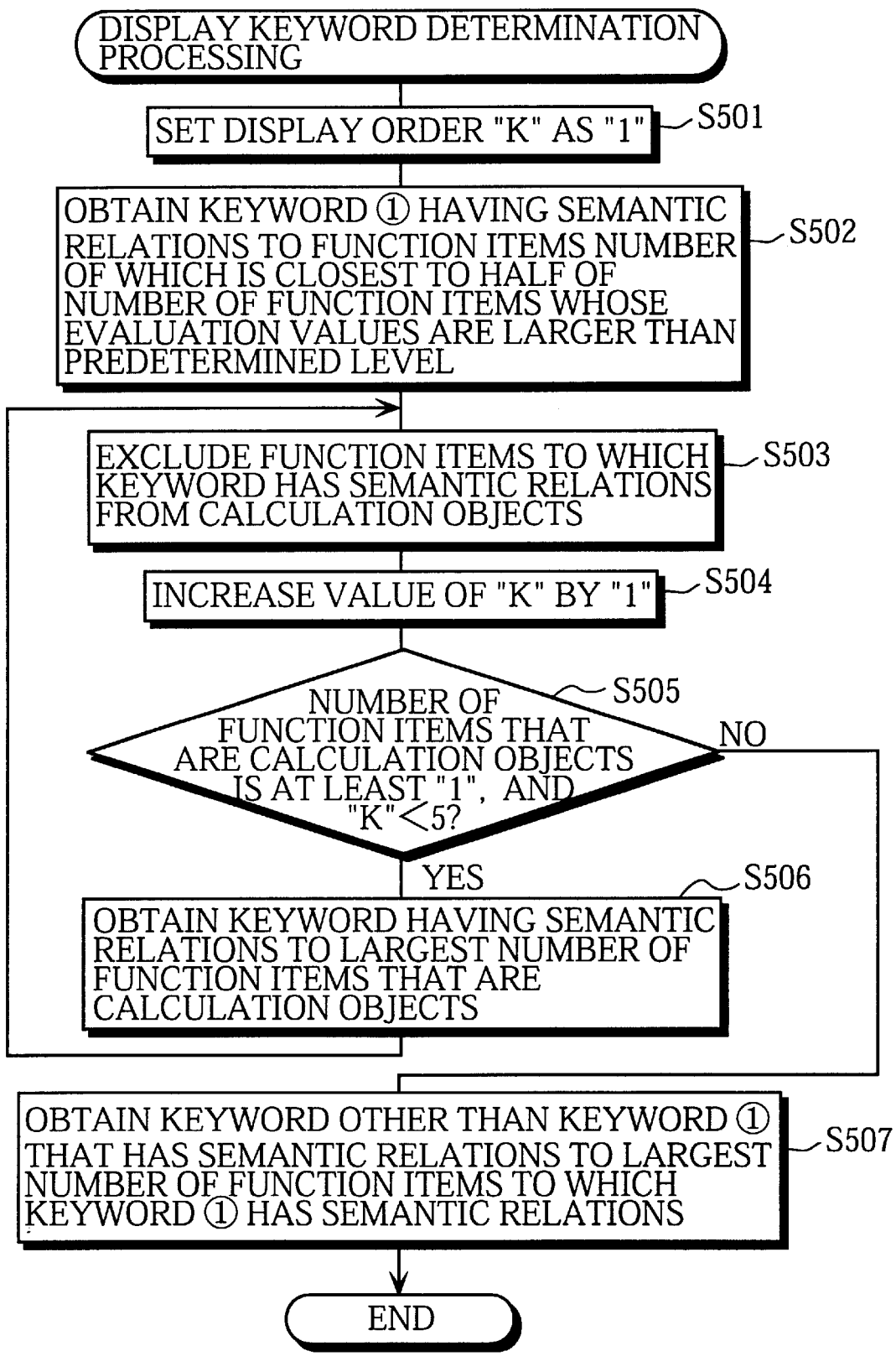
FIG. 24 is a flowchart showing the display keyword determination processing by an auxiliary menu controller 3418.

FIG. 24 is a flowchart showing the display keyword determination processing by the auxiliary menu controller 3418.

The auxiliary menu controller 3418 sets a variable "k" that is the order of display of keyword as "1" (step S501), and refers to the evaluation values of the nodes, i.e., the function item/keyword condition information 3540. The auxiliary menu controller 3418 obtains the keyword that has semantic relations to the function items the number of which is closest to the half of the number of the function items whose evaluation values are larger than the threshold "LEVEL1", and determines the obtained keyword as the keyword to be displayed at the top on the auxiliary menu (step S502).

Here, a keyword that has a semantic relation to a function item means that the output of the node corresponding to the keyword is the input into the function item (refer to FIGS. 19 and 23).

After obtaining the keyword displayed at the top, the 3418 auxiliary menu controller excludes the function items to which the keyword has semantic relations from the objects of calculation (step S503). Here, the calculation objects are the objects of the calculation for obtaining the keywords at step S506.

After the step S503, the auxiliary menu controller 3418 increases the value of the variable "k" by 1 (step S504), and judges whether the number of the function items that are now the calculation objects is at least one and the value of the variable "k" is less than 5 (step S505).

When the result of the judgement at step S505 is affirmative, the auxiliary menu controller 3418 obtains one keyword that has semantic relations to the largest number of function items that are now the calculation objects, and determines the keyword as the keyword displayed "k"th on the auxiliary menu (step S506). The process returns to step S503, at which the auxiliary menu controller 3418 excludes the function items to which the keyword has semantic relations from the calculation items.

As a result, until the judgement result at step S505 is negative, the operations at steps S506, S503, and S504 are repeated. The number of obtained keywords correspond to the number of the repetition of the processes.

When the judgement result at step S505 is negative, the auxiliary menu controller 3418 obtains one keyword that is not the keyword displayed at the top and has semantic relations to the largest number of function items to which the top-displayed keyword has semantic relations, and determined the obtained keyword as the keyword that is displayed at the bottom or the auxiliary menu (step S507).

As has been described the auxiliary menu controller 3418 determines the keywords that are to be displayed on the auxiliary menu.

The operation by the auxiliary menu controller 3418 will be concretely explained with an example of user operation.

When no auxiliary menu is displayed and when the user presses one of the auxiliary determination button 1381 and the auxiliary cursor buttons 1382 and 1383 on the auxiliary menu operation button 1380, the remote controller transmits a signal informing the controller 3110 of the user operation. The auxiliary menu operation receiving unit 3419 in the controller 3110 detects the transmitted signal, and informs the auxiliary menu controller 3418 of the signal.

On receiving the signal, the auxiliary menu controller 3418 displays the auxiliary menu in the auxiliary menu condition 4010 shown in FIG. 18 on a part of the monitor 1200 via the auxiliary menu display unit 3420 (steps S401, S402, S403, and S404).

More specifically the auxiliary menu display unit 3420 transfers the image to be displayed to the output unit 1170 using the image data stored in the image data storage unit 3414. On receiving the image to be displayed, the output unit 1170 displays the auxiliary menu in the auxiliary menu condition 4010 on a part of the monitor 1200.

Note that on the other part of the monitor 1200 apart from the part on which the auxiliary menu is displayed, the image that has been displayed on the monitor 1200 is kept displayed. For instance, when the user has been operating a standard menu, the standard menu is kept displayed.

In this condition, whenever the user presses the auxiliary cursor button 1383, the auxiliary menu controller 3418 moves the cursor on the monitor 1200 so that the cursor would be positioned at a button image in rotation in the order of "recording", "setting system", "condition confirmation", "breakdown", "worry and trouble", "preset", and "display other words". When the user presses the auxiliary cursor button 1382, the auxiliary menu controller 3418 moves the cursor so that the cursor would be positioned at a button image in rotation in the inverse order.

Note that the user operates the auxiliary menu using the auxiliary menu operation button 1380 on the remote controller 1300, so that the user may perform another operation with the operation of the auxiliary menu by pressing another button apart from the auxiliary menu operation button 1380 on the remote controller 1300.

When judging that the keyword with which a desired function is connected is not displayed on the auxiliary menu, the user selects "display other words". As a result, the auxiliary menu controller 3418 updates the keywords on the auxiliary menu (steps S401, S405, S406, S403, and S404).

When the auxiliary menu is in the auxiliary menu condition 4010, when the user positions the cursor not at the button image "display other words" but at the button image "preset", and when the user presses the auxiliary determination button 1381 on the remote controller 1300, the auxiliary menu controller 3418 performs operations in the order of steps S401, S405, S407, S408, S409, S403, S404 (refer to FIG. 22).

More specifically, the auxiliary menu controller 3418 inputs a predetermined positive value into the node corresponding to the selected keyword "preset" to perform the calculations shown by the Expressions 1 to 3. As a result, the evaluation value held by the function item or keyword to which the keyword "preset" has a semantic relation is increased (step S408). After step S408, the auxiliary menu controller 3418 selects six nodes in decreasing order of evaluation value out of the nodes whose evaluation values have been increased, and determines the function items corresponding to the selected nodes as the function items to be displayed (step S409). Then, the auxiliary menu controller 3418 performs a display keyword determination processing (step S403, refer to FIG. 24), updates the auxiliary menu via the auxiliary menu display unit 3420 to display the determined keywords and function items that have been determined on referring to the function item information 3510 and the keyword information 3520 (step S404).

As a result, the displayed auxiliary menu is in the auxiliary menu condition 4020.

In this condition, whenever the user presses the auxiliary cursor button 1383 on the remote controller 1300, the auxiliary menu controller 3418 moves the cursor on the monitor 1200 so that the cursor would be positioned at a button image in rotation in the order of "preset for recording by genre", "preset cancellation", "preset condition confirmation", "preset for recording programs in program table", "disk condition confirmation", "setting image quality in recording", each of the keyword button image group 4011, and "display other words". Note that the cursor moves in the direction from the top to bottom for the keyword button image group 4011. When the user presses the auxiliary cursor button 1382, the auxiliary menu controller 3418 moves the cursor so that the cursor would be positioned at a button image in rotation in the inverse order.

In this condition, when the user selects one of the button images in the function button image group 4021, the auxiliary menu controller 3418 refers to the function item information 3510, and stores the execute control information for executing the function item corresponding to the selected button image in the execution instruction/apparatus condition information storage unit 1412 (step S410). Then, the auxiliary menu controller 3418 sets the auxiliary menu in non-display condition. With this operation, the control related to the auxiliary menu is completed.

Meanwhile, when the auxiliary menu in the auxiliary menu condition 4020 and the user selects a button image in the keyword button image group 4011, for instance, the button image "detect", the auxiliary menu controller 3418 performs the operations in the order of steps S401, S405, S407, S408, S409, S403, and S404 once more.

As has been described, when the user selects a keyword at several times, all the user selections are used in the determination of the function items to be displayed on the auxiliary menu. More specifically, it is not that the user directly designates a function operation but that the user selects a keyword and the recording and replaying apparatus 1100 specifies function operations that are supposed to be desired by the user according to the selected keyword and displays the function button image group 4021. In other words, the recording and replaying apparatus 1100 predicts function operations that are supposed to be desired by the user and provide a user interface.

(Third Embodiment)

The user interface that displays buttons not necessarily selected, i.e., has the recommend display appear as the auxiliary menu in the first embodiment realizes an apparatus with a variety of user-convenient and self-explanatory functions. In the third embodiment, an example in which a function that may not be included in an ordinary menu structure is shown by a recommend display when necessary will be explained. The recommend display in this specification means to specify and display a function operation that has not been directly designated by the user, i.e., to predict and display a function operation that is supposed to be desired by the user.

A user interface apparatus according to the third embodiment of the present invention will be explained below with reference to FIGS. 25 to 28.

(Structure)

Figure 25:
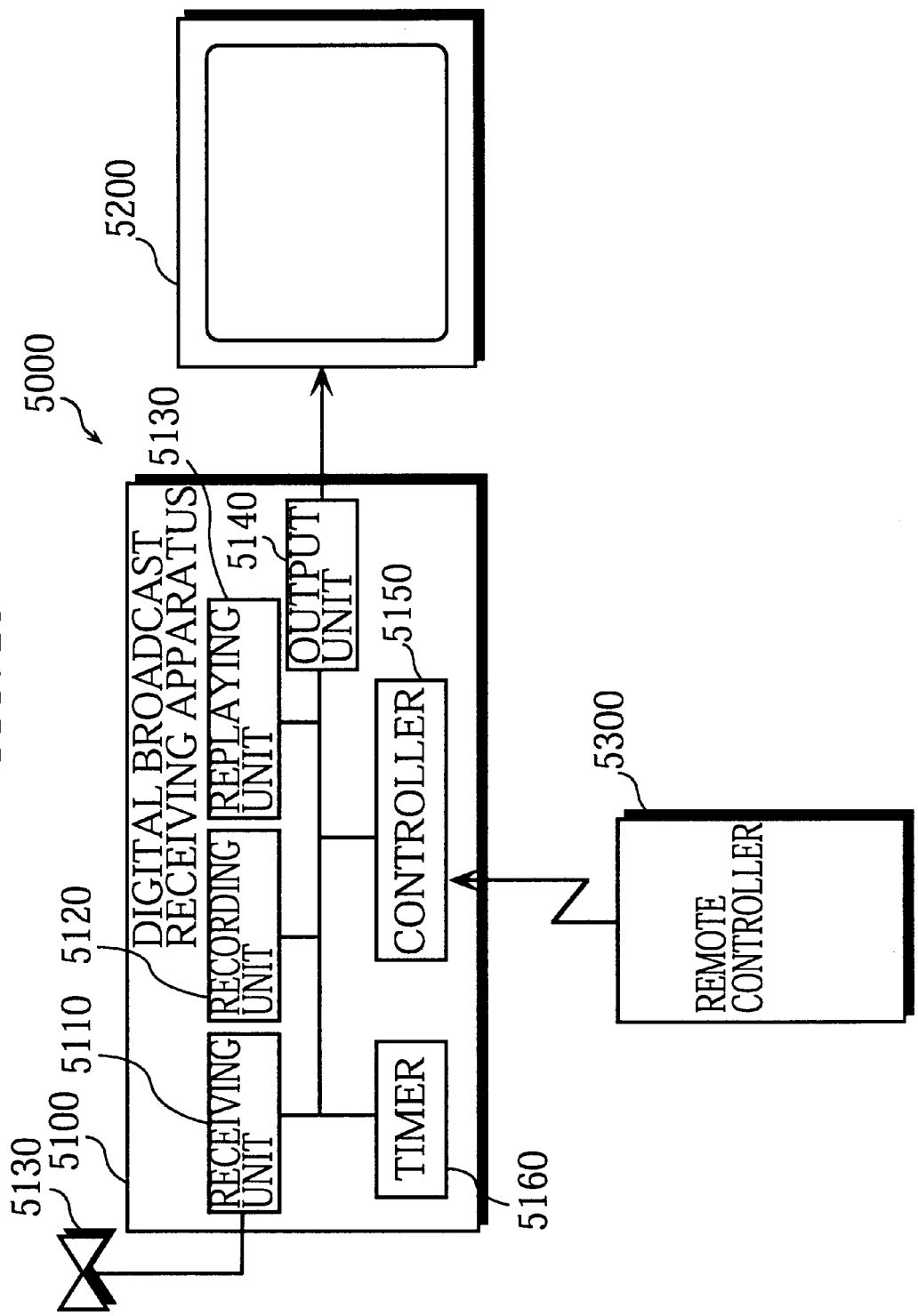
FIG. 25 shows a structure of a digital broadcast receiving system 5000 equipped with a user interface apparatus according to the third embodiment of the present invention.

FIG. 25 shows a structure of a digital broadcast receiving system 5000 equipped with a user interface apparatus according to the third embodiment of the present invention.

The digital broadcast receiving system 5000 includes a digital broadcast receiving apparatus 5100, a monitor 5200 for displaying images and outputting audio, and a remote controller 5300 for receiving user instructions and transmitting the received instructions to the digital broadcast receiving apparatus 5100.

The digital broadcast receiving apparatus 5100 includes an infrared ray reception unit. The digital broadcast receiving apparatus 5100 detects a signal that has been transmitted from the remote controller 5300 according to a user instruction using the infrared ray reception unit, executes such functions such as receiving a digital broadcast program and outputting a received program in response to the user instruction, and outputs an image for displaying a button for function execution instruction on the monitor 5200. The digital broadcast receiving apparatus 5100 includes a broadcast receiving antenna 5101, a receiving unit 5110, a recording unit 5120, a replaying unit 5130, an output unit 5140, a controller 5150, and a timer 5160 that has time measuring function.

Here, the controller 5150 includes a CPU and a storage unit such as a memory. The controller 5150 realizes a execution control function for controlling the operations by each elements in the digital broadcast receiving apparatus 5100 according to the signals transmitted from the remote controller 5300 and time information transferred from the timer 5160. The storage unit stores a program for the control.

More specifically, the controller 5150 receives the information on a program table from the information that the receiving unit 5110 has received, has the receiving unit 5110 receive a program on a channel that the user has designated, and the recording of the history of watched programs. Here, the program table is the same as explained in the first embodiment.

The controller 5150 realizes the user interface control function, and outputs a graphical user interface image such as a button image for having the user designate a function execution to the monitor 5200.

The receiving unit 5110 includes a tuner, a system stream decoder of MPEG. The receiving unit 5110 receives digital broadcast programs via the broadcast receiving antenna 5101, demodulates the received programs, and separates a program that the user desires into packets. In addition, the receiving unit 5110 transfers the separated program to the replaying unit 5130 or the recording unit 5120, and receives a program table as well as programs.

The recording unit 5120 includes a hard disk or a DVD-RAM. The recording unit 5120 records the programs data that has been transferred from the receiving unit 5110 on the hard disk, the DVD-RAM, or the like.

The replaying unit 5130 includes a decoder for decoding images and audio of MPEG, expands the program data transferred from the receiving unit 5110, and transfers data for displaying images and outputting audio to the output unit 5140.

On receiving the data for displaying an image from the replaying unit 5130 and the controller 5150, the output unit 5140 combines the data into a TV signal as necessary, and output the TV signal to the monitor 5200 as well as the data for outputting audio that has been transferred from the replaying unit 5130.

The remote controller 5300 includes a determination button, a cursor button, and the like for the operation of the graphical user interface on the monitor 5200. When any of the buttons is pressed by the user, the remote controller 5300 transmits a signal for identifying the pressed button to the digital broadcast receiving apparatus 5100. Here, the determination button is used when pressing a button image displayed on the monitor 5200.

The functional structure of the controller 5150, which realizes the execute control function and the user interface control function, will be explained below.

Figure 26:
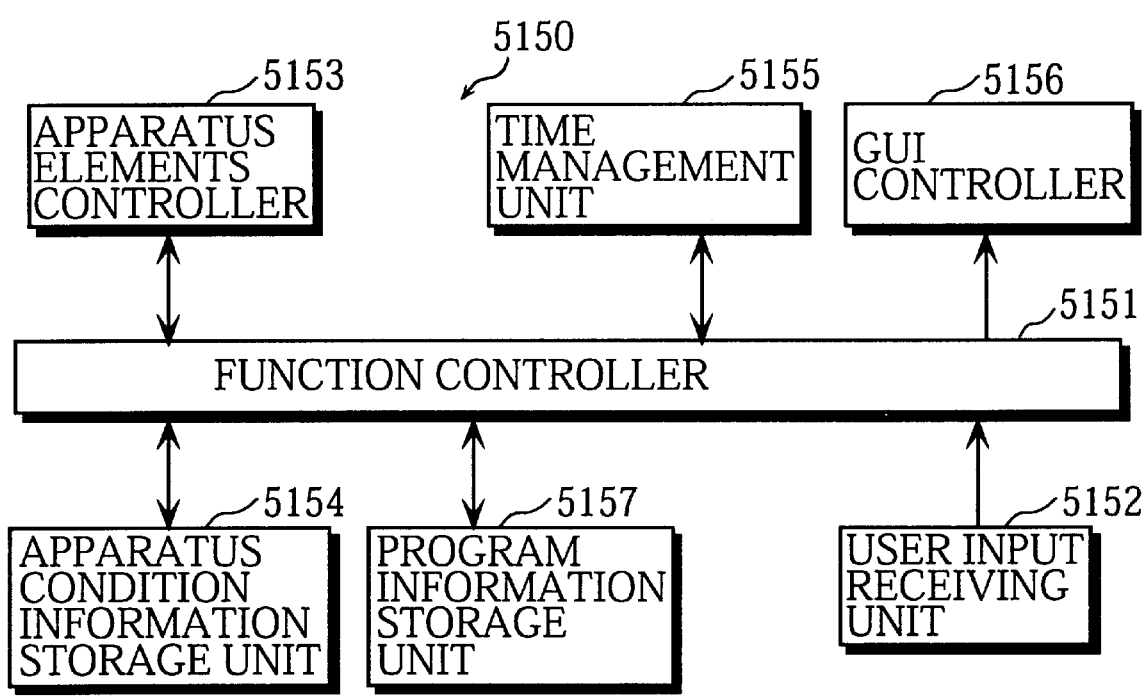
FIG. 26 is a functional block diagram of a controller 5150.

FIG. 26 is a functional block diagram of the controller 5150.

The execute control function and the user interface control function of the controller 5150 are realized by a function controller 5151, a user input receiving unit 5152, an apparatus elements controller 5153, an apparatus condition information storage unit 5154, a time management unit 5155, a GUI controller 5156, and a program information storage unit 5157.

The function controller 5151 has the apparatus elements controller 5153 controls each elements of the digital broadcast receiving apparatus 5100 such as the receiving unit 5110, the replaying unit 5130, and the like to have a program table be fetched every hour and to have the function corresponding to a user instruction be executed. The function controller 5151 refers to the apparatus condition information storage unit 5154 and the program information storage unit 5157, has the GUI controller 5156 display a button image as necessary using the time management unit 5155. For these operations, the function controller 5151 decodes a user instruction that has been received by the user input receiving unit 5152, and gives an instruction to the apparatus elements controller 5153 and the like according to the received user instruction.

A program table that has been fetched by the function controller 5151 is stored in the program information storage unit 5157. Note that when fetching a new program table, the function controller 5151 abandons the program table that has been fetched. In addition, the function controller 5151 detects a program that satisfies a predetermined condition from a program table.

The GUI controller 5156 receives an instruction from the function controller 5151, creates a button image that displays a designated character string, and displays the created button image on the monitor 5200 via the output unit 5140.

The user input receiving unit 5152 detects a signal transmitted from the remote controller 5300 to receive user operation, and transfers the received user operation to the function controller 5151. When the GUI controller 5156 displays a button image on the monitor 5200, the user input receiving unit 5152 receives user operation such as the designation of a button image and cursor move.

On receiving an instruction from the function controller 5151, the apparatus elements controller 5153 controls the receiving unit 5110, the replaying unit 5130, and the like to execute a variety of operations. The apparatus elements controller 5153 stores the executing states of the operations and the conditions of each of the elements in the controller 5150 in the apparatus condition information storage unit 5154. As a result, the information on the executing conditions of each of the elements such as the channel number of a program that is now being received is stored in the apparatus condition information storage unit 5154.

The time management unit 5155 refers to the time information transferred from the timer 5160, notifies the function controller 5151 of the elapse of a designated period of time, and transfers the time information to the function controller 5151.

(Operation)

The operation by the digital broadcast receiving system 5000, the structure of which has been described, will be explained below.

The digital broadcast receiving apparatus 5100 executes the reception of digital broadcast programs and the like under the control of the controller 5150.

A program is received by the digital broadcast receiving apparatus 5100 in the manner described below. A radio wave over which multiplexed information such as a program is broadcasted is received by the receiving unit 5110 via the broadcast receiving antenna 5101, and the information on a desired program is extracted. The graphic and audio data of the desired program is expanded by the replaying unit 5130, and the information is input to the monitor 5200 via the output unit 5140.

The controller 5153 controls the digital broadcast receiving apparatus 5100 according to user operation to enable the reception of a program on a channel that has been designated by the user. In addition, the controller 5150 realizes the function described below. When the user switches channels during the commercials in a program and watches another program, the controller 5150 displays a button image on the monitor 5200 when one minute has elapsed since the channel was switched so that the user would switch channels to watch the originally watched program. A program switch operation responding processing, a recommend display purpose timer time elapse processing, and a watching determination detection purpose timer time elapse processing, which each are performed by the function controller 5151, will be described below.

Figure 27:
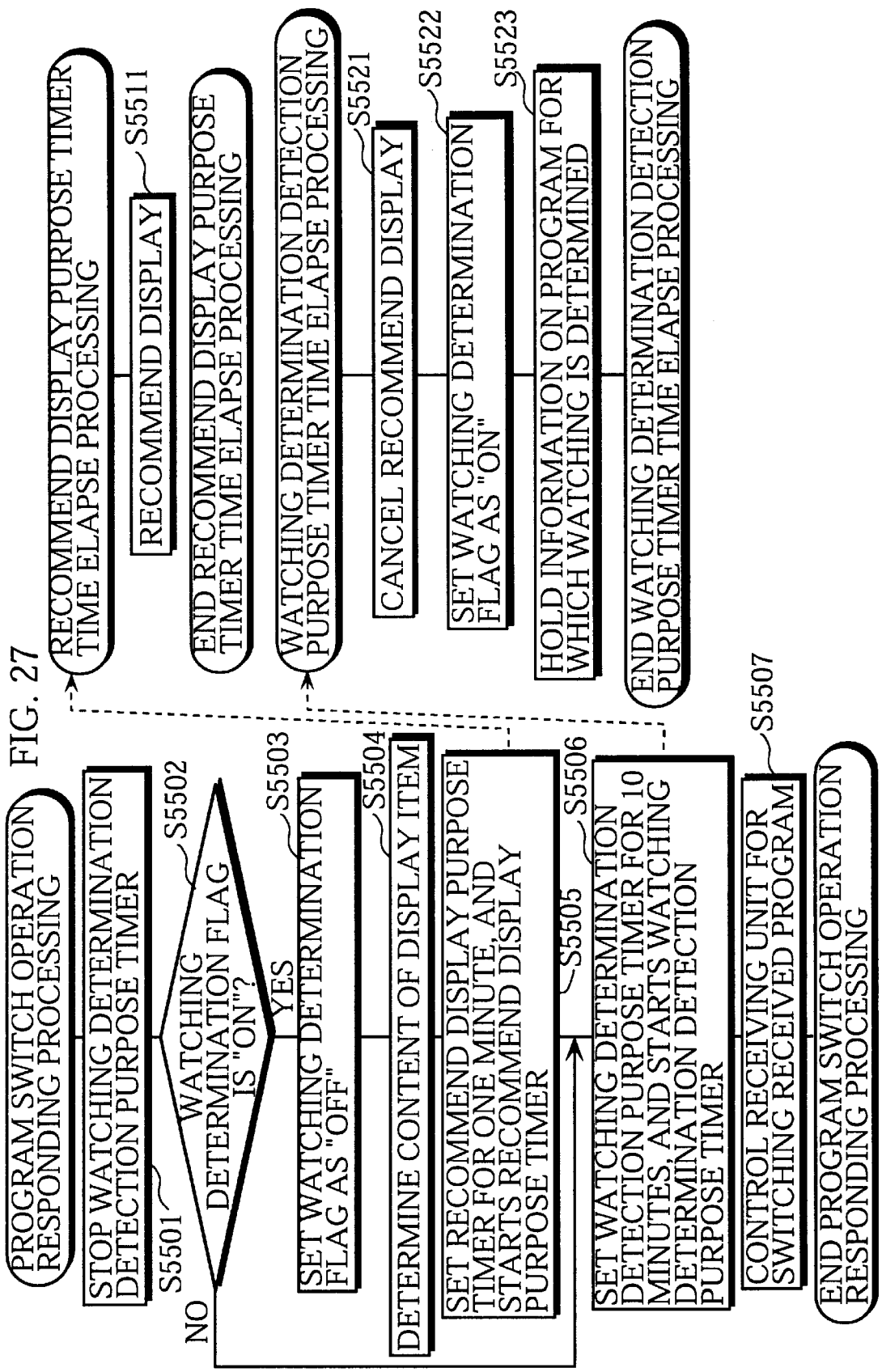
FIG. 27 is a flowchart showing a program switch operation responding processing, a recommend display purpose timer time elapse processing, and a watching determination detection purpose timer time elapse processing, which each are performed by a function controller 5151.

FIG. 27 is a flowchart showing the program switch operation responding processing, the recommend display purpose timer time elapse processing, and the watching determination detection purpose timer time elapse processing, which each are performed by the function controller 5151.

These processings mean that the function controller 5151 designates a period of time and has the time management unit 5155 notifies itself of the elapse of the designated period of time, i.e., the function controller 5151 uses the time management unit 5155 as a logical timer. The program switch operation responding processing is performed when the function controller 5151 detects that the user has switched channels. The program switch operation responding processing includes the procedure for setting two logical timers, i.e., a recommend display purpose timer and a watching determination detection purpose timer.

Meanwhile, the recommend display purpose timer time elapse processing is performed by the function controller 5151 that is informed of the elapse of the period of time by the time management unit 5155 when a period of time for which the recommend display purpose timer has been set is elapsed. The watching determination detection purpose timer time elapse processing is performed by the function controller 5151 that is informed of the elapse of the period of time by the time management unit 5155 when a period of time for which the watching determination detection purpose timer has been set is elapsed.

When detecting the channel switch by the user, the function controller 5151 stops the watching determination detection purpose timer (step S5501), and judges whether a watching determination flag is "ON" (step S5502). Here, the watching determination flag is one bit of data. The watching determination flag is set as "ON" when the user has been watching a program on a channel for ten minutes and a watching condition is determined, and is set as "OFF" when the channel is switched.

At a judgement step S5502, when the watching determination flag is "ON", the function controller 5151 sets the watching determination flag as "OFF" (step S5503), and determines the content of a button image that is to be displayed on the monitor 5200 (step S5504). The function controller 5151 sets the recommend display purpose timer for one minute and starts the recommend display purpose timer (step S5505), and sets the watching determination detection purpose timer for 10 minutes and starts the watching determination detection purpose timer (step S5506). The button image content that is to be determined includes the title of the program that the user had been watching for at least 10 minutes and the reason why the button image is displayed. The title of the previously watched program is held at step S5523, which will be described later.

For instance, when the user has been watching a movie "XX" for at least 10 minutes and switches channels during the commercials, the content of the button image is character string "return to movie "XX" (one minute has elapsed)". The button image content shows that the button image is a graphical user interface for reminding the user that he/she had been watching the movie "XX" because one minute has elapsed since the channel switch and the user can forget having been watching the movie "XX".

Meanwhile, at the judgement step S5502, when the watching determination flag is "OFF", the function controller 5151 skips steps S5503 to S5505 and sets the watching determination detection purpose timer for 10 minutes and starts the watching determination detection purpose timer (step S5506).

After the set of the watching determination detection purpose timer, the function controller 5151 responds to the channel switch by the user, instructs the apparatus elements controller 5153 to have the receiving unit 5110 switch channels to receive another program (step S5506). The processing responding to the channel switch by the user is completed with step S5506. Note that when the user switches channels again, the function controller 5151 performs the program switch operation responding processing once more.

Then, when one minute has elapsed since the set of the recommend display purpose timer at step S5505, the function controller 5151 is informed of the time elapse by the time management unit 5155, and performs the recommend display purpose timer time elapse processing. The function controller 5151 has the GUI controller 5156 create the button image that displays the character string "return to movie "XX" (one minute has elapsed)", and has the monitor 5200 display the created button image via the output unit 5140, i.e., the recommend display appears on the monitor 5200 (step S5511).

Meanwhile, when 10 minutes has elapsed since the set of the watching determination detection purpose timer at step as 5506, the function controller 5151 is informed of the time elapse by the time management unit 5155, and performs the watching determination detection purpose timer time elapse processing. More specifically, when the recommend display that has been described appears, the function controller 5151 cancels the recommend display (step S5521), sets the watching determination flag as "ON" (step S5522), and holds the information on the program that the user has been watching for 10 minutes, or the program for which the user watching is determined (step S5523). Here, the program for which the user watching is determined is the program that the receiving unit 5110 is now receiving. To hold the information on the program means that the function controller 5151 refers to the information on the channel of the presently received program stored in the apparatus condition information storage unit 5154 and to the program table stored in the program information storage unit 5157, and obtains and holds the program title.

Figure 28:
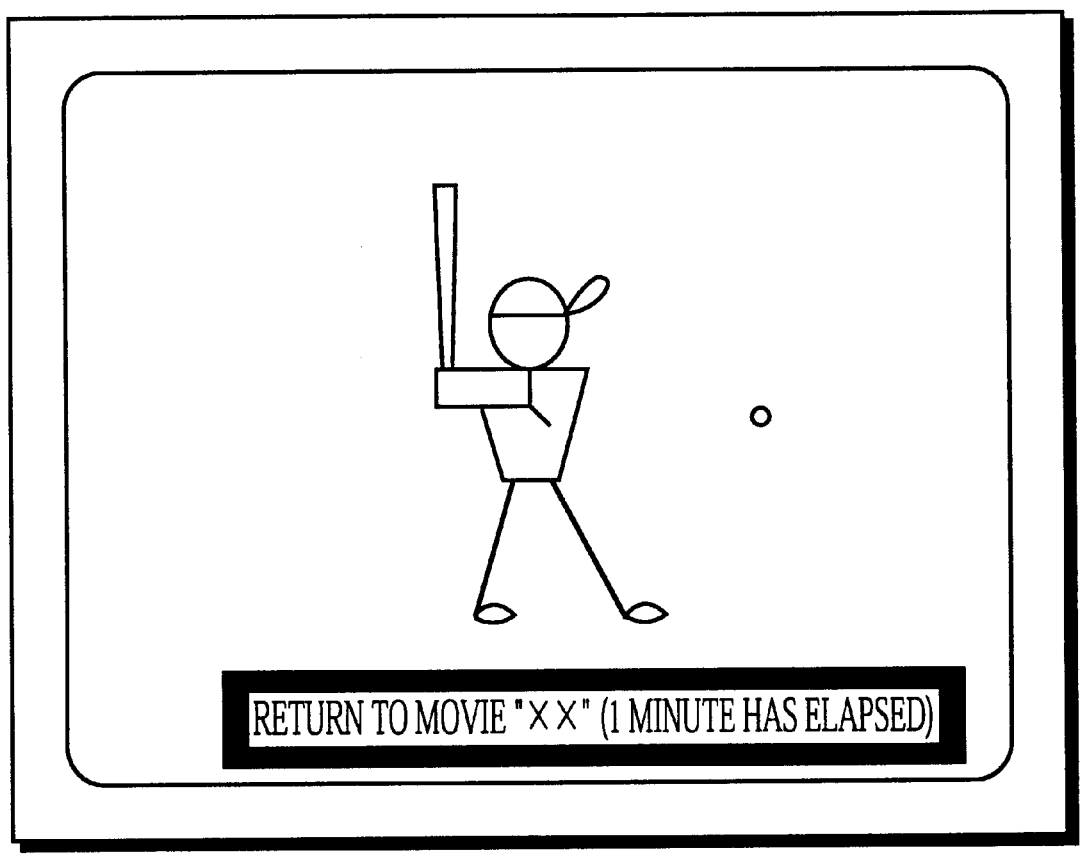
FIG. 28 shows a monitor on which a recommend display appears for recommending watching the previously watched program.

As a result of these operations mainly performed by the function controller 5151, for instance, when the user switches channels after having been watching the movie "XX" for at least 10 minutes to start watching a live coverage baseball game program, a button image is displayed on the monitor 5200 as shown in FIG. 28 when one minute has elapsed since the user started watching the baseball game program.

FIG. 28 shows a monitor on which a recommend display appears for recommending watching the previously watched program.

As shown in FIG. 28, when the button image including the character string "return to movie "XX" (one minute has elapsed)" is displayed, and when the user presses the determination button on the remote controller 5300, the digital broadcast receiving apparatus 5100 performs the same operation as when the user designates the channel of the movie "XX" and switches channels.

Note that the recommend display purpose timer is set for one minute because it is supposed to take about one minute for the user to complete zapping, i.e., to switch channels and browse other programs during one program or the commercials in the program. The watching determination detection purpose timer is set for 10 minutes because it is supposed that the user wants to continue to watch a program that had been watched for at least 10 minutes.

(Fourth Embodiment)

In the fourth embodiment, a user interface apparatus that has a recommend display appear according to user information such as timetable and taste will be explained.

The user interface apparatus according to the fourth embodiment of the present invention will be explained below with reference to FIGS. 29 to 35.

(Structure)

The structure of a digital broadcast receiving system including the user interface according to the fourth embodiment of the present invention is almost the same as that of the digital broadcast receiving system 5000 according to the third embodiment (refer to FIG. 25). The functional structure of a controller in a digital broadcast receiving apparatus in the digital broadcast receiving system according to the fourth embodiment, however, differs from that of the controller 5150 in the third embodiment (refer to FIG. 26).

Figure 29:
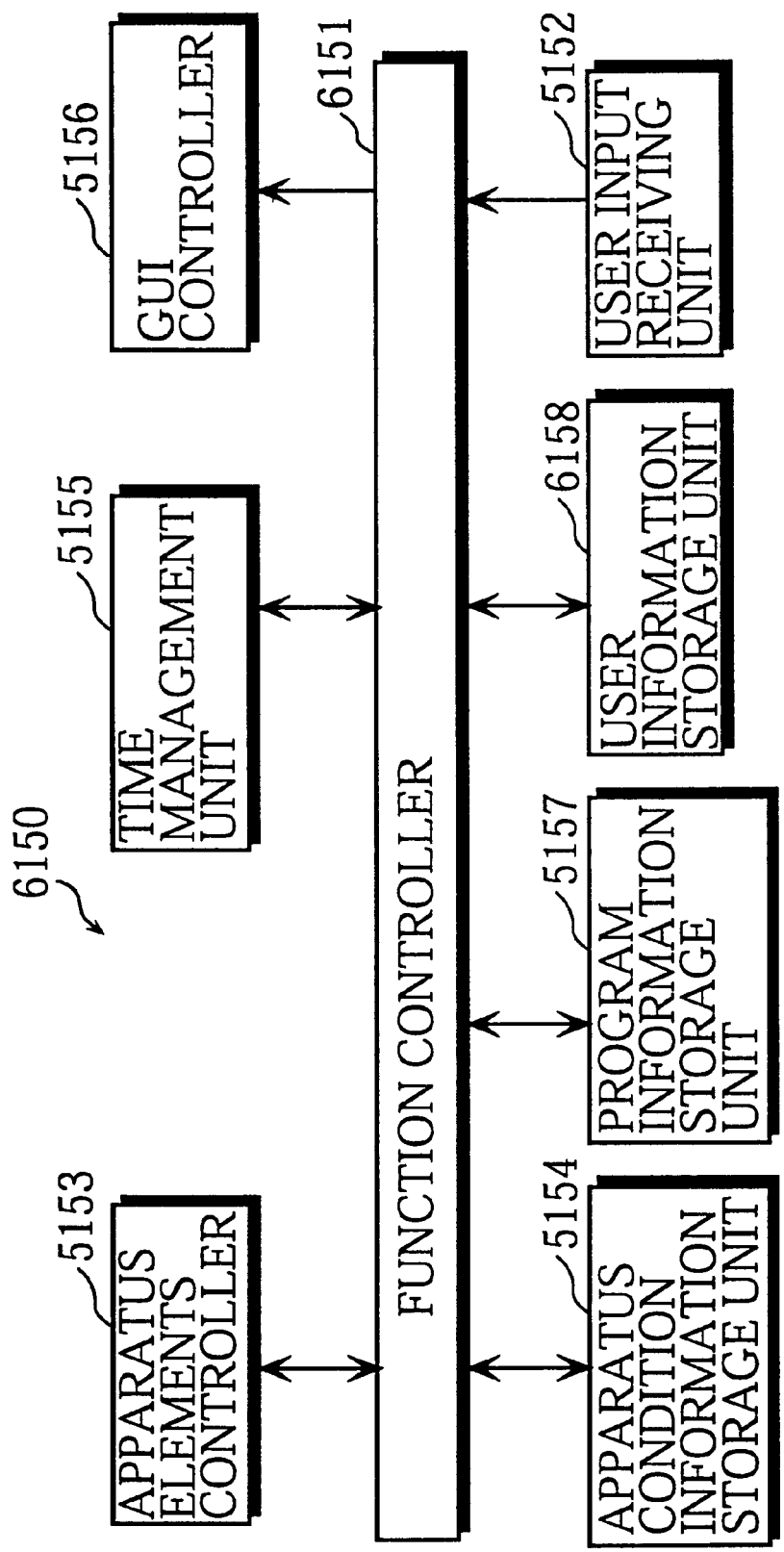
FIG. 29 is a functional block diagram of a controller 6150 in a digital broadcast receiving apparatus in the digital broadcast receiving system according to the fourth embodiment.

FIG. 29 is a functional block diagram of a controller 6150 in the digital broadcast receiving apparatus in the fourth embodiment.

The controller 6150 performs the execute control function and the user interface control function as the controller 5150 in the third embodiment. The controller 6150 includes a function controller 6151, a user input receiving unit 5152, an apparatus elements controller 5153, an apparatus condition information storage unit 5154, a time management unit 5155, a GUI controller 5156, a program information storage unit 5157, and a user information storage unit 6158. Note that the elements in FIG. 29 and in the controller 5150 in the third embodiment that are given the same numerical numbers have the same functions.

The function controller 6151 has the apparatus elements controller 5153 control the elements in the digital broadcast receiving apparatus such as the receiving unit 5110 and the replaying unit 5130 to have a program table be fetched every hour and to have the function corresponding to a user instruction be executed. The function controller 6151 refers to the apparatus condition information storage unit 5154 and the program information storage unit 5157, has the GUI controller 5156 display a button image as necessary using the time management unit 5155. For these operations, the function controller 6151 decodes a user instruction that has been received by the user input receiving unit 5152, and gives an instruction to the apparatus elements controller 5153 and the like according to the received user instruction. Here, a program table that has been fetched by the function controller 6151 is stored in the program information storage unit 5157 as in the third embodiment.

The functions of the function controller 6151 and the function controller 5151 are basically the same, however, the function controller 6151 differs from the function controller 5151 in controlling so that the user information would be referred, an operation that is supposed to be desired by the user would be predicted, and a user interface with which the user instructs an operation would be provided when necessary.

The user information storage unit 6158 stores the user information described below.

FIG. 30 shows the content of the user information stored in the user information storage unit 6158.

User information 6400 includes information peculiar to the user, i.e., information on the user timetable and taste such as a taste genre 6401, a favorite program 6402, a program watching history 6403, and a bedtime 6404.

The taste genre 6401 shows 10 or less user favorite program genres such as sport and news. The favorite program 6402 shows 10 or less user favorite programs, and includes the information on the titles, genres, players, and channels. The program watching history 6403 shows 10 or less programs that the user has watched, and includes the information on the titles, genres, players, and channels.

The bedtime 6404 shows the bedtime of the user in the usual timetable.

Note that the taste genre 6401, the favorite program 6402, and the bedtime 6404 are directly input by the user using a remote controller and the like. The program watching history 6403 is obtained by the function controller 6151 on referring to program tables in order to obtain the information on the programs that have been watched according to user operations.

(Operation)

The digital broadcast receiving apparatus executes the reception of digital broadcast programs and the like under the control of the controller 6150. Here, two functions specific to the digital broadcast receiving apparatus will be explained. The two specific functions are a program recommendation function for recommending the user to watch a favorite program, and a bedtime responding function for recommending the user to record a presently watched program when the program is scheduled to end after the user bedtime.

The processing in the program recommendation function will be first explained.

Figure 31:
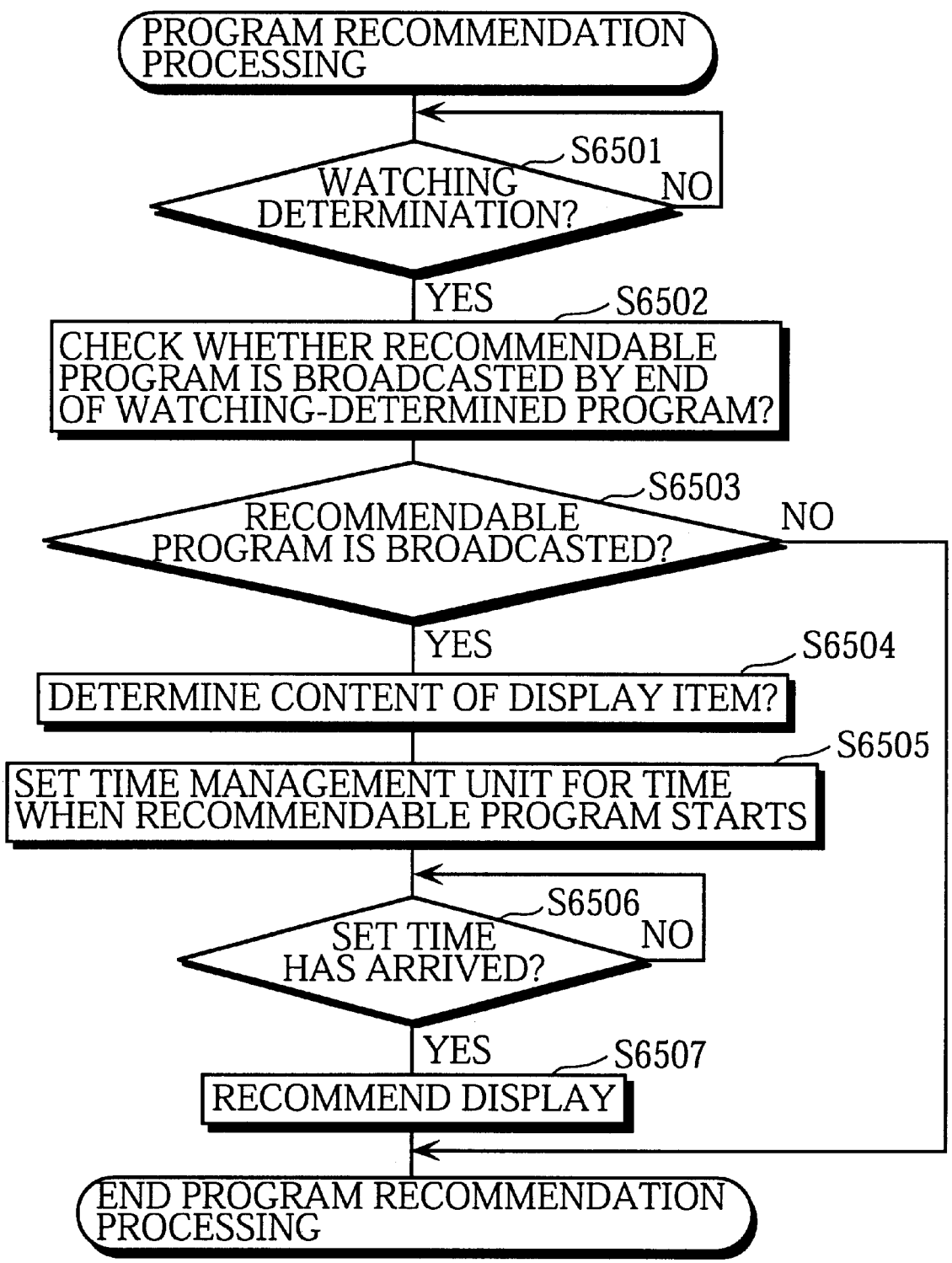
FIG. 31 is a flowchart showing the processing in a program recommendation function.

FIG. 31 is a flowchart showing the processing in the program recommendation function.

As shown in FIG. 31, when detecting the watching determination of one program, i.e., detecting that the user have been watching one program for at least 10 minutes (step S6501), the function controller 6151 checks whether a program to be recommended is to be broadcasted by the end of the presently watched program (step S6502).

More specifically, the function controller 6151 obtains the present time from the time management unit 5155 and refers to the program table stored in the program information storage unit 5157 to obtain the time when the presently received program ends. The function controller 6151 detects the program table to check whether a recommendable program is broadcasted between the present time and the time of the presently received program using the favorite program 6402 in the user information 6400 and the program titles, players, and the like in the program watching history 6403.

When no recommendable program is to be broadcasted (step S6503), the program recommendation function is completed. On the other hand, when a recommendable program is to be broadcasted (step S6503), a character string that is the content of a button image displayed on the monitor as a recommend display is determined (step S6504). The character string includes the title of the recommendable program and the reason why the program is recommended. When the recommendable program is detected using the taste genre 6401, the reason is the genre of the recommendable program. Meanwhile, when the program is detected using the information on the players, the reason is the name of a player.

For instance, when a recommendable program that has been detected using the name of a player "YZ", who appears in a program included in the favorite program 6402, is a drama "XX" at step S6502, the character string that is the content of the button image is "switch to drama "XX" ("YZ" appearing)".

After the determination of the character string that is the content of the button image, the function controller 6151 refers to the program table to obtain the time the recommendable program starts, and sets the time management unit 5155 for the time (step S6505). When the set time has arrived, the time management unit 5155 notifies the function controller 6151 of the time arrival. When receiving the notification (step S6506), the function controller 6151 has the recommend display appears on the monitor (step S6507). The program recommendation function is completed with step S6507.

Figure 32:
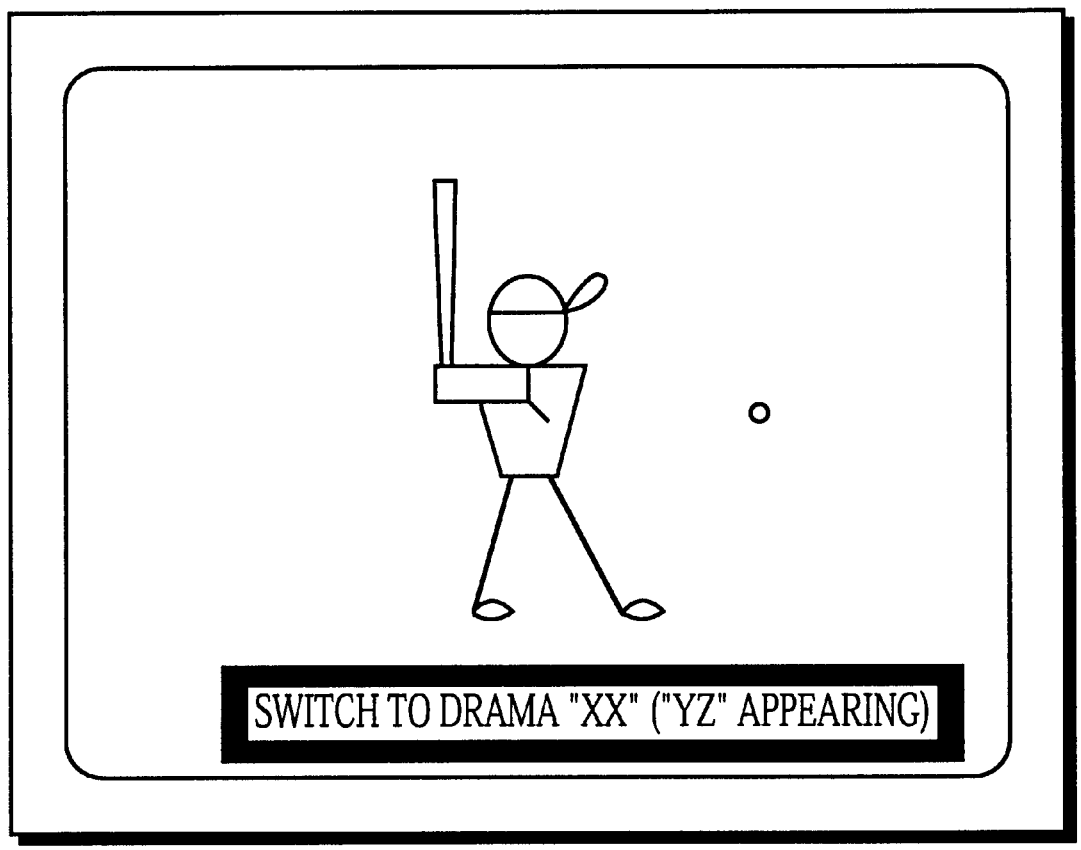
FIG. 32 shows a monitor on which a recommend display appears for advising the user to switch channels to a recommendable program.

For instance, when the start time of the drama "XX" has arrived during watching a live coverage baseball game program, the button image as shown in FIG. 32 appears on the monitor by the recommend display at step S6507.

FIG. 32 shows a monitor on which a recommend display appears for advising the user to switch channels to tune to a recommendable program.

When the user presses the button image using the remote controller and the like, the function controller 6151 controls the receiving unit in the digital broadcast receiving apparatus via the apparatus elements controller 5153 to have the program be received.

As a result, during watching a live coverage baseball game program, the user is informed of the start of the drama "XX" in which "YZ" appears, who is a player in a program included in the favorite program 6402. Only by pressing the button image using the determination button on the remote controller, the user may watch the drama.

Then, the processing in the bedtime responding function will be explained.

Figure 33:
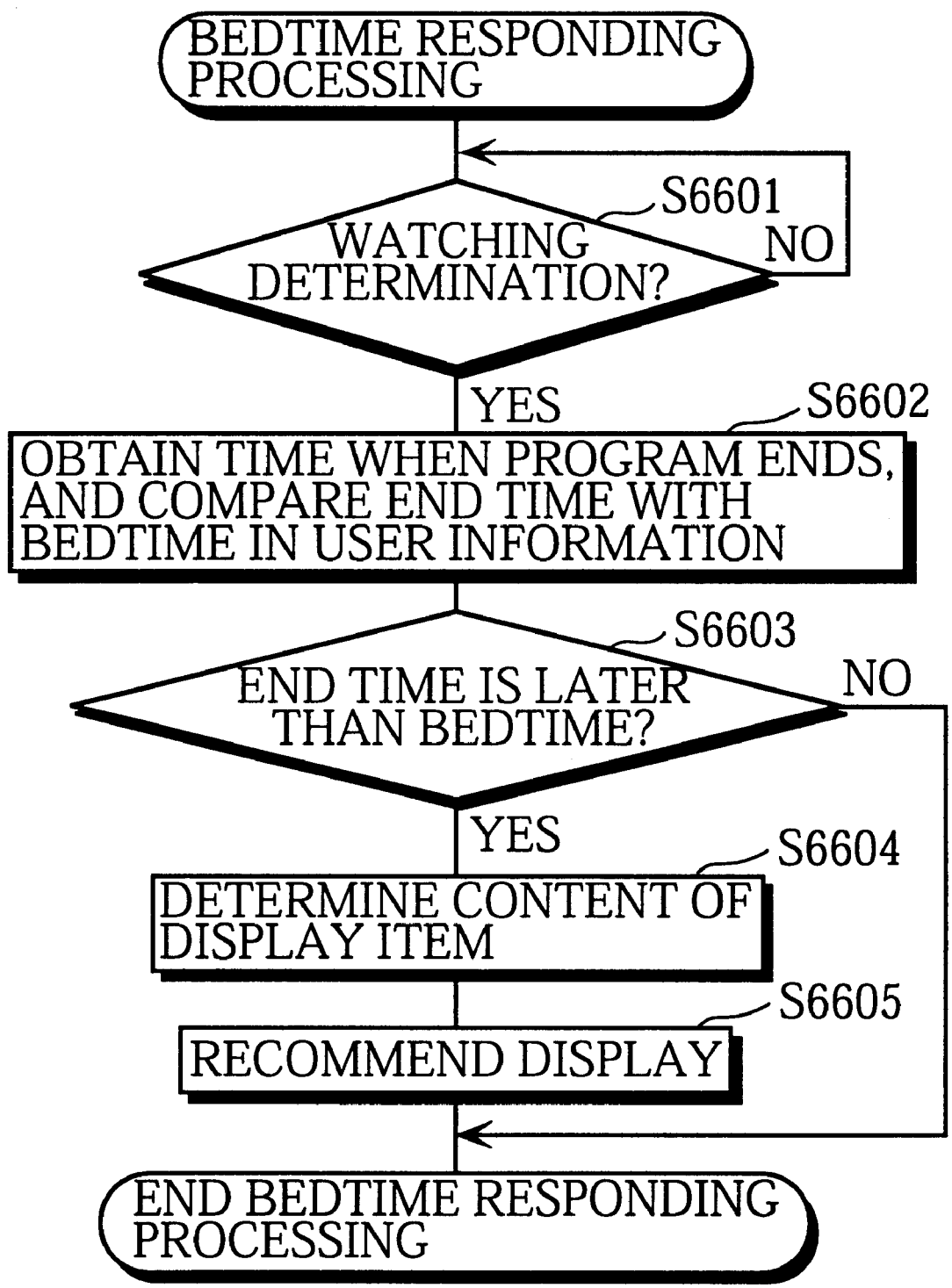
FIG. 33 is a flowchart showing the processing in a bedtime responding function.

FIG. 33 is a flowchart showing the processing in the bedtime responding function.

As shown in FIG. 33, when detecting the watching determination of one program, i.e., detecting that the user has been watching one program for at least 10 minutes (step S6601), the function controller 6151 obtains the time when the program ends on referring to the program table, and compares the end time with the bedtime 6404 in the user information 6400 (step S6602).

As a result of the comparison at step S6602, when the end time of the program is later than the bedtime 6404 (step S6603), character string that is the content of a button image displayed on the monitor as a recommend display is determined (step S6604), and the recommend display appears on the monitor (step S6605). The bedtime responding function is completed with step S6605.

Figure 34:
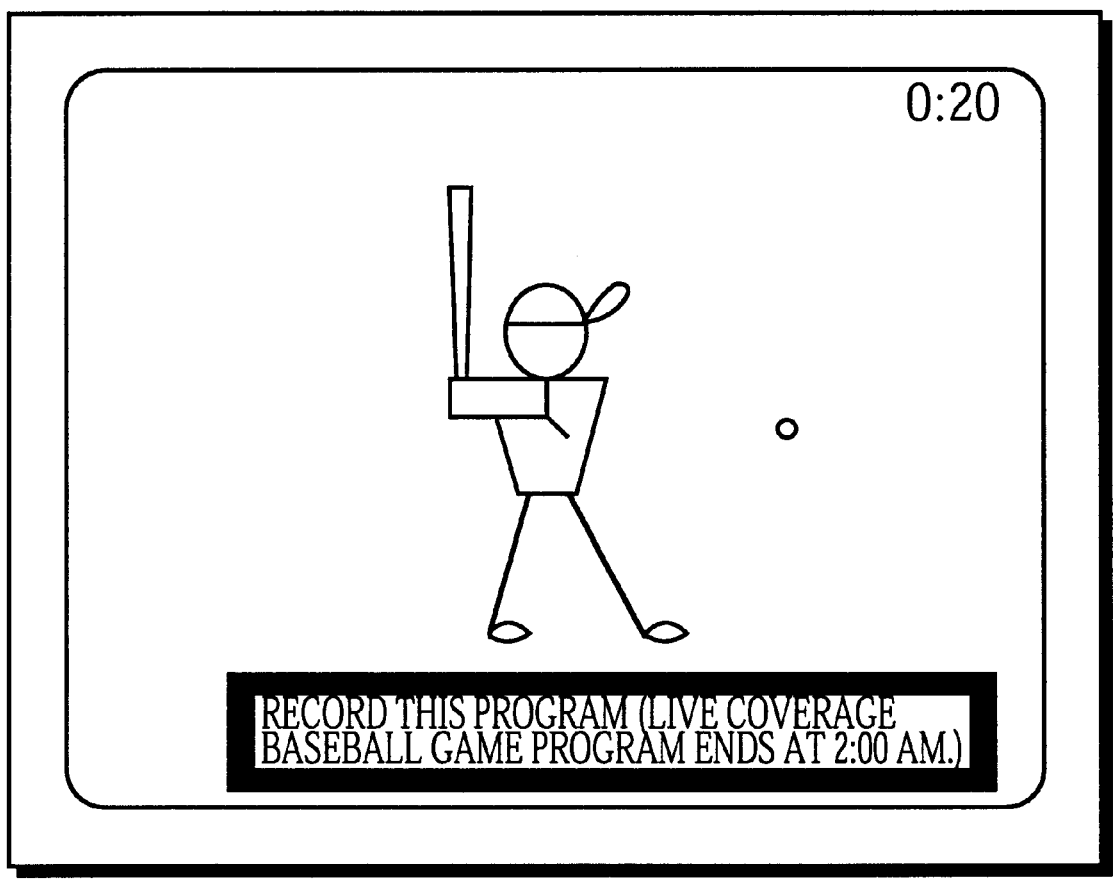
FIG. 34 shows a monitor on which a recommend display appears for advising the user to record a presently watched program.

As a result, the button image as shown in FIG. 34 is displayed on the monitor, for instance.

FIG. 34 shows a monitor on which a recommend display appears for advising the user to record the presently watched program.

FIG. 34 shows an example in which the bedtime 6404 of the user is 1:00 am. (refer to FIG. 30), the user started watching a live coverage baseball game program at 0:10 am., and the present time is 0:20 am. A button image showing the information that the baseball game program ends at 2:00 am. with the recommendation to record the program is displayed on the monitor.

When the user presses the button image using the remote controller and the like, the function controller 6151 controls the recording unit in the digital broadcast receiving apparatus via the apparatus elements controller 5153, and has the recording unit record the presently watched program.

As a result, the user is informed that the end time of the presently watched program is later than the usual bedtime, and presets the digital broadcast receiving apparatus to record the program only by pressing the button image using the determination button on the remote controller.

(Other Examples)

Figure 35:
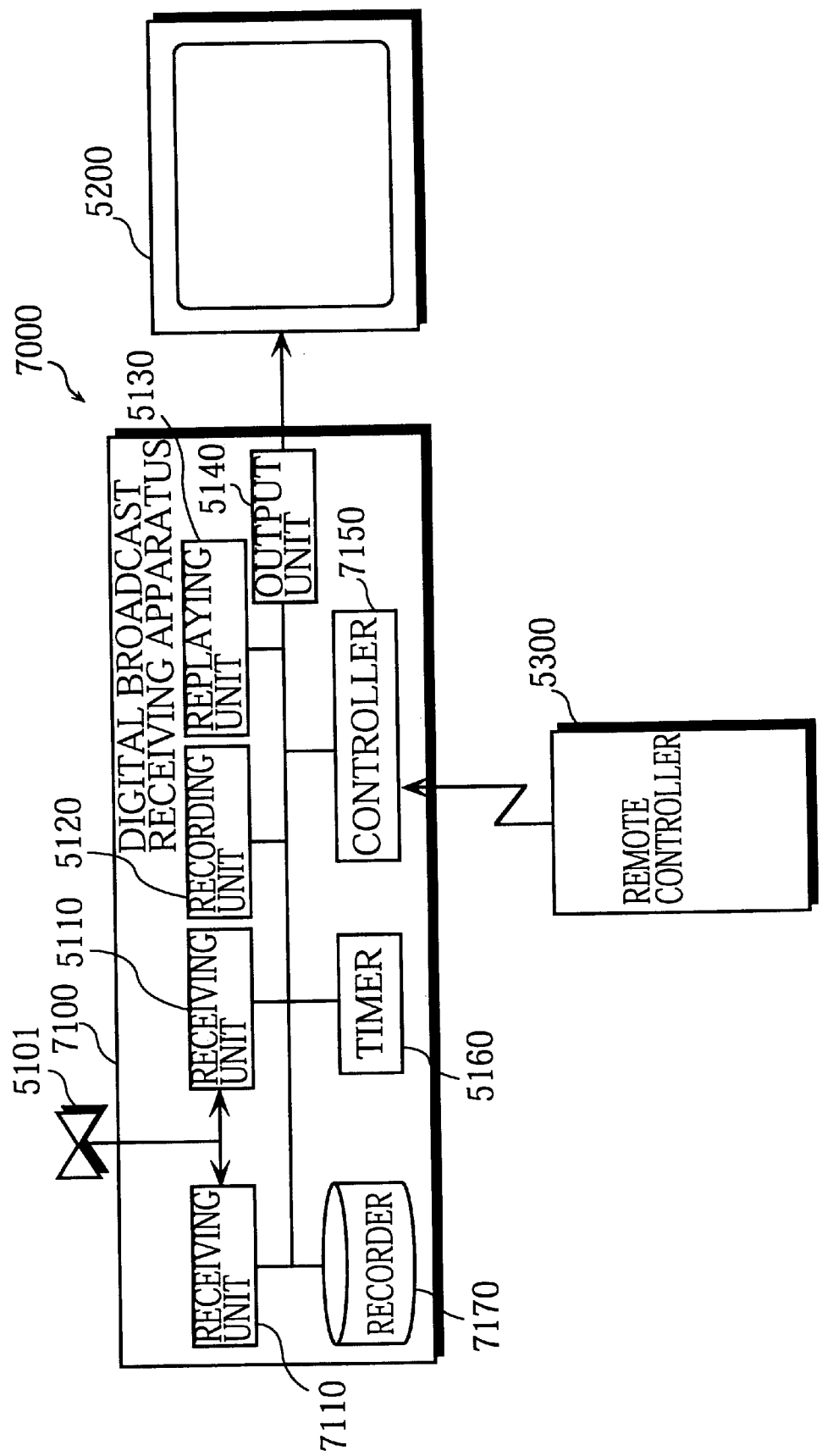
FIG. 35 shows a structure of a digital broadcast receiving system 7000 provided with a digital broadcast receiving apparatus 7100, which is another example of a digital broadcast receiving apparatus according to the fourth embodiment.

FIG. 35 shows a structure of a digital broadcast receiving system 7000 provided with a digital broadcast receiving apparatus 7100, which is another example of the digital broadcast receiving apparatus according to the fourth embodiment.

The digital broadcast receiving apparatus 7100 includes a broadcast receiving antenna 5101, receiving units 5110 and 7110, a recording unit 5120, a replaying unit 5130, an output unit 5140, and a timer 5160, a recorder 7170, and a controller 7150. The digital broadcast receiving apparatus 7100 completely differs from the digital broadcast receiving apparatus 5100 in FIG. 25 in including two receiving units and the recorder 7170.

As a result, it is possible for the digital broadcast receiving apparatus 7100 to simultaneously receive two programs and to record the programs in the recorder 7170, which is composed of a hard disk or another storage device.

The controller 7150 controls the channels of the programs that the receiving units 5110 and 7110 receive, the location in the recorder 7170 of the data from the receiving units 5110 and 7110, the input into the replaying unit 5130 or the recording unit 5120, and the like. Here, the input into the replaying unit 5130 or the recording unit 5120 means that the controller 7150 selects one out of the receiving units 5110 and 7110, and the recorder 7170 when the controller 7150 gives the replaying unit 5130 or the recording unit 5120 data from the receiving unit 5110, the receiving unit 7110, or the recorder 7170.

Under the control of the controller 7150, one of the receiving units 5110 and 7110 receives a program that has been designated by the user, and the other receives a recommendable program that has been determined according to the user information 6400.

The recorder 7170 is used as a ring-shaped recording buffer by the controller 7150, and records the data that has been received by the receiving units 5110 and 7110 in the latest two hours.

In the digital broadcast receiving apparatus 7100, the construction of which has been described, when the button image shown in FIG. 32 is pressed by the user after the start of a recommendable program that has been recommended according to the program recommendation function, the controller 7150 has the replaying unit 5130 replay the recommendable program from the beginning using the data stored in the recorder 7170. For this purpose, the controller 7150 has one of the receiving units 5110 and 7110 receive a recommendable program and has the recorder 7170 record the recommendable program when displaying the button image shown in FIG. 32.

Meanwhile, when a button image for recommending the user to record a presently watched program because the program ends after the usual bedtime (refer to FIG. 34) is displayed according to the bedtime responding function, and when the user presses the displayed button image, the controller 7150 has the recording unit 5120 record the program from the beginning using the data stored in the recorder 7170. As a result, it is possible to record a program from the beginning even when the recording is instructed after the program has started.

While the user interface apparatus according to the present invention has been explained according to the embodiments, as a matter of course the present invention is not limited to the embodiments. Other examples of the present invention will be described below.

(1) While the user is supposed to operate a recording and replaying apparatus or a digital broadcast receiving apparatus in the first to fourth embodiments, the present invention does not limit an apparatus operated by the user.

More specifically, the user interface apparatus according to the present invention may be used in an analog broadcast receiving apparatus, a DVD player, a car navigation system, an electrical appliance, a home automation system, and the like.

A user interface apparatus in a home automation system that has a recommend display appear according to user information as described in the fourth embodiment has a recommend display "fill a bath?" appear on the control panel. In this case, when the user instructs affirmatively, the bath is filled with hot water.

(2) While a broadcasted program table is received in the first to fourth embodiments, a program table may be obtained through a network such as the Internet and may be recorded on and read from a storage medium such as a CD-ROM.

(3) While an example in which an auxiliary menu item "preset for recording of next episode" is displayed on the auxiliary menu after the preset for recording in the first embodiment, it is possible to display an auxiliary menu item "replay next episode" on the auxiliary menu after the replaying of the second episode and to display the auxiliary menu item "preset for recording of next episode" after the replaying of the fifth episode when five episodes have been recorded. For this purpose, it is enough only to manage the information on the recorded serial such as the title and to display the auxiliary menu that fits for the situation after the judging whether the next episode has been recorded or next episode is to be broadcasted on referring to the information and a broadcast schedule.

(4) The user interface shown in the first embodiment, which automatically displays an auxiliary menu according to the apparatus condition and the past user operation, and the user interface in the second embodiment, which displays an auxiliary menu including keywords and function items in response to user operation may be provided in one apparatus. In addition, these two user interfaces may be provided in one apparatus as well as another user interface such as a user interface that displays an auxiliary menu with which a function that has been executed may be easily selected according to a user operation. In such a case, one of these user interfaces may be selectively used.

Meanwhile, while items displayed on the auxiliary menu are determined according to the auxiliary menu item display condition in auxiliary menu item information (refer to FIG. 8) in the first embodiment, it is possible to determine the auxiliary menu items by calculating the evaluation values of the function items according to the semantic relation information 3530 and the function item/keyword condition information 3540 shown in the second embodiment (refer to FIG. 23). More specifically, it is possible for the auxiliary menu item determining unit 1416 to regard a piece of information in execution instruction information and apparatus condition information as an equivalent of a keyword in the second embodiment, to regard the value of a piece of information in execution instruction information and apparatus condition information as the input value into the node corresponding to a keyword, to update the evaluation values of the nodes corresponding to the function items one by one according to the principle as shown in FIG. 23, and to determine function items to be displayed on the auxiliary menu according to the evaluation values held by the nodes corresponding to the function items.

Note that for the purpose to display an auxiliary menu with which a function that has been executed may be easily selected, it is enough to give a serial number to execute control information whenever the operation receiving unit 1411 creates execute control information, to store execute control information including a given serial number in the execution instruction/apparatus condition information storage unit 1412, and to set the order of the function items to be displayed on an auxiliary menu on referring to the serial numbers of the execute control information corresponding to the function items. In this case, it is also possible to display function item names that are written on button images in standard menus, which correspond to large items, middle items, and small items in the execute control information, as the function items on an auxiliary menu.

(5) The form of an auxiliary menu according to each of the first and second embodiments is not limited to that shown in each of the first and second embodiments. Any number of button images may be displayed in an auxiliary menu in any form. For instance, the auxiliary menu item determining unit 1416 determines the auxiliary menu items according to the priorities in auxiliary menu item information in the first embodiment. It is possible to position button images according to the priorities of the corresponding functions. More specifically, it is possible to position a button image of the function with the highest priority at the part that is most accessible for the user.

In addition, while a function to be selected by the user is displayed by a button image on which the name of the function is written with a character string in the first to fourth embodiments, a function may be displayed in any form on the screen. For instance, a function may be represented by an icon of a self-explanatory image of the function.

(6) While received by the remote controllers 1300 and 5300 in the first to fourth embodiments, user operation may be received by a keyboard, a pointing device such as a mouse, and the like.

While displayed with images on the screen in the first to fourth embodiments, the information that may be selected by the user (choices, and the like) may be expressed with voice, for instance. When keywords, i.e., choices are expressed with voice, the keywords are audibly expressed. When inputting the selection of a keyword, the user performs a voice input using an input unit such as a remote controller, a keyboard, and a mouse, or an audio recognition unit at the time the keyword is audibly expressed.

In addition, while the remote controller 1300 is equipped with two kinds of remote control buttons, i.e., remote control buttons for operating a standard menu and for operating an auxiliary menu, a remote controller may be equipped with one kind of remote control buttons so that a standard menu and an auxiliary menu would be operated with the same remote control buttons and one of the menus would be operated at one time. In this case, however, the benefit of the remote controller 1300 may not be enjoyed. More specifically, a user interface with which a cursor is positioned on each of two menus on the screen at the same time is not available without the remote controller 1300.

Note that when the controller 1110 in the first embodiment displays an auxiliary menu after a standard menu has been displayed, it is possible not to disturb user operation of the standard menu by controlling the cursor so that the cursor would not positioned on the auxiliary menu at first even with a remote controller equipped with one kind of remote control buttons.

(7) The "large item", "middle item", and "small item" in the execute control information stored in the execution instruction/apparatus condition information storage unit 1412 in the first and second embodiments may or may not correspond to the hierarchical structure of the standard menus.

The "setting 1", "setting 2", "setting 3", "object 1", and the like in the execution instruction information, and the apparatus condition information stored in the execution instruction/apparatus condition information storage unit 1412 are not limited to the contents shown in the first and second embodiments. Each piece of information stored in the execution instruction/apparatus condition information storage unit 1412 may have any content and may be used for the judgement of the condition for determining the auxiliary menu items on an auxiliary menu in the first embodiment.

In addition, while execution management information in execute control information is supposed to have the value representing "not decoded", "wait for execution", and the like, the value is not limited to these examples. The operations by the function execution controller 1413 in the first embodiment is not limited to the operations shown in the flowchart in FIG. 12. The operations may be anything when the execution of a function is controlled and the display timing of an auxiliary menu is given (steps S111 and S116) according to the execute control information that reflects user operation. For instance, it is possible to suppose that execution management information has no value representing "wait for execution" and to regard a preset for recording as the execution of one function to be treated equally to an immediately-executed-type function. An auxiliary menu display timing may be given when a few seconds have elapsed since user operation was received.

(8) While the value of information in execute control information and apparatus condition information stored in the execution instruction/apparatus condition information storage unit 1412 is used as the condition of the judgement for determining the auxiliary menu item on an auxiliary menu in the first embodiment, the information related to user operation and/or the information related to the condition of the elements in the apparatus may be used as the condition.

(9) The auxiliary menu display timing controller 1415 in the first embodiment may instruct the auxiliary menu item determining unit 1416 to determine an auxiliary menu item to be displayed on an auxiliary menu a plurality of times every time a predetermined period of time has elapsed since the timing given by the function execution controller 1413. The auxiliary menu display timing controller 1415 may adjust the timing independent from the the function execution controller 1413 and may instruct the auxiliary menu item determining unit 1416 to determine an auxiliary menu item to be displayed on an auxiliary menu. As a result, for instance, even when an auxiliary menu is displayed during the display of a standard menu, the remote controller 1300 has two kinds of remote control buttons for operating a standard menu and an auxiliary menu, so that the user may operate both of the menus.

(10) While the auxiliary menu controller 1418 deletes the auxiliary menu when 10 seconds has elapsed since the last operation of the auxiliary menu in the first embodiment, the period of time is not limited to 10 seconds. The auxiliary menu controller 1418 deletes the auxiliary menu when the user presses a button on the remote controller 1300 apart from the auxiliary menu operation button 1380, for instance.

The auxiliary menu in the second embodiment may be deleted by the auxiliary menu controller 3418 when 10 seconds have elapsed since the last operation of the auxiliary menu.

(11) While auxiliary menu item priorities are referred to when auxiliary menu items are determined in the first embodiment, it is not necessary to determine auxiliary menu items according to the auxiliary menu item priorities.

Note that even when auxiliary menu items are determined according to the priorities, the priorities may be changed. For instance, the priority of an auxiliary menu item corresponding to a function that has been selected by the user may be increased. In this case, the more a user interface is used, the more useful the user interface.

(12) Even when a keyword or function item on the primary side has a semantic relation to that on the secondary side, the keyword or function item on the secondary side does not always have a semantic relation to that on the primary side in the semantic relation information 3530 in the second embodiment. It is possible that when a keyword or function item on the primary side has a semantic relation to that on the secondary side, the keyword or function item on the secondary side always has a semantic relation to that on the primary side.

In addition, while the weights are all "1" in the second embodiment, a weight is not limited to "1". In this case, each of the outputs V[0], V[1], and the like in FIG. 23 is weighted and input according to the weight.

(13) The display keyword determination by the auxiliary menu controller 3418 may not be performed according to the processing shown in the flowchart in FIG. 24. For instance, the operations at steps S502 and S507 may be excluded from the processing.

The auxiliary menu controller 3418 may not update keyword button images when the user selects a keyword and may update keyword button images only when the button image "display other words" is selected. In other words, the operation at step S403 after the operation at step S409 may be skipped and the operation at step S404 may be performed just after the operation at step S409 in the flowchart in FIG. 22.

(14) While a button image is displayed on the monitor in the fourth embodiment (refer to FIG. 32), a plurality of button images may be displayed when a plurality of programs are recommended. In addition, it is possible to display a button image for displaying a recommendable program and another button image for recording the recommendable program. In this case, when the user selects a button image, the apparatus performs according to the content of the selected button image.

(15) While the taste genre 6401 shows 10 or less user favorite program genres and the favorite program 6402 shows 10 or less user favorite programs in the fourth embodiment, the number of the maximum number is not limited to "10". In addition, priorities may be given to the user favorite program genres and user favorite programs. For instance, when priorities are given to the user favorite program genres, when the highest priority is given to sport, the second highest priority is given to news, and the third highest priority is given to movie, and when a plurality of recommendable programs are detected according to the user favorite program genres, it is possible to select a predetermined number of programs in order of decreasing priority of genre and to display the selected programs as the recommend display.

(16) A button image for the recommend display that has been explained in the third and fourth embodiments may be dismissed by the user using the remote controller. The button image "return to movie "XX" (one minute has elapsed)" may be dismissed when the user switches channels to watch the movie "XX" with the remote controller.

(17) The watching determination of one program is detected when the user has been watching a program on the same channel for at least 10 minutes in the third and fourth embodiments, the period of time is not limited to 10 minutes. It is possible to detect the watching determination of one program by judging the same program has been watched for at least 10 minutes on referring to the program table.

(18) While a program that is to be broadcasted by the time a presently watched program ends is recommended according to the program recommendation function in the fourth embodiment, the programs that are to be broadcasted within a few minutes of the present time may be recommended every few minutes.

(19) While the reason that is included in the content of the button image for a recommend display such as ("YZ" appearing)" is a genre or a player name according to the program recommendation function in the fourth embodiment, another reason such as the fact that the program has been watched or is watched every week may be included. In addition, the reason may be shown by a character string or a symbol that represents the reason.

(20) While the user information is not divided for a plurality of users in the fourth embodiment, the user information may be divided for a plurality of users. For instance, sets of a user name and the corresponding user information may be input, and a user name may be attached to a recommend display such as a recommendable program. In addition, each of the plurality of users may has a different remote controller. In this case, it may be judged that which remote controller is now operating a digital broadcast receiving apparatus, and a recommend display related only to the user of the remote controller may appear according to the judgement.

(21) While a recommend display appears after the watching determination when a presently watched program ends after the usual bedtime according to the bedtime responding function in the fourth embodiment, the timing of the recommend display is not limited to this example. The recommend display may appear when the bedtime draws near. In addition, the recommend display may appear when a program is scheduled to end at least 30 minutes after the bedtime.

(22) It is possible to distribute a computer program that has the processing procedure of the execute control function and the user interface control function by the controller 1110 in the first embodiment (the operations in the flowcharts in FIGS. 12 and 14, and the like), the processing procedure of the auxiliary menu control by the auxiliary menu controller 3418 in the second embodiment (the operations in the flowcharts FIGS. 22 and 24, and the like), or the processing procedure of the recommend display control in the third or fourth embodiment (the operations in the flowcharts FIGS. 27, 31, and 33, and the like) be executed by a general purpose computer or an electrical appliance equipped with a program execution function via a variety of communication channels, or to record the computer program on a recording medium and distribute the computer program. Such a recording medium includes an IC card, an optical disk, a flexible disk, a read only memory (ROM), and the like. Generally speaking, when used, the distributed computer program is installed in an electrical appliance, a personal computer, and the like which each have a program execution function. Such an electrical appliance and a personal computer execute the computer program to realize the functions related to the user interface shown in the first to fourth embodiments.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A user interface apparatus that receives a user operation of a broadcast receiving apparatus that displays an image of a received program on a monitor, and notifies the broadcast receiving apparatus of an execution instruction relating to an action according to the user operation, comprising:

predicting means for predicting at least one action out of a plurality of actions, an execution of which is predicted to be desired by a user;

user interface means for automatically providing a user interface by displaying an image on the monitor for having the user designate one out of the plurality of actions that have been predicted by the predicting means, and for receiving a designation of an action by the user;

user information storage means for storing user information that is peculiar to a user of the broadcast receiving apparatus, wherein the predicting means predicts the actions according to the user information after a condition of the broadcast receiving apparatus becomes a predetermined condition;

program table storage means for storing a program table including information on a plurality of programs, wherein the user information is bedtime information that shows a predetermined bedtime period of the user, and the user interface means refers to the program table and the bedtime information, compares the bedtime period with a time period when a program that the broadcast receiving apparatus is presently receiving ends, and displays an image on the monitor for having the user designate an execution of an action of recording the program when the program ends after the bedtime period; and notifying means for notifying the broadcast receiving apparatus of an execution instruction relating to an action according to the user action designation that has been received by the user interface means.

2. A user interface apparatus that receives a user operation of an electrical device and notifies the electrical device of an execution instruction relating to an action according to the user operation, comprising:

predicting means for predicting at least one action out of a plurality of actions, an execution of which is predicted to be desired by a user;

first user interface means for automatically providing a user interface in order to have the user designate one out of the plurality of actions that have been predicted by the predicting means, and for receiving a designation of an action by the user;

notifying means for notifying the electrical device of an execution instruction relating to an action according to the user action designation that has been received by the user interface means;

second user interface means for receiving a user operation of the electrical device other than the user action designation that the first user interface means receives;

general notifying means for notifying the electrical device of an execution instruction according to the user operation that has been received by the second user interface means; and holding means for holding execution instruction information on the execution instruction according to the user operation that has been received by the second user interface means, wherein the predicting means predicts actions according to the execution instruction information that is held by the holding means and when an execution completion of an action of the electrical device is detected, and the first user interface means provides the user interface when the predicting means has predicted the actions, wherein the predicting means includes a priority storage unit for storing priority information in which priorities are set for actions of the electrical device, the predicting means predicts actions, a number of which is at least one and no greater than a predetermined number, by referring to the priority information, the second user interface means has an operation button, which is used by the user, displays an image for assisting a user operation, and receives a user operation corresponding to the image via the operation button, the first user interface means has a designation button, which is different from the operation button and is used by the user, and receives a user action designation via the designation button, and when an execution of the action according to the user action designation that has been received by the first user interface means needs setting information according to a user operation, the notifying means creates an execution instruction that includes the setting information by referring to the execution instruction information that is held by the holding means, and notifies the electrical device of the created execution instruction.

3. A user interface apparatus that receives a user operation of an electrical device and notifies the electrical device of an execution instruction relating to an action according to the user operation, comprising:

predicting means for predicting at least one action out of a plurality of actions, an execution of which is supposed to be desired by a user;

first user interface means for automatically providing a user interface in order to have the user designate an action predicted by the predicting means, and for receiving a designation of an action by the user;

second user interface means for receiving a user operation of the electrical device other than the action that the first user interface means receives, including an operation button, which is used by the user, displays an image for assisting a user operation, and receives a user operation corresponding to the image via the operation button, and the first user interface means has a designation button, which is different from the operation button and is used by the user, and receives the user action designation via the designation button; and notifying means for notifying the electrical device of an execution instruction relating to an action according to the user action designation that has been received by the first user interface means.

4. A user interface apparatus that receives a user operation of an electrical device and notifies the electrical device of an execution instruction relating to an action according to the user operation, comprising:

predicting means for predicting at least one action out of a plurality of actions, an execution of which is supposed to be desired by a user;

user interface means for automatically providing a user interface in order to have the user designate one out of the actions that have been predicted by the predicting means, and for receiving a designation of an action by the user; and notifying means for notifying the electrical device of an execution instruction relating to an action according to the user action designation that has been received by the user interface means; wherein the electrical device is a broadcast receiving apparatus that displays an image of a received program on a monitor, the electrical device includes:

receiving means for receiving a program on a channel; and condition detection means for detecting a condition where the receiving means had received a program on a first channel for at least a first period, the first channel was switched to a second channel according to a user operation, and a second period has elapsed, the predicting means predicts a switching action to the first channel as one action, an execution o f which is supposed to be desired by the user when the condition is detected by the condition detection means, the user interface means displays an image on a monitor for having the user designate an execution of the switching action to the first channel that has been predicted by the predicting means, and receives the user action designation, and when notified of the switching action to the first channel by the notifying means, the broadcast receiving apparatus controls the receiving means and has the receiving means receive the program on the first channel.

5. A user interface apparatus that receives a user operation of an electrical device and notifies the electrical device of an execution instruction relating to an action according to the user operation, comprising:

predicting means for predicting at least one action out of a plurality of actions, an execution of which is supposed to be desired by a user;

user interface means for providing a user interface in order to have the user designate one out of the actions that have been predicted by the predicting means, and for receiving a designation of an action by the user;

evaluation value storage means for storing evaluation values that each correspond to different actions of the electrical device;

semantic relation information storage means for storing semantic relation information on semantic relations between the actions of the electrical device and a plurality of keywords;

keyword receiving means for receiving a designation of a keyword by the user;

initializing means for initializing the evaluation values that are stored in the evaluation value storage means and setting each of the evaluation values at a predetermined value; and evaluation value increasing means for referring to the semantic relation information and for increasing an evaluation value corresponding to an action that has a semantic relation to the keyword, the designation of which has been received by the keyword receiving means, wherein when the keyword receiving means receives the keyword designation, the predicting means predicts actions by specifying a predetermined number of actions in decreasing order of evaluation value according to the evaluation values that are stored in the evaluation value storage means;

the user interface means provides a user interface for having the user designate one action out of the predetermined number of actions, which have been predicted by the predicting means, and notifying means for notifying the electrical device of an execution instruction relating to an action according to the user action designation that has been received by the user interface means.

6. The user interface apparatus according to claim 5, wherein the keyword receiving means receives the designation of the keyword after creating a dedicated menu for having the user designate an action of the electrical device that includes a plurality of keywords having semantic relations to at least one of the actions of the electrical device by referring to the semantic relation information and displaying the dedicated menu, and the user interface means provides the user interface by displaying an image for having the user designate one out of the predetermined number of actions.

7. The user interface apparatus according to claim 6, further comprising:

general operation receiving means for receiving a user operation of the electrical device other than the keyword designation that the keyword receiving means receives and the user action designation that the user interface means receives; and general notifying means for notifying the electrical device of an execution instruction according to the user operation that has been received by the general operation receiving means, wherein the general operation receiving means has an operation button, which is used by the user, displays an image error assisting a user operation, and receives a user operation corresponding to the image via the operation button, the user interface means has a designation button, which is different from the operation button and is used by the user, the keyword receiving means receives the user keyword designation by the user via the designation button, and the user interface means receives the user action designation via the designation button.

8. A broadcast receiving apparatus that displays an image of a received program on a monitor, comprising:

execute control means for receiving an instruction, for controlling elements in the broadcast receiving apparatus in response to the instruction to have an action be executed;

user information storage means for storing user information;

user interface means for displaying at least one image for having the user designate an action out of at least one action, an execution of which is supposed to be desired by the user according to the user information that is stored in the user information storage means, and for receiving a designation of the action by the user after the broadcast receiving apparatus is in a predetermined condition;

program table storage means for storing a program table including information on a plurality of programs, wherein the user information is bedtime information that shows a bedtime period of the user, and the user interface means refers to the program table and the bedtime information, compares the bedtime with a time period when a presently received program ends, and displays an image on the monitor for having the user designate an execution of an action of recording the presently received program when the program ends after the bedtime period; and notifying means for notifying the execute control means of an execution instruction relating to an action according to the user action designation that has been received by the user interface means.

9. The broadcast receiving apparatus according to claim 8, further comprising temporary storage means for temporarily storing data on the received program, wherein when notified of an execution instruction for the action of recording the received program by the notifying means, the execute control means has recording means in the broadcast receiving apparatus record the received program from a part that has been received before a notification of the execute instruction for the action of recording using the data stored in the temporary storage means.

* * * * *